US010753768B2

(12) United States Patent
David et al.

(10) Patent No.: US 10,753,768 B2
(45) Date of Patent: Aug. 25, 2020

(54) MAGNETIC FIELD SENSOR PROVIDING A MOVEMENT DETECTOR

(71) Applicant: Allegro MicroSystems, LLC, Manchester, NH (US)

(72) Inventors: Paul A. David, Bow, NH (US); William P. Taylor, Amherst, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 190 days.

(21) Appl. No.: 15/658,757

(22) Filed: Jul. 25, 2017

(65) Prior Publication Data
US 2017/0328739 A1 Nov. 16, 2017

Related U.S. Application Data

(63) Continuation of application No. 14/529,669, filed on Oct. 31, 2014, now Pat. No. 9,823,092.

(51) Int. Cl.
*G01D 5/14* (2006.01)
*G01D 5/20* (2006.01)

(52) U.S. Cl.
CPC ............. *G01D 5/145* (2013.01); *G01D 5/147* (2013.01); *G01D 5/2013* (2013.01)

(58) Field of Classification Search
CPC ....... G01D 5/145; G01D 5/147; G01D 5/2013
See application file for complete search history.

(56) References Cited

U.S. PATENT DOCUMENTS

| 3,132,337 A | 5/1964 | Martin |
| 3,195,043 A | 7/1965 | Burig et al. |
| 3,281,628 A | 10/1966 | Bauer et al. |
| 3,607,528 A | 9/1971 | Gassaway |
| 3,611,138 A | 10/1971 | Winebrener |
| 3,661,061 A | 5/1972 | Tokarz |
| 3,728,786 A | 4/1973 | Lucas et al. |
| 4,048,670 A | 9/1977 | Eysermens |
| 4,079,360 A | 3/1978 | Ookubo et al. |
| 4,180,753 A | 12/1979 | Cook, II |
| 4,188,605 A | 2/1980 | Stout |
| 4,204,317 A | 5/1980 | Winn |
| 4,236,832 A | 12/1980 | Komatsu et al. |
| 4,283,643 A | 8/1981 | Levin |
| 4,315,523 A | 2/1982 | Mahawili et al. |
| 4,438,347 A | 3/1984 | Gehring |

(Continued)

FOREIGN PATENT DOCUMENTS

| CH | 683 469 A5 | 3/1994 |
| DE | 25 18 054 | 11/1976 |

(Continued)

OTHER PUBLICATIONS

A.A. Thornton letter dated Nov. 26, 2018 in to response Official Communication dated Jul. 9, 2018 for EP Pat. Appl. No. 15853626.8; 4 pages.

(Continued)

*Primary Examiner* — Akm Zakaria
(74) *Attorney, Agent, or Firm* — Daly, Crowley, Mofford & Durkee, LLP

(57) ABSTRACT

A magnetic field sensor has a plurality of magnetic field sensing elements and operates as a motion detector for sensing a rotation or other movement of a target object.

31 Claims, 18 Drawing Sheets

(56) References Cited

U.S. PATENT DOCUMENTS

| | | |
|---|---|---|
| 4,490,674 A | 12/1984 | Ito |
| 4,573,258 A | 3/1986 | Io et al. |
| 4,614,111 A | 9/1986 | Wolff |
| 4,649,796 A | 3/1987 | Schmidt |
| 4,668,914 A | 5/1987 | Karsten et al. |
| 4,670,715 A | 6/1987 | Fuzzell |
| 4,719,419 A | 1/1988 | Dawley |
| 4,733,455 A | 3/1988 | Nakamura et al. |
| 4,745,363 A | 5/1988 | Carr et al. |
| 4,746,859 A | 5/1988 | Malik |
| 4,752,733 A | 6/1988 | Petr et al. |
| 4,758,943 A | 7/1988 | Aström et al. |
| 4,760,285 A | 7/1988 | Nelson |
| 4,761,569 A | 8/1988 | Higgs |
| 4,764,767 A | 8/1988 | Ichikawa et al. |
| 4,769,344 A | 9/1988 | Sakai et al. |
| 4,772,929 A | 9/1988 | Manchester |
| 4,789,826 A | 12/1988 | Willett |
| 4,796,354 A | 1/1989 | Yokoyama et al. |
| 4,823,075 A | 4/1989 | Alley |
| 4,829,352 A | 5/1989 | Popovic et al. |
| 4,833,406 A | 5/1989 | Foster |
| 4,893,027 A | 1/1990 | Kammerer et al. |
| 4,908,685 A | 3/1990 | Shibasaki et al. |
| 4,910,861 A | 3/1990 | Dohogne |
| 4,935,698 A | 6/1990 | Kawaji et al. |
| 4,954,777 A | 9/1990 | Klopfer et al. |
| 4,970,411 A | 11/1990 | Halg et al. |
| 4,983,916 A | 1/1991 | Iijima et al. |
| 5,012,322 A | 4/1991 | Guillotte |
| 5,021,493 A | 6/1991 | Sandstrom |
| 5,028,868 A | 7/1991 | Murata et al. |
| 5,038,130 A | 8/1991 | Eck et al. |
| 5,045,920 A | 9/1991 | Vig et al. |
| 5,078,944 A | 1/1992 | Yoshino |
| 5,084,289 A | 1/1992 | Shin et al. |
| 5,121,289 A | 6/1992 | Gagliardi |
| 5,137,677 A | 8/1992 | Murata |
| 5,139,973 A | 8/1992 | Nagy et al. |
| 5,167,896 A | 12/1992 | Hirota et al. |
| 5,168,244 A | 12/1992 | Muranaka |
| 5,185,919 A | 2/1993 | Hickey |
| 5,196,794 A | 3/1993 | Murata |
| 5,200,698 A | 4/1993 | Thibaud |
| 5,210,493 A | 5/1993 | Schroeder et al. |
| 5,216,405 A | 6/1993 | Schroeder et al. |
| 5,244,834 A | 9/1993 | Suzuki et al. |
| 5,247,202 A | 9/1993 | Popovic et al. |
| 5,247,278 A | 9/1993 | Pant et al. |
| 5,250,925 A | 10/1993 | Shinkle |
| 5,289,344 A | 2/1994 | Gagnon et al. |
| 5,286,426 A | 3/1994 | Rano, Jr. et al. |
| 5,304,926 A | 4/1994 | Wu |
| 5,315,245 A | 5/1994 | Schroeder et al. |
| 5,329,416 A | 7/1994 | Ushiyama et al. |
| 5,331,478 A | 7/1994 | Aranovsky |
| 5,332,956 A | 7/1994 | Oh |
| 5,332,965 A | 7/1994 | Wolf et al. |
| 5,341,097 A | 8/1994 | Wu |
| 5,399,968 A | 3/1995 | Sheppard et al. |
| 5,412,255 A | 5/1995 | Wallrafen |
| 5,414,355 A | 5/1995 | Davidson et al. |
| 5,424,558 A | 6/1995 | Borden et al. |
| 5,434,105 A | 7/1995 | Liou |
| 5,453,727 A | 9/1995 | Shibasaki et al. |
| 5,469,058 A | 11/1995 | Dunnam |
| 5,477,143 A | 12/1995 | Wu |
| 5,479,695 A | 1/1996 | Grader et al. |
| 5,486,759 A | 1/1996 | Seiler et al. |
| 5,488,294 A | 1/1996 | Liddell et al. |
| 5,491,633 A | 2/1996 | Henry et al. |
| 5,497,081 A | 3/1996 | Wolf et al. |
| 5,497,083 A | 3/1996 | Nakazato et al. |
| 5,500,589 A | 3/1996 | Sumcad |
| 5,500,994 A | 3/1996 | Itaya |
| 5,508,611 A | 4/1996 | Schroeder et al. |
| 5,521,501 A | 5/1996 | Dettmann et al. |
| 5,541,506 A | 7/1996 | Kawakita et al. |
| 5,545,983 A | 8/1996 | Okeya et al. |
| 5,551,146 A | 9/1996 | Kawabata et al. |
| 5,552,706 A | 9/1996 | Carr |
| 5,572,058 A | 11/1996 | Biard |
| 5,581,170 A | 12/1996 | Mammano et al. |
| 5,581,179 A | 12/1996 | Engel et al. |
| 5,596,272 A | 1/1997 | Busch |
| 5,612,618 A | 3/1997 | Arakawa |
| 5,619,137 A | 4/1997 | Vig et al. |
| 5,621,319 A | 4/1997 | Bilotti et al. |
| 5,627,315 A | 5/1997 | Figi et al. |
| 5,631,557 A | 5/1997 | Davidson |
| 5,640,090 A | 6/1997 | Furuya et al. |
| 5,657,189 A | 8/1997 | Sandhu |
| 5,691,637 A | 11/1997 | Oswald et al. |
| 5,694,038 A | 12/1997 | Moody et al. |
| 5,696,790 A | 12/1997 | Graham et al. |
| 5,712,562 A | 1/1998 | Berg |
| 5,714,102 A | 2/1998 | Highum et al. |
| 5,719,496 A | 2/1998 | Wolf |
| 5,729,128 A | 3/1998 | Bunyer et al. |
| 5,757,181 A | 5/1998 | Wolf et al. |
| 5,781,005 A | 7/1998 | Vig et al. |
| 5,789,658 A | 8/1998 | Henn et al. |
| 5,789,915 A | 8/1998 | Ingraham |
| 5,796,249 A | 8/1998 | Andräet et al. |
| 5,818,222 A | 10/1998 | Ramsden |
| 5,818,223 A | 10/1998 | Wolf |
| 5,831,513 A | 11/1998 | Lue |
| 5,839,185 A | 11/1998 | Smith et al. |
| 5,841,276 A | 11/1998 | Makino et al. |
| 5,844,411 A | 12/1998 | Vogt |
| 5,859,387 A | 1/1999 | Gagnon |
| 5,886,070 A | 2/1999 | Honkura et al. |
| 5,883,567 A | 3/1999 | Mullins, Jr. |
| 5,912,556 A | 6/1999 | Frazee et al. |
| 5,942,895 A | 8/1999 | Popovic et al. |
| 5,963,028 A | 10/1999 | Engel et al. |
| 6,011,770 A | 1/2000 | Tan |
| 6,016,055 A | 1/2000 | Jager et al. |
| 6,043,644 A | 3/2000 | de Coulon et al. |
| 6,043,646 A | 3/2000 | Jansseune |
| 6,064,199 A | 5/2000 | Walter et al. |
| 6,064,202 A | 5/2000 | Steiner et al. |
| 6,091,239 A | 7/2000 | Vig et al. |
| 6,100,680 A | 8/2000 | Vig et al. |
| 6,100,754 A | 8/2000 | Kim et al. |
| 6,136,250 A | 10/2000 | Brown |
| 6,166,535 A | 12/2000 | Irle et al. |
| 6,169,396 B1 | 1/2001 | Yokotani et al. |
| 6,175,232 B1 | 1/2001 | De Coulon et al. |
| 6,175,233 B1 | 1/2001 | McCuriey et al. |
| 6,180,041 B1 | 1/2001 | Takizawa |
| 6,181,036 B1 | 1/2001 | Kazama et al. |
| 6,184,679 B1 | 2/2001 | Popovic et al. |
| 6,194,893 B1 | 2/2001 | Yokotani et al. |
| 6,198,373 B1 | 3/2001 | Ogawa et al. |
| 6,232,768 B1 | 5/2001 | Moody et al. |
| 6,236,199 B1 | 5/2001 | Irle et al. |
| 6,242,604 B1 | 6/2001 | Hudlicky et al. |
| 6,242,904 B1 | 6/2001 | Shirai et al. |
| 6,242,905 B1 | 6/2001 | Draxelmayr |
| 6,265,864 B1 | 7/2001 | De Winter et al. |
| 6,265,865 B1 | 7/2001 | Engel et al. |
| 6,278,269 B1 | 8/2001 | Vig et al. |
| 6,288,533 B1 | 9/2001 | Haeberli et al. |
| 6,291,989 B1 | 9/2001 | Schroeder |
| 6,297,627 B1 | 10/2001 | Towne et al. |
| 6,297,628 B1 | 10/2001 | Bicking et al. |
| 6,323,642 B1 | 11/2001 | Nishimura et al. |
| 6,339,322 B1 | 1/2002 | Loreck et al. |
| 6,351,506 B1 | 2/2002 | Lewicki |
| 6,356,068 B1 | 3/2002 | Steiner et al. |
| 6,356,741 B1 | 3/2002 | Bilotti et al. |
| 6,366,079 B1 * | 4/2002 | Uenoyama ............ G01D 5/147 |
| | | 324/207.21 |

(56) References Cited

U.S. PATENT DOCUMENTS

| | | |
|---|---|---|
| 6,392,478 B1 | 5/2002 | Mulder et al. |
| 6,436,748 B1 | 8/2002 | Forbes et al. |
| 6,437,558 B2 | 8/2002 | Li et al. |
| 6,452,381 B1 | 9/2002 | Nakatani et al. |
| 6,462,536 B1 | 10/2002 | Mednikov et al. |
| 6,492,804 B2 | 12/2002 | Tsuge et al. |
| 6,501,270 B1 | 12/2002 | Opie |
| 6,525,531 B2 | 2/2003 | Forrest et al. |
| 6,528,992 B2 | 3/2003 | Shinjo et al. |
| 6,542,068 B1 | 4/2003 | Drapp et al. |
| 6,542,847 B1 | 4/2003 | Lohberg et al. |
| 6,545,332 B2 | 4/2003 | Huang |
| 6,545,457 B2 | 4/2003 | Goto et al. |
| 6,545,462 B2 | 4/2003 | Schott et al. |
| 6,566,862 B1 | 5/2003 | Goto et al. |
| 6,590,804 B1 | 7/2003 | Perner |
| 6,622,012 B2 | 9/2003 | Bilotti et al. |
| 6,640,451 B1 | 11/2003 | Vinarcik |
| 6,653,968 B1 | 11/2003 | Schneider |
| 6,674,679 B1 | 1/2004 | Perner et al. |
| 6,687,644 B1 | 2/2004 | Zinke et al. |
| 6,692,676 B1 | 2/2004 | Vig et al. |
| 6,768,301 B1 | 7/2004 | Hohe et al. |
| 6,770,163 B1 | 8/2004 | Kuah et al. |
| 6,781,233 B2 | 8/2004 | Zverev et al. |
| 6,781,359 B2 | 8/2004 | Stauth et al. |
| 6,798,193 B2 | 9/2004 | Zimmerman et al. |
| 6,815,944 B2 | 11/2004 | Vig et al. |
| 6,822,443 B1 | 11/2004 | Dogaru |
| 6,853,178 B2 | 2/2005 | Hayat-Dawoodi |
| 6,898,407 B2 | 5/2005 | Nomiyama et al. |
| 6,902,951 B2 | 6/2005 | Goller et al. |
| 6,917,321 B1 | 7/2005 | Haurie et al. |
| 6,969,988 B2 | 11/2005 | Kakuta et al. |
| 7,023,205 B1 | 4/2006 | Krupp |
| 7,026,808 B2 | 4/2006 | Vig et al. |
| 7,030,606 B2 | 4/2006 | Kato et al. |
| 7,031,170 B2 | 4/2006 | Daeche et al. |
| 7,038,448 B2 | 5/2006 | Schott et al. |
| 7,049,924 B2 | 5/2006 | Hayashi et al. |
| 7,085,119 B2 | 8/2006 | Bilotti et al. |
| 7,112,955 B2 | 9/2006 | Buchhold |
| 7,112,957 B2 | 9/2006 | Bicking |
| 7,119,538 B2 | 10/2006 | Blossfeld |
| 7,126,327 B1 | 10/2006 | Busch |
| 7,159,556 B2 | 1/2007 | Yoshihara |
| 7,184,876 B2 | 2/2007 | Teulings et al. |
| 7,190,784 B2 | 3/2007 | Li |
| 7,193,412 B2 | 3/2007 | Freeman |
| 7,199,579 B2 | 4/2007 | Scheller et al. |
| 7,235,968 B2 | 6/2007 | Popovic et al. |
| 7,250,760 B2 | 7/2007 | Ao |
| 7,259,545 B2 | 8/2007 | Stauth et al. |
| 7,259,556 B2 | 8/2007 | Popovic et al. |
| 7,265,531 B2 | 9/2007 | Stauth et al. |
| 7,269,992 B2 | 9/2007 | Lamb et al. |
| 7,285,952 B1 | 10/2007 | Hatanaka et al. |
| 7,292,095 B2 | 11/2007 | Burt et al. |
| 7,295,000 B2 | 11/2007 | Werth |
| 7,307,824 B2 | 12/2007 | Bilotti et al. |
| 7,319,319 B2 | 1/2008 | Jones et al. |
| 7,323,780 B2 | 1/2008 | Daubenspeck et al. |
| 7,323,870 B2 | 1/2008 | Tatschl et al. |
| 7,325,175 B2 | 1/2008 | Momtaz |
| 7,345,468 B2 | 3/2008 | Okada et al. |
| 7,355,388 B2 | 4/2008 | Ishio |
| 7,361,531 B2 | 4/2008 | Sharma et al. |
| 7,362,094 B2 | 4/2008 | Voisine et al. |
| 7,365,530 B2 | 4/2008 | Bailey et al. |
| 7,385,394 B2 | 6/2008 | Auburger et al. |
| 7,425,821 B2 | 9/2008 | Monreal et al. |
| 7,474,093 B2 | 1/2009 | Ausserlechner |
| 7,476,953 B2 | 1/2009 | Taylor et al. |
| 7,518,354 B2 | 4/2009 | Stauth et al. |
| 7,592,801 B2 | 9/2009 | Bailey et al. |
| 7,598,601 B2 | 10/2009 | Taylor et al. |
| 7,605,647 B1 | 10/2009 | Romero et al. |
| 7,635,993 B2 | 12/2009 | Boeve |
| 7,694,200 B2 | 4/2010 | Forrest et al. |
| 7,701,208 B2 | 4/2010 | Nishikawa |
| 7,714,570 B2 | 5/2010 | Thomas et al. |
| 7,729,675 B2 | 6/2010 | Krone |
| 7,746,056 B2 | 6/2010 | Stauth et al. |
| 7,746,065 B2 | 6/2010 | Pastre et al. |
| 7,759,929 B2 | 7/2010 | Forsyth |
| 7,764,118 B2 | 7/2010 | Kusuda et al. |
| 7,768,083 B2 | 8/2010 | Doogue et al. |
| 7,769,110 B2 | 8/2010 | Momtaz |
| 7,800,389 B2 | 9/2010 | Friedrich et al. |
| 7,808,074 B2 | 10/2010 | Knittl |
| 7,816,772 B2 | 10/2010 | Engel et al. |
| 7,816,905 B2 | 10/2010 | Doogue et al. |
| 7,839,141 B2 | 11/2010 | Werth et al. |
| 7,872,322 B2 | 1/2011 | Schott et al. |
| 7,911,203 B2 | 3/2011 | Thomas et al. |
| 7,936,144 B2 | 5/2011 | Vig et al. |
| 7,956,604 B2 | 6/2011 | Ausserlechner |
| 7,961,823 B2 | 6/2011 | Kolze et al. |
| 7,965,076 B2 | 6/2011 | Schott |
| 7,990,209 B2 | 8/2011 | Romero |
| 7,994,774 B2 | 8/2011 | Thomas et al. |
| 8,058,870 B2 | 11/2011 | Sterling |
| 8,063,634 B2 | 11/2011 | Sauber et al. |
| 8,080,993 B2 | 12/2011 | Theuss et al. |
| 8,089,276 B2 | 1/2012 | Kentsch |
| 8,106,649 B2 | 1/2012 | Kaita et al. |
| 8,106,654 B2 | 1/2012 | Theuss et al. |
| 8,128,549 B2 | 3/2012 | Teslani et al. |
| 8,134,358 B2 | 3/2012 | Charlier et al. |
| 8,143,169 B2 | 3/2012 | Engel et al. |
| 8,253,210 B2 | 8/2012 | Theuss et al. |
| 8,274,279 B2 | 9/2012 | Gies |
| 8,362,579 B2 | 1/2013 | Theuss et al. |
| 8,610,430 B2 | 12/2013 | Werth et al. |
| 8,624,588 B2 | 1/2014 | Vig et al. |
| 8,723,512 B1 | 5/2014 | Burdette et al. |
| 8,729,890 B2 | 5/2014 | Donovan et al. |
| 8,773,124 B2 | 7/2014 | Ausserlechner |
| 9,116,018 B2 | 8/2015 | Frachon |
| 9,164,156 B2 | 10/2015 | Elian et al. |
| 9,201,123 B2 | 12/2015 | Elian et al. |
| 9,548,443 B2 | 1/2017 | Wang |
| 9,720,854 B2 | 8/2017 | Drouin et al. |
| 2001/0002791 A1 | 6/2001 | Tsuge et al. |
| 2001/0009367 A1 | 7/2001 | Seltzer et al. |
| 2001/0026153 A1 | 10/2001 | Nakamura et al. |
| 2002/0027488 A1 | 3/2002 | Hayat-Dawoodi et al. |
| 2002/0084923 A1 | 7/2002 | Li |
| 2003/0001563 A1 | 1/2003 | Turner |
| 2003/0038675 A1 | 2/2003 | Gailus et al. |
| 2003/0062891 A1 | 4/2003 | Slates |
| 2003/0102909 A1 | 6/2003 | Motz |
| 2003/0107366 A1 | 6/2003 | Busch et al. |
| 2003/0173955 A1 | 9/2003 | Uenoyama |
| 2003/0227286 A1 | 12/2003 | Dunisch et al. |
| 2004/0032251 A1 | 2/2004 | Zimmerman et al. |
| 2004/0046248 A1 | 3/2004 | Waelti et al. |
| 2004/0062362 A1 | 4/2004 | Matsuya |
| 2004/0080314 A1 | 4/2004 | Tsujii et al. |
| 2004/0135220 A1 | 7/2004 | Goto |
| 2004/0155647 A1 | 8/2004 | Stauth et al. |
| 2004/0170052 A1 | 9/2004 | Inui |
| 2004/0174164 A1 | 9/2004 | Ao |
| 2004/0184196 A1 | 9/2004 | Jayasekara |
| 2004/0189285 A1 | 9/2004 | Uenoyama |
| 2004/0196045 A1 | 10/2004 | Larsen |
| 2004/0252563 A1 | 12/2004 | Hokuto et al. |
| 2004/0263014 A1 | 12/2004 | Miya |
| 2005/0017709 A1 | 1/2005 | Stolfus et al. |
| 2005/0120782 A1 | 6/2005 | Kishibata et al. |
| 2005/0122095 A1 | 6/2005 | Dooley |
| 2005/0122099 A1 | 6/2005 | Imamoto et al. |
| 2005/0167790 A1 | 8/2005 | Khor et al. |
| 2005/0179429 A1 | 8/2005 | Lohberg |

(56) References Cited

U.S. PATENT DOCUMENTS

| | | |
|---|---|---|
| 2005/0225318 A1 | 10/2005 | Bailey et al. |
| 2005/0280411 A1 | 12/2005 | Bicking |
| 2006/0011999 A1 | 1/2006 | Schott et al. |
| 2006/0033487 A1 | 2/2006 | Nagano et al. |
| 2006/0038559 A1 | 2/2006 | Lamb et al. |
| 2006/0068237 A1 | 3/2006 | Murphy |
| 2006/0097717 A1 | 5/2006 | Tokuhara et al. |
| 2006/0125473 A1 | 6/2006 | Frachon et al. |
| 2006/0175674 A1 | 8/2006 | Taylor |
| 2006/0181263 A1 | 8/2006 | Doogue et al. |
| 2006/0202692 A1 | 9/2006 | Tatschl et al. |
| 2006/0238190 A1 | 10/2006 | Ishio |
| 2006/0261801 A1* | 11/2006 | Busch .............. G01D 5/145 324/207.21 |
| 2007/0110199 A1 | 5/2007 | Momtaz et al. |
| 2007/0247141 A1 | 10/2007 | Pastre et al. |
| 2007/0285089 A1 | 12/2007 | Ibuki et al. |
| 2008/0012558 A1 | 1/2008 | Rossler et al. |
| 2008/0013298 A1 | 1/2008 | Sharma et al. |
| 2008/0094055 A1 | 4/2008 | Monreal et al. |
| 2008/0137784 A1 | 6/2008 | Krone |
| 2008/0237818 A1 | 10/2008 | Engel et al. |
| 2008/0238410 A1 | 10/2008 | Charlier et al. |
| 2009/0001964 A1 | 1/2009 | Strzalkowski |
| 2009/0001965 A1 | 1/2009 | Ausserlachner et al. |
| 2009/0001972 A1 | 1/2009 | Fernandez et al. |
| 2009/0058404 A1 | 3/2009 | Kurumado |
| 2009/0085706 A1 | 4/2009 | Baarman et al. |
| 2009/0102467 A1 | 4/2009 | Snell et al. |
| 2009/0121707 A1 | 5/2009 | Schott |
| 2009/0140725 A1 | 6/2009 | Ausserlechner |
| 2009/0146647 A1 | 6/2009 | Ausserlechner |
| 2009/0152696 A1 | 6/2009 | Dimasacat et al. |
| 2009/0167298 A1 | 7/2009 | Kreutzbruck et al. |
| 2009/0174395 A1 | 7/2009 | Thomas et al. |
| 2009/0206827 A1 | 8/2009 | Aimuta et al. |
| 2009/0206831 A1 | 8/2009 | Fermon et al. |
| 2009/0212765 A1 | 8/2009 | Doogue et al. |
| 2009/0243601 A1 | 10/2009 | Feldtkeller |
| 2009/0262466 A1 | 10/2009 | Kurata et al. |
| 2009/0315543 A1 | 12/2009 | Guo et al. |
| 2009/0322325 A1* | 12/2009 | Ausserlechner ........ G01D 5/145 324/260 |
| 2009/0326860 A1 | 12/2009 | Hainz et al. |
| 2010/0026279 A1 | 2/2010 | Vig et al. |
| 2010/0045268 A1 | 2/2010 | Kilian |
| 2010/0072988 A1* | 3/2010 | Hammerschmidt .... H03M 1/28 324/207.25 |
| 2010/0141249 A1 | 6/2010 | Ararao et al. |
| 2010/0156397 A1 | 6/2010 | Yabusaki et al. |
| 2010/0164491 A1 | 7/2010 | Kejik et al. |
| 2010/0188078 A1 | 7/2010 | Foletto et al. |
| 2010/0201356 A1 | 8/2010 | Koller et al. |
| 2010/0211347 A1 | 8/2010 | Friedrich et al. |
| 2010/0237450 A1 | 9/2010 | Doogue et al. |
| 2010/0276769 A1 | 11/2010 | Theuss et al. |
| 2010/0295140 A1 | 11/2010 | Theuss et al. |
| 2011/0018533 A1 | 1/2011 | Cesaretti et al. |
| 2011/0031960 A1 | 2/2011 | Hohe et al. |
| 2011/0048102 A1 | 3/2011 | Fernandez et al. |
| 2011/0074405 A1 | 3/2011 | Doogue et al. |
| 2011/0127998 A1 | 6/2011 | Elian et al. |
| 2011/0248708 A1 | 10/2011 | Thomas et al. |
| 2011/0267040 A1 | 11/2011 | Frachon |
| 2011/0298448 A1 | 12/2011 | Foletto et al. |
| 2012/0007589 A1 | 1/2012 | Okada |
| 2012/0013333 A1 | 1/2012 | Ararao et al. |
| 2012/0019236 A1 | 1/2012 | Tiernan et al. |
| 2012/0086090 A1 | 4/2012 | Sharma et al. |
| 2012/0249133 A1 | 10/2012 | Friedrich |
| 2012/0274314 A1 | 11/2012 | Cesaretti et al. |
| 2012/0293167 A1 | 11/2012 | Kitanaka et al. |
| 2012/0303305 A1 | 11/2012 | Bergqvist et al. |
| 2013/0015845 A1 | 1/2013 | Fox |
| 2013/0113474 A1 | 5/2013 | Elian |
| 2013/0278246 A1 | 10/2013 | Stegerer et al. |
| 2013/0320970 A1 | 12/2013 | Foletto et al. |
| 2014/0084906 A1 | 3/2014 | Ruigrok et al. |
| 2014/0175584 A1* | 6/2014 | Foletto .............. H01L 29/82 257/427 |
| 2014/0176126 A1* | 6/2014 | Friedrich ............ G01R 33/02 324/207.2 |
| 2014/0232370 A1 | 8/2014 | Nazarian et al. |
| 2014/0232379 A1 | 8/2014 | Nazarian et al. |
| 2014/0266176 A1 | 9/2014 | Fernandez et al. |
| 2016/0123771 A1 | 5/2016 | David et al. |
| 2017/0307696 A1 | 10/2017 | Werth et al. |
| 2017/0328739 A1 | 11/2017 | David et al. |

FOREIGN PATENT DOCUMENTS

| | | |
|---|---|---|
| DE | 40 31 560 | 4/1992 |
| DE | 195 39 458 | 4/1997 |
| DE | 196 34 715 | 3/1998 |
| DE | 196 50 935 | 6/1998 |
| DE | 198 38 433 | 3/1999 |
| DE | 19851839 | 11/1999 |
| DE | 199 61 504 A1 | 6/2001 |
| DE | 102 10 184 | 9/2003 |
| DE | 103 14 602 | 10/2004 |
| DE | 10 2010 016 509 B4 | 10/2006 |
| DE | 10 2006 037 226 A1 | 2/2008 |
| DE | 10 2007 018 238 A1 | 10/2008 |
| DE | 10 2007 041 230 B3 | 4/2009 |
| DE | 10 2010 016 584 | 11/2010 |
| DE | 10 2010 016 584 A1 | 11/2010 |
| DE | 102010016584 | 11/2010 |
| DE | 10 2011 102483 | 11/2012 |
| DE | 102011102483 | 11/2012 |
| EP | 0 289 414 A2 | 11/1988 |
| EP | 0 289 414 A3 | 11/1988 |
| EP | 0 357 013 A2 | 3/1990 |
| EP | 0 357 013 A3 | 3/1990 |
| EP | 0 361 456 A2 | 4/1990 |
| EP | 0 361 456 A3 | 4/1990 |
| EP | 0 504 583 | 9/1992 |
| EP | 0 631 416 B1 | 12/1994 |
| EP | 0629834 A1 | 12/1994 |
| EP | 0 680 103 A1 | 11/1995 |
| EP | 0 875 733 B1 | 11/1998 |
| EP | 0 898 180 A2 | 2/1999 |
| EP | 0 916 074 B1 | 5/1999 |
| EP | 0 944 888 B1 | 10/2001 |
| EP | 1 443 332 A1 | 8/2004 |
| EP | 1 580 560 A1 | 9/2005 |
| EP | 1 637 898 A1 | 3/2006 |
| EP | 1 662 353 A1 | 5/2006 |
| EP | 1 679 524 A1 | 7/2006 |
| EP | 1 850 143 A1 | 10/2007 |
| EP | 2 000 814 A2 | 12/2008 |
| EP | 2 063 229 | 5/2009 |
| EP | 2 063 229 A1 | 5/2009 |
| EP | 2402719 | 1/2012 |
| EP | 2 730 89 | 5/2014 |
| EP | 3410075 | 12/2018 |
| FR | 2 748 105 | 10/1997 |
| FR | 2 909 756 | 6/2008 |
| GB | 2135060 A | 8/1984 |
| GB | 2276727 A | 10/1994 |
| GB | 2481482 | 12/2011 |
| JP | 58-055688 A | 4/1983 |
| JP | 61-48777 | 3/1986 |
| JP | 363 084176 A | 4/1988 |
| JP | 63-263782 | 10/1988 |
| JP | 63-300911 | 12/1988 |
| JP | H02-116753 | 5/1990 |
| JP | 02-149013 | 6/1990 |
| JP | H03-29817 | 2/1991 |
| JP | 04-152688 | 5/1992 |
| JP | H06-273437 | 9/1994 |
| JP | 08-97486 | 4/1996 |
| JP | 09-166612 | 6/1997 |
| JP | 10-38988 | 2/1998 |
| JP | H1038988 | 2/1998 |

(56) References Cited

FOREIGN PATENT DOCUMENTS

| | | |
|---|---|---|
| JP | 10-332725 | 12/1998 |
| JP | H10318784 | 12/1998 |
| JP | 11-064363 | 3/1999 |
| JP | 11-74142 | 3/1999 |
| JP | 2000-183241 A | 6/2000 |
| JP | 2001-043475 | 2/2001 |
| JP | 2001-141738 A | 5/2001 |
| JP | 2001-165702 | 6/2001 |
| JP | 2001-1659951 | 6/2001 |
| JP | 2002-117500 | 4/2002 |
| JP | 2002-149013 | 5/2002 |
| JP | 2002-357920 | 12/2002 |
| JP | 2003-042709 | 2/2003 |
| JP | 2003-177171 | 6/2003 |
| JP | 2004-055932 | 2/2004 |
| JP | 2004-093381 | 3/2004 |
| JP | 2004-152688 | 5/2004 |
| JP | 2004-356338 | 12/2004 |
| JP | 2004-357858 | 12/2004 |
| JP | 2005-517928 | 6/2005 |
| JP | 2005-241269 | 9/2005 |
| JP | 2005-337866 | 12/2005 |
| JP | 2005-345302 | 12/2005 |
| JP | 2006-003096 | 1/2006 |
| JP | 2007-012682 A | 1/2007 |
| JP | 2007-218799 | 8/2007 |
| JP | 2008-264569 | 11/2008 |
| JP | 2009-150732 | 7/2009 |
| JP | 2010-014607 | 1/2010 |
| JP | 2010-078366 | 4/2010 |
| WO | WO 88/09026 | 11/1988 |
| WO | WO 93/12403 | 6/1993 |
| WO | WO 1993/12403 | 6/1993 |
| WO | WO 94/08203 | 4/1994 |
| WO | WO 1994/08203 | 4/1994 |
| WO | WO 95/18982 | 7/1995 |
| WO | WO 1995/18982 | 7/1995 |
| WO | WO 96/02549 A1 | 2/1996 |
| WO | WO 1998/010302 | 3/1998 |
| WO | WO 1998/054547 | 12/1998 |
| WO | WO 1999/49322 | 9/1999 |
| WO | WO 2000/002266 | 1/2000 |
| WO | WO 2001/74139 A2 | 10/2001 |
| WO | WO 2001/74139 A3 | 10/2001 |
| WO | WO 2003/036732 A2 | 5/2003 |
| WO | WO 2003/069358 A2 | 8/2003 |
| WO | WO 2003/069358 A3 | 8/2003 |
| WO | WO 2003/107018 A1 | 12/2003 |
| WO | WO 2004/025742 A1 | 3/2004 |
| WO | WO 2004/027436 | 4/2004 |
| WO | WO 2004/072672 A1 | 8/2004 |
| WO | WO 2005/013363 A2 | 2/2005 |
| WO | WO 2005/013363 A3 | 2/2005 |
| WO | WO 2006/056289 A1 | 6/2006 |
| WO | WO 2006/056829 A1 | 6/2006 |
| WO | WO 2006/074989 A2 | 7/2006 |
| WO | WO 2006/083479 | 8/2006 |
| WO | WO 2007/033168 | 3/2007 |
| WO | WO 2007/138508 A1 | 12/2007 |
| WO | WO 2008/008140 A2 | 1/2008 |
| WO | WO 2008/008140 A3 | 1/2008 |
| WO | WO 2008/048379 A1 | 4/2008 |
| WO | WO 2008/121443 A1 | 10/2008 |
| WO | WO 2008 145662 A1 | 12/2008 |
| WO | WO 2008/145662 A1 | 12/2008 |
| WO | WO 2009/108422 A2 | 9/2009 |
| WO | WO 2009/108422 A3 | 9/2009 |
| WO | WO 2009/124969 A1 | 10/2009 |
| WO | WO 2010/014309 A1 | 2/2010 |
| WO | WO 2010/065315 | 6/2010 |
| WO | WO 2010/096367 A1 | 8/2010 |
| WO | WO 2011/011479 | 1/2011 |
| WO | WO 2012/148646 | 11/2012 |
| WO | WO 2013/169455 | 11/2013 |

OTHER PUBLICATIONS

Amended Claims filed on Nov. 26, 2018 for EP Pat. Appl. No. 15853626.8; 4 pages.
Intention to Grant dated Apr. 25, 2019 for EP Pat. Appl. No. 15853626.8-1022; 7 pages.
Allowed Specification dated Jul. 7, 2016 for EP Pat. Appl. No. 15853626.8; 104 pages.
Amended p. 5 Description with tracked changes and New p. 5a Description as filed on Jul. 13, 2018 for EP Application No. 15791066.2; 2 Pages.
Amended Claims with tracked changes as filed on Jul. 13, 2018 for EP Application No. 15791066.2; 11 Pages.
Amended Claims with tracked changes as filed on Jul. 13, 2018 for EP Application No. 15791066.2; 4 Pages.
Response to the Official Communication dated on Mar. 8, 2018 for EP Application No. 15791066.2 as filed on Jul. 13, 2018; 2 Pages.
U.S. Final Office Action dated Jun. 15, 2018 for U.S. Appl. No. 13/946,417; 33 Pages.
Office Action dated Nov. 28, 2018 for U.S. Appl. No. 15/624,898; 35 Pages.
Response to U.S. Non-Final Office Action dated Feb. 8, 2018 for U.S. Appl. No. 13/946,417; Response filed on Apr. 19, 2018; 14 pages.
DCMD Instruction Letter dated May 2, 2018 for JP Pat. Appl. No. 2017-522907: 2 pages.
DCMD Claim Amendments from corresponding U.S. Pat. No. 9,823,002 (not including new claims added in the US) for JP Pat. Appl. No. 2017-522907; 11 pages.
Yuasa and Hara reporting letter dated May 29, 2018 for JP Pat. Appl. No. 2017-522907; 2 pages.
Claims now on File filed on May 23, 2018 for JP Pat. Appl. No. 2017-522907; 12 pages.
U.S. Non-Final Office Action dated Feb. 8, 2018 for U.S. Appl. No. 13/946,417; 37 Pages.
DCMD Instruction letter dated Feb. 13, 2019 for KR Pat. Appl. No. 10-2016-7004180; 2 pages.
21st Century Letter dated Mar. 14, 2019 regarding Voluntary Amendment and Substantive Examination for KR Pat. Appl. No. 10-2016-7004180; 1 page.
21st Century Listing of Pending Claims filed on Mar. 14, 2019 regarding Voluntary Amendment and Substantive Examination for KR Pat. Appl. No. 10-2016-7004180; 13 pages.
Jim Daughton "Spin-Dependent Sensors" Proceedings for the IEEE, vol. 91, No. 5, May 2003; 6 pages.
Amendment under 37 C.F. R. §1.111 for U.S. Appl. No. 13/946,417, filed Jun. 14, 2015; 10 pages.
Amendment Under 37 C.F.R. §1.312 for U.S. Appl. No. 13/946,380 filed Aug. 29, 2017; 3 pages.
Office Communication/Notice to File Corrected Application Papers for U.S. Appl. No. 13/946,380 dated Aug. 28, 2017; 3 pages.
Amendment for U.S. Appl. No. 13/946,380 filed Jun. 22, 2017; 8 pages.
Non-Final Office Action for U.S. Appl. No. 13/946,380 dated May 19, 2017; 20 pages.
PCT International Preliminary Report on Patentability for PCT Appl. No. PCT/US2014/044991 dated Jan. 28, 2016; 9 pages.
A.A. Thornton letter filed Dec. 15, 2017 in response to EPO communication under Rule 161 and 162EPC for EP Pat. Appl. No. 15791066.2; 2 pages.
Amended claims filed on Dec. 15, 2017 in response to EPO communication under Rule 161 and 162EPC for EP Pat. Appl. No. 15791066.2; 5 pages.
U.S. Appl. No. 14/529,606, filed Oct. 31, 2014, Foletto et al.
U.S. Appl. No. 14/529,594, filed Oct. 31, 2014, Drouin et al.
U.S. Appl. No. 14/529,577, filed Oct. 31, 2014, Foletto et al.
U.S. Appl. No. 13/946,830, filed Jul. 19, 2013, Taylor et al.
U.S. Appl. No. 13/946,417, filed Jul. 19, 2013, Burdette et al.
U.S. Appl. No. 13/946,400, filed Jul. 19, 2013, David et al.
U.S. Appl. No. 13/946,380, filed Jul. 19, 2013, Taylor et al.
U.S. Appl. No. 13/946,010, filed Jul. 19, 2013, David et al.
U.S. Appl. No. 13/871,131, filed Apr. 26, 2013, David et al.
U.S. Appl. No. 13/748,999, filed Jan. 24, 2013, Vig et al.

(56) References Cited

OTHER PUBLICATIONS

U.S. Appl. No. 13/526,106, filed Jun. 18, 2012, Vig et al.
U.S. Appl. No. 13/439,094, filed Apr. 4, 2012, Friedrich et al.
U.S. Appl. No. 13/424,618, filed Mar. 20, 2012, Doogue et al.
U.S. Appl. No. 13/398,127, filed Feb. 16, 2012, Cesaretti et al.
U.S. Appl. No. 13/350,970, filed Jan. 16, 2012, Milano et al.
U.S. Appl. No. 13/095,371, filed Apr. 27, 2011, Cesaretti et al.
U.S. Appl. No. 12/968,353, filed Dec. 15, 2010, Donovan et al.
U.S. Appl. No. 12/959,672, filed Dec. 3, 2010, Doogue et al.
U.S. Appl. No. 12/840,324, filed Jul. 21, 2010, Cesaretti et al.
Ahn et al., "A New Toroidal-Meander Type Integrated Inductor With a Multilevel Meander Magnetic Core", IEEE Transactions on Magnetics, vol. 30, No. 1, Jan. 1994, pp. 73-79.
Allegro "Two-Wire True Zero Speed Miniature Differential Peak-Detecting Gear Tooth Sensor", ATS645LSH; 2004; Allegro MicroSystems, Inc., Worcester, MA 01615; pp. 1-14.
Allegro MicroSystems, Inc. Data Sheet A1341; "High Precision, Highly Programmable Linear Hall Effect Sensor IC with EEPROM, Output Protocols SENT and PWM, and Advanced Output Linearization Capabilities", May 17, 2010; 46 pages.
Allegro MicroSystems, Inc. Data Sheet ATS601LSG; "Non-TPOS, Tooth Detecting Speed Sensor", Nov. 1, 2011; 9 pages.
Allegro MicroSystems, Inc., "Gear-Tooth Sensor For Automotive Applications", Aug. 3, 2001.
Allegro MicroSystems, Inc. "High Precision 2-Wire Linear Hall Effect Sensor IC with a Pulse Width Modulated Output", A1354; pp. 1-22.
Allegro MicroSystems, Inc., "Hall-Effect IC Applications Guide", http://www.allegromicro.com/en/Products/Design/an/an27701.pdf, Copyright 1987, 1997, pp. 1-36.
Allegro MicroSystems, Inc.; "27701-AN Data Sheet: Hall-Effect IC Applications Guide", Application Information, Rev. 2; http://www.allegromicro.com/en/products/design/hall-effect-sensor-ic-applications-guide/AN27701.pdf, downloaded Sep. 29, 2010; pp. 1-40.
Allegro MicroSystems, Inc.; "3235 Data Sheet 27633A, Dual-Output Hall-Effect Switch", http://www.datasheetcatalog.org/datasheets/90/205047_DS.pdf; downloaded Sep. 29, 2010; 6 sheets.
Allegro MicroSystems, Inc.; "A1140/41/42/43 Data Sheet: Sensitive Two-Wire Chopper-Stabilized Unipolar Hall-Effect Switches", published Sep. 9, 2004; pp. 1-11.
Allegro MicroSystems, Inc., "A1174 Data Sheets: Ultrasensitive Hall Effect Latch with Internally or Externally Controlled Sample and Sleep Periods for Track Ball and Scroll Wheel Applications", published Jul. 25, 2008; pp. 1-13.
Allegro MicroSystems, Inc.; "A1230 Data Sheet: Ultra-Sensitive Dual-Channel Quadrature Hall-Effect Bipolar Switch", published Mar. 26, 2010; 16 sheets.
Allegro MicroSystems, Inc. "A1351 Data Sheet: High Precision Linear Hall Effect Sensor with a Push/Pull, Pulse Width Modulated Output", published Mar. 7, 2008; pp. 1-23.
Allegro MicroSystems, Inc.; "A1360, A1361 and A1362 Data Sheet: Low-Noise Programmable Linear Hall Effect Sensors with Adjustable Bandwidth (50 kHz Maximum) and Analog Output", published Mar. 18, 2008; pp. 1-25.
Allegro MicroSystems, Inc.; "A3212 Data Sheet: Micropower, Ultra-Sensitive Hall-Effect Switch", published Sep. 22, 2004; pp. 1-12.
Allegro MicroSystems, Inc.; "A3425 Data Sheet: Dual, Chopper-Stabilized, Ultra-Sensitive Bipolar Hall-Effect Switch", published Jun. 28, 2002; pp. 1-10.
Allegro MicroSystems, Inc.; "ATS675LSE Date Sheet: Self-Calibrating TPOS Speed Sensor Optimized for Automotive Cam Sensing Application", published Jul. 11, 2008; pp. 1-13.
Allegro MicroSystems, Inc.; "High Precision Linear Hall Effect Sensor IC with a Push/Pull, Pulse Width Modulated Output", A1351; pp. 1-23.
Allegro MicroSystems, Inc.; "High Precision Linear Hall-Effect Sensor with an Open Drain Pulse Width Modulated Output", A1356; pp. 1-20.
Allegro MicroSystems, Inc.; "Low-Noise Programmable Linear Hall Effect Sensor IC's with Adjustable Bandwidth (50 kHz Maximum) and Analog Output", A1360, A1361 and A1362; pp. 1-25.
Allegro "True Zero-Speed Low-Jitter High Accuracy Gear Tooth Sensor", ATS625LSG; 2005; Allegro MicroSystems, Inc. Worcester, MA 01615; pp. 1-21.
Atherton et al.; "Sensor Signal Conditioning—an IC Designer's Perspective", IEEE Electro International; Apr. 26-28, 1991; pp. 129-134.
Ausserlechner et al.; "Compensation of the Piezo-Hall Effect in Integrated Hall Sensors on (100)-Si", IEEE Sensors Journal, vol. 7, No. 11; Nov. 2007; ISBN: 1530-437X; pp. 1475-1482.
Ausserlechner et al.; "Drift of Magnetic Sensitivity of Small Hall Sensors Due to Moisture Absorbed by the IC-Package", Proceedings of IEEE Sensors, 2004; vol. 1; Oct. 24, 2004; ISBN:0-7803-8692-2; pp. 455-458.
Ausserlechner; "Limits of Offset Cancellation by the Principle of Spinning Current Hall Probe", Proceedings of IEEE Sensors; Oct. 2004; pp. 1117-1120.
Ausserlechner; "The piezo-Half effect in n-silicon for arbitrary crystal orientation", Proceedings of IEEE Sensors; vol. 3; Oct. 24, 2004; ISBN: 0-7803-8692-2; pp. 1149-1152.
Austria MicroSystems; "AS5040 datasheet; 10-Bit Programmable Magnetic Rotary Encoder", Revision 1.1; Jan. 2004; pp. 1-20.
Bahreyni, et al.; "A Resonant Micromachined Magnetic Field Sensor", IEEE Sensors Journal; vol. 7, No. 9, Sep. 2007; pp. 1326-1334.
Banjevic et al; "2D CMOS Integrated Magnetometer Based on the Miniaturized Circular Vertical Hall Device;" International Solid-State Sensors, Actuators and MicroSystems Conference; Transducers; Jun. 21-25, 2009; pp. 877-880.
Banjevic; "High Bandwidth CMOS Magnetic Sensors Based on the Miniaturized Circular Vertical Hall Device;" Sep. 2011; 153 pages.
Barrettino, et al.; "CMOS-Based Monolithic Controllers for Smart Sensors Comprising Micromembranes and Microcantilevers;" IEEE Transactions on Circuits and Systems-I Regular Papers vol. 54, No. 1; Jan. 2007; pp. 141-152.
Baschirotto et al.; "Development and Analysis of PCB Vector 2-D Magnetic Field Sensor System for Electronic Compass;" IEEE Sensors Journal vol. 6, No. 2; Apr. 2006; pp. 365-371.
Bilotti et al.; "Monolithic Magnetic Hall Sensor Using Dynamic Quadrature Offset Cancellation;" IEEE Journal of Solid-State Circuits; vol. 32, Issue 6; Jun. 1997; pp. 829-836.
Blanchard et al.; "Cylindrical Hall Device;" International Electron Devices Meeting; Dec. 8-11, 1996; pp. 541-544.
Bosch, Robert, GMBH Stuttgart; "Active Sensor for ABS/ASR/VDC-Systems with 2-Wire-Current Interface;" Specification TLE4941/TLE4942; Version 5; Jun. 25, 2000; 44 pages.
Bowers et al.; "Microfabrication and Process Integration of Powder-Based Permanent Magnets;" Technologies for Future Micro-Nano Manufacturing Workshop; Aug. 2011; pp. 162-165.
Burger et al.; "New fully integrated 3-D silicon Hall sensor for precise angular-position measurements;" Sensors and Actuators, A 67; May 1998; pp. 72-76.
Demierre, et al.; "Reference Magnetic Actuator for Self-Calibration of a Very Small Hall Sensor Array;" Sensors and Actuators A97-98; Apr. 2002; pp. 39-46.
Drljaca, et al.; "Nonlinear Effects in Magnetic Angular Position Sensor With Integrated Flux Concentrator;" Proc. 23$^{rd}$ International Conference on Microelectronics (MIEL 2002); vol. 1; Yugoslavia; May 12-15, 2002; pp. 223-226.
Dwyer, "Back-Biased Packaging Advances (SE, SG & SH versus SA & SB)," http://www.allegromicro.com/en/Products/Design/packaging_advances/index.asp, Copyright 2008, pp. 1-5.
Dwyer; Allegro MicroSystems, Inc.; "AN296061 Data Sheet: Ring Magnet Speed Sensing for Electronic Power Steering;" published Jul. 21, 2009; pp. 1-4.
Freitas et al.; "Giant magnetoresistive sensors for rotational speed control;" Journal of Applied Physics, vol. 85, No. 8; Apr. 15, 1999; pp. 5459-5461.
Frick, et al; "CMOS Microsystem for AC Current Measurement with Galvanic Isolation;" IEEE Sensors Journal; vol. 3, No. 6; Dec. 2003; pp. 752-760.

(56) References Cited

OTHER PUBLICATIONS

Gerhauser, H., "Intelligente 3D-Magnetfeld Snesorik;" Fraunhofer-Institut for Integrierte Schaltungen IIS; www.iis.fraunhofenr.de/asic/analog; Oct. 2009; 2 pages.
Gilbert "Technical Advances in Hall-Effect Sensing;" Allegro MicroSystems, Inc. Product Description; May 10, 2008; 7 sheets.
Häberli et al.; "Contactless Angle Measurements by CMOS Magnetic Sensor with on Chip Read-Out Circuit;" The 8th International Conference on Solid-State Sensors and Actuators and Eurosensors IX; Jan. 25-29, 1995; pp. 134-137.
Häberli et al.; "Two-Dimensional Magnetic Microsensor with On-Chip Signal Processing for Contactless Angle Measurement;" IEEE Journal of Solid-State Circuits, vol. 31, No. 12; Dec. 1996; pp. 1902-1907.
Halg; "Piezo-Hall Coefficients of n-Type Silicon;" Journal of Applied Physics; vol. 64, No. 1; Jul. 1, 1988; pp. 276-282.
Hiligsmann et al.; "Monolithic 360 Degrees Rotary Position Sensor IC;"2004 IEEE Proceedings of Sensors, vol. 3; Oct. 24-27, 2004; pp. 1137-1142.
Honeywell International, Inc., "Hall Effect Sensing and Application," Micro Switch Sensing and Control, Chapter 3, http://content.honeywell.com/sensing/prodinfo/solidstate/technical/hallbook.pdf, date unavailable but believed to be before Jan. 2008, pp. 9-18.
Hosticka; "CMOS Sensor Systems;" Sensors and Actuators A66; Apr. 1998; pp. 335-341.
Infineon Product Brief, TLE 4941plusC, "Differential Hall IC for Wheel Speed Sensing" Oct. 2010 www.infineon.com/sensors, 2 pages.
Infineon Technologies; "Differential Two-Wire Hall Effect Sens IC;" TLE4942 Preliminary Data Sheet; Jun. 2000; pp. 1-13.
Johnson et al, "Hybrid Hall Effect Device," Appl. Phys. Lett., vol. 71, No. 7, Aug. 1997, pp. 974-976.
Kanda et al.; "The Piezo-Hall Effect in n-Silicon;" 22nd International Conference on the Physics of Semiconductors; vol. 1, Jan. 1995; pp. 89-92.
Kapser et al.; "Integrated GMR Based Wheel Speed Sensor for Automotive Applications;" IEEE 2007 Conference on Sensors; Oct. 2007; pp. 848-851.
Kejik et al.; "Circular Hall Transducer for Angular Position Sensing;" International Solid-State Sensors, Actuators and MicroSystems Conference; Transducers; Jun. 2007; pp. 2593-2596.
Kejik, P. et al.; "Purley CMOS Angular Position Sensor Based on a New Hall Microchip;" 34th Annual Conference of IEEE Industrial Electronics; IECON; Nov. 10-13, 2008; pp. 1777-1781.
Kejik, P.et al.; "Ultra Low-Power Angular Position Sensor for High-Speed Portable Applications;" 2009 IEEE Sensors Conference; Oct. 25-28, 2009; pp. 173-176.
Krammerer et al.: "A Hall effect sensors network insensitive to mechanical stress;" Proceedings of IEEE Sensors; vol. 3, Oct. 2004; pp. 1071-1074.
Lagorce et al.; "Magnetic and Mechanical Properties of Micromachined Strontium Ferrite/Polyimide Composites;" Journal of Microelectromechanical Systems; vol. 6, No. 4; Dec. 1997; pp. 307-312.
Lequesne et al.; "High-Accuracy Magnetic Position Encoder Concept;" IEEE Transactions on Industry Applications; vol. 35, No. 3; May/Jun. 1999; pp. 568-576.
Lou Law; "Angle Position Sensing with 2-Axis Hall ICs;" Sensors Magazine, vol. 20, No. 3; Mar. 2003; 7 sheets.
Maganani et al.; "Mechanical Stress Measurement Electronics Based on Piezo-Resistive and Piezo-Hall Effects;" 9th International Conference on Electronics, Circuits and Systems 2002; vol. 1; SBN: 0-7803-7596-3; Dec. 2002; pp. 363-366.
Manic et al.; "Short and Long-Term Stability Problems of Hall Plates in Plastic Packages;" IEEE 38th Annual International Reliability Physics Symposium: Apr. 2000; pp. 225-230.
Manic; "Drift in Silicon Integrated Sensors and Circuits Due to the Thermo-Mechanical Stresses;" Lausanne, École Polytechnique Fédérale De Lausanne 2000; Part 1 of 2; 74 pages.

Manic; "Drift in Silicon Integrated Sensors and Circuits Due to the Thermo-Mechanical Stresses:" Lausanne, École Polytechnique Fédérale De Lausanne 2000; Part 2 of 2; 102 pages.
Masson et al.; "Muititurn and high precision through-shaft magnetic sensors;" Sensor + Text Conference; Proceedings II; May 2009; pp. 41-46.
Melexis Microelectronic Integrated Systems; MLX90333; "Triaxis 3D-Joystick Position Sensor;" Data Sheet; Mar. 2009; 43 pages.
Melexis Microelectronic Systems, Hall Applications Guide, Section 3—Applications,1997 (48 pages).
Melexis MLX 90324; ""Under-the-Hood" Triaxis Rotary Position feat. SENT Protocol;" 3901090324 Data Sheet; Dec. 2008; 40 pages.
Memsic Corporation; AN-00MM-001; "Magnetometer Fundamentals;" Jun. 2008; 6 pages.
Memsic Corporation; AN-00MM-002; "Magnetometer Soldering Methodology;" Jun. 2008; 2 pages.
Memsic Corporation; AN-00MM-003; "Magnetic Sensor Calibration;" Mar. 2008; 5 pages.
Memsic Corporation; AN-00MM-004: "Electronic Tilt Compensation;" Mar. 2008; 5 pages.
Memsic Corporation; AN-00MM-005; "Magnetic Sensor Placement Guidelines;" Oct. 2008; 2 pages.
Memsic Corporation; MMC312xMQ; "Tri-axis Magnetic Sensor, with I²C Interface;" Aug. 14, 2008; 9 pages.
Memsic Corporation; MMC314xMQ; "Ultra Small 3-axis Magnetic Sensor, with I²C Interface;" Mar. 31, 2010; 8 pages.
Metz et al.; "Contactless Angle Measurement Using Four Hall Devices on Single Chip;"; International Conference on Solid State Sensors and Actuators; Transducers; vol. 1; Jun. 16-19, 1997; pp. 385-388.
Micronas GmbH; "HAL®3625 Programmable Direct Angle Sensor;" Product Information; Sep. 2009; 2 pages.
Motz et al.; "An Integrated Magnetic Sensor with Two Continuous-Time ΔΣ-Converters and Stress Compensation Capability," IEEE International Solid-State Circuits Conference; Digest of Technical Papers; Feb. 6, 2006; ISBN: 1-4244-0079-1; pp. 1151-1160.
Motz, et al.; "A Chopped Hall Sensor with Small Jitter and Programmable "True Power-On" Function;" IEEE Journal of Solid-State Circuits; vol. 40, No. 7; Jul. 2005; pp. 1533-1540.
Motz, et al.; "An Integrated Hall Sensor Platform Design for Position, Angle and Current Sensing;" IEEE Sensors 2006; Exco, Daegu, Korea / Oct. 22-25, 2006; pp. 1008-1011.
Munter; "A Low-offset Spinning-current Hall Plate;" Sensors and Actuators, vol. A21-A23; Jan. 1990; pp. 743-746.
Munter; "Electronic Circuitry for a Smart Spinning-current Hall Plate with Low Offset;" Sensors and Actuators A; Jun. 1991;.pp. 747-751.
Novotechnik Siedle Group; "How New Angular Positioning Sensor Technology Opens a Broad Range of New Applications;" Vert-X Technology; Dec. 2001; pp. 1-5.
Oniku et al., "High-Energy-Density Permanent Micromagnets Formed From Heterogeneous Magnetic Powder Mixtures", Interdisciplinary MicroSystems Group, Dept. of Electrical and Computer Engineering, University of Florida, Gainesville, FL 32611, USA; Preprint of MEMS 2012 Conf. Paper, 4 pages.
Oniku et al.; "High-Energy-Density Permanent Micromagnets Formed From Heterogeneous Magnetic Powder Mixtures:" IEEE 25th International Conference on Micro Electro Mechanical Systems, Jan. 2012; 4 pages.
Paranjape et al.; "A CMOS-compatible 2-D vertical Hall magnetic-field sensor using active carrier confinement and post-process micromachining;" The 8th International Conference on Solid-State Sensors and Acutators, Physical vol. 53, Issues 1-3; May 1996; pp. 278-283.
Park et al.: "Batch-Fabricated Microinductors with Electroplated Magnetically Anisotropic and Laminated Alloy Cores", IEEE Transactions on Magnetics, vol. 35, No. 5, Sep. 1999, 10 pages.
Park et al.; "Ferrite-Based Integrated Planar Inductors and Transformers Fabricated at Low Temperature;" IEEE Transactions on Magnetics; vol. 33, No. 5; Sep. 1997; pp. 3322-3324.
Partin et al.; "Temperature Stable Hall Effect Sensors;" IEEE Sensors Journal, vol. 6, No. 1; Feb. 2006; pp. 106-110.

(56) References Cited

OTHER PUBLICATIONS

Pastre, et al.; "A Hall Sensor Analog Front End for Current Measurement with Continuous Gain Calibration;" IEEE Sensors Journal; vol. 7, No. 5; May 2007; pp. 860-857.
Pastre, et al.; "A Hall Sensor-Based Current Measurement Microsystem With Continuous Gain Calibration;" Research in Microelectronics and Electronics, IEEE vol. 2; Jul. 25, 2005; ISBN: 0-7803-9345-7; pp. 95-98.
Petoussis et al.; "A Novel Hall Effect Sensor Using Elaborate Offset Cancellation Method;" Sensors & Transducers Journal, vol. 100, Issue 1; Jan. 2009; pp. 85-91.
Petrie; "Circular Vertical Hall Magnetic Field Sensing Element and Method with a Plurality of Continuous Output Signals;" U.S. Appl. No. 13/035,243, filed Feb. 25, 2011; 56 pages.
Popovic; "Not-plate-like Hall magnetic sensors and their applications;" Sensors and Actuators A: Physical, vol. 85, issues 1-3; Aug. 2000; pp. 9-17.
Popovic; "Sensor MicroSystems;" Proc. 20$^{th}$ International Conference on Microelectronics (MWIL 95); vol. 2, NIS, Serbia, 12-14; Sep. 1995; pp. 531-537.
Randhawa; "Monolithic integrated Hall Devices in Silicon Circuits;" Microelectronics Journal; vol. 12, No. 6; Sep. 14-17, 1981; pp. 24-29.
Raymond, S, et al.; "True 2D CMOS Integrated Hall Sensor," 2007 IEEE Sensors Conference; Oct. 28-31, 2007; pp. 860-863.
Roumenin et al.; "Vertical Hall Effect Devices in the Basis of Smart Silicon Sensors;" IEEE Workshop on Intelligent Data Acquisition and Advanced Computing Systems: Technology and Applications; Sep. 5-7, 2005; pp. 55-58.
Roumenin; "Magnetic sensors continue to advance towards perfection;" Sensors and Actuators A: Physical, vol. 46-47, Issues 1-3; Jan.-Feb. 1995; pp. 273-279.
Ruther et al.; "Integrated CMOS-Based Sensor Array for Mechanical Stress Mapping;" 5$^{th}$ IEEE Conference on Sensors, Oct. 2007; pp. 1131-1134.
Ruther et al.; "Thermomagnetic Residual Offset in Integrated Hall Plates;" IEEE Sensors Journal; vol. 3, No. 6; Dec. 2003; pp. 693-699.
Sargent; "Switched-capacitor IC controls feedback loop;" EDN; Design Ideas; Feb. 17, 2000; pp. 154 and 156.
Schneider et al.; "Temperature Calibration of CMOS Magnetic Vector Probe for Contactless Angle Measurement System;" International Electron Devices Meeting; Dec. 8-11, 1996; pp. 533-536.
Schott et al.; "Linearizing Integrated Hall Devices;" 1997 International Conference on Solid-State Sensors and Actuators, Jun. 16-19, 1997; pp. 393-396.
Schott, et al.; "CMOS Single-Chip Electronic Compass with Microcontroller;" IEEE Journal of Solid-State Circuits; vol. 42, No. 12; Dec. 2007; pp. 2923-2933.
Sensima technology sa; "CVHD: a new concept of Angular Position Sensor;" Slide Presentation for Allegro MicroSystems; Mar. 2009; 17 sheets.
Sentron; AN-101; "Angular position sensing with 2-Axis Hall IC 2SA-10;" Feb. 12, 2004; http://www.diegm.uniud.it/petrella/Azionamenti%20Elettrici%20ll/Sensori%20e%20trasduttori/Date%20Sheet%20-%202SA-10.pdf; pp. 1-7.
Simon et al.; "Autocalibration of Silicon Hall Devices;" 8$^{th}$ International Conference on Solid-State Sensors and Actuators; vol. 2; Jun. 25, 1995; pp. 237-240.
Smith et al.; "Low Magnetic Field Sensing with GMR Sensors;" Sensor Magazine; Part 1; Sep. 1999; http://archives.sensorsmag.com/articles/0999/76mail.shtml; pp. 1-8.
Smith et al.; "Low Magnetic Field Sensing with GMR Sensors;" Sensor Magazine; Part 2; Oct. 1999; http://archives.sensorsmag.com/articles/1099/84/mail.shtml; pp. 1-11.
Steiner et al.; "Double-Hall Sensor with Self-Compensated Offset" International Electron Devices Meeting; Dec. 7, 1997; ISBN: 0-7803-4100-7; pp. 911-914.
Steiner et al; Offset Reduction in Hall Devices by Continuous Spinning Current Method; Sensors and Actuators A66; 1998; pp. 167-172.
Stellrecht et al.; Characterization of Hygroscopic Swelling Behavior of Mold Compounds and Plastic Packages; IEEE Transactions on Components and Packaging Technologies; vol. 27, No. 3; Sep. 2004; pp. 499-506.
Tian et al; "Multiple Sensors on Pulsed Eddy-Current Detection for 3-D Subsurface Crack Assessment;" IEEE Sensors Journal, vol. 5, No. 1; Feb. 2005; pp. 90-96.
Trontelj et al; "CMOS Integrated Magnetic Field Source Used as a Reference in Magnetic Field Sensors on Common Substrate;" WEP 1-6; IMTC; May 1994; pp. 461-463.
Van der Meer; et al; "CMOS quad spinning-current Hall-sensor system for compass application;" IEEE Proceedings of Sensors, vol. 3; Oct. 24-27, 2004; pp. 1434-1437.
Vogelgesang et al.; Robert Bosch GmbH; "GMR sensors in automotive application;" CS-SNS/ECS Slides Presentation; Mar. 2, 2005; 16 sheets.
Volder; "The CORDIC Trigonometric Computing Technique;" The Institute of Radio Engineers, Inc.; IRE Transactions on Electronic Computers, vol. EC, Issue 3; Sep. 1959; pp. 226-230.
Wu, et al.; "A Chopper Current-Feedback Instrumentation Amplifier with a 1mHz 1/f Noise Corner and an AC-Coupled Ripple-Reduction Loop;" IEEE International Solid-State Circuits Conference; Feb. 10, 2009; pp. 322-324.
Zou et al.; "Three-Dimensional Die Surface Stress Measurements in Delaminated and Non-Delaminated Plastic Packages;" 48th Electronic Components and Technology Conference; May 25, 1998; pp. 1223-1234.
Amendment filed on Apr. 11, 2017 for U.S. Appl. No. 13/946,380; 18 pages.
Amendment under PCT Article 19 filed on Oct. 5, 2010 in PCT/US2010/024256; 18 pages, 18 pages.
CN First Office Action (with English translation) dated Aug. 29, 2012; for Chinese Pat. App. No. 200980106535.4; 8 pages.
CN Notice of Allowance (with English translation) dated Jul. 4, 2011; for Chinese Pat. App. No. 200880008895.3; 4 pages.
CN Notice of Completing Formalities for Patent Registration (with English translation); dated Mar. 6, 2013; for Chinese Pat. App. No. 200920783766.7; 4 pages.
CN Office Action (with English translation) dated Sep. 9, 2010; for Chinese Pat. App. No. 200880008895.3; 12 pages.
CN Response to Office Action received Mar. 28, 2011; for Chinese Pat. App. No. 200880008895.3; 7 pages.
CN Second Office Action (with English translation) dated Apr. 15, 2013; for Chinese Pat. App. No. 200980106535.4; 9 pages.
Corrected Notice of Allowability dated Aug. 9, 2013; for U.S. Appl. No, 12/840,324; 6 pages.
Corrected Notice of Allowability dated Jul. 17, 2013; for U.S. App. No. 12/840,324; 7 pages.
Email from NTD Patent and Trademark Office dated Jun. 11, 2012; for Chinese Pat. App. No. 200920783766.7; 2 pages.
EP Board of Appeals Datasheet for the Decision dated Nov. 22, 2007; for European Pat. App. No. 03 710 766.1; 22 pages.
EP Board of Appeals Decision dated Feb. 28, 2005; for European Pat. App. No. 03 710 766.1; 14 pages.
EP Communication for the Board of Appeals dated Apr. 30, 2009; for European Pat. App. No. 03 710 766.1; 2 pages.
EP Decision to Grant Patent dated Sep. 5, 2013; for European Pat. App. No. 10739429.8; 2 pages.
EP Official Communication; dated Feb. 23, 2012; for EP. Pat. App. No. 10739429.8; 2 pages.
EP Preliminary Amendment from the Board of Appeal dated May 26, 2009; for European Pat. App. No. 03 710 766.1; pages.
EP Response filed on Dec. 9, 2016 to Official Communication dated Oct. 14, 2016 regarding European Pat. Appl. No. 14742067.3; 23 pages.
EP Response to Written Opinion dated Apr. 18, 2011; for European Pat. App. No. 09789890.2; 11 pages.
EP Search Report dated Apr. 5, 2017 for EP Pat. Appl. No. 16192498.0; 10 pages.

(56) References Cited

OTHER PUBLICATIONS

EP Search Report dated Jul. 4, 2011; for European Pat. App. No. 13169661.9; 11 pages.
Final Office Action dated Aug. 28, 2015; for U.S. Appl. No. 13/946,417; 34 pages.
Final Office Action dated Dec. 15, 2015; for U.S. Appl. No. 13/946,380; 36 pages.
Final Office Action dated Feb. 12, 2013; for U.S. Appl. No. 12/840,324; 19 pages.
Final Office Action dated Jan. 12, 2017 for U.S. Appl. No. 13/946,380; 32 pages.
Final Office Action dated Jan. 4, 2017 for U.S. Appl. No. 14/529,594; 38 pages.
Final Office Action dated Jul. 1, 2013; for U.S. Appl. No. 12/183,367; 6 pages.
Final Office Action dated Jul. 23, 2013; for U.S. Appl. No. 12/183,367; 8 pages.
Final Office Action dated May 10, 2012; for U.S. Appl. No. 12/328,798; 17 pages.
Final Office Action dated May 2, 2013; for U.S. Appl. No. 12/183,387; 15 pages.
Final Office Action dated Oct. 6, 2016; for U.S. Appl. No. 13/946,417; 45 pages.
International Search Report and Written Opinion dated Nov. 4, 2014 for Int'l PCT Application PCT/US2014/044993; 13 pages.
International Search Report and Written Opinion dated Oct. 28, 2014 for Int'l PCT Application PCT/US2014/044991; 12 pages.
International Search Report and Written Opinion of the ISA dated Aug. 3, 2016; for PCT Application No. PCT/US2015/055230; 12 pages.
JP First Office Action (English translation) received Jul. 26, 2012; for Japanese Pat. App. No. 2010-201028; 5 pages.
JP First Office Action (with English translation) dated May 3, 2012; for Chinese Pat. App. No. 200920783766.7; 13 pages.
JP Notice of Allowance dated Nov. 8, 2011; for Japanese Pat. App. No. 2009-568426; 3 pages.
JP Notice of Reasons for Rejection (English translation) for Japanese Pat. App. No. 2010-547666; 4 pages.
JP Notice of Reasons for Rejection; dated Jul. 16, 2013; for Japanese Pat. App. No. 2011-539582; 3 pages.
JP Response to First Office Action (with English translation) received Oct. 16, 2012; for Japanese Pat. App. No. 2010-201028; 10 pages.
JP Second Office Action (English translation) received Aug. 7, 2013; for Japanese Pat. App. No. 2010-201028; 3 pages.
JP Second Office Action dated Jan. 18, 2013; for Chinese Pat. App. No. 200920783766.7; 8 pages.
Letter from NTD Patent & Trademark Agency Limited dated Mar. 28, 2011; for Chinese Pat. App. No. 200880008895.3; 1 page.
Letter from NTD Patent & Trademark Agency Limited dated Oct. 13, 2010; for Chinese Pat. App. No. 200880008895.3; 2 pages.
Letter from NTD Patent and Trademark Agency dated Feb. 6, 2013; for Chinese Pat. App. No. 200920783766.7; 2 pages.
Letter from NTD Patent and Trademark Agency dated Jul. 11, 2013; for Chinese Pat. App. No. 200980106535.4; 1 pages.
Letter from NTD Patent and Trademark Agency dated Mar. 21, 2013; for Chinese Pat. App. No. 200920783766.7; 1 page.
Letter from NTD Patent and Trademark Office dated Jan. 19, 2013; for Chinese Pat. App. No. 200980106535.4; 1 page.
Letter from NTD Patent and Trademark Office dated May 21, 2013; for Chinese Pat. App. No. 200980106535.4; 2 pages.
Letter from NTD Patent and Trademark Office dated Oct. 10, 2012; for Chinese Pat. App. No. 200980106535.4; 2 pages.
Letter from NTD Patent and Trademark Office dated Oct. 18, 2012; for Chinese Pat. App. No. 200920783766.7; 1 pages.
Letter from Yuasa and Hara dated Apr. 23, 2009; Japanese Response to Second Office Action filed Mar. 25, 2009; for JP Pat. App. No. 2009-568426; 8 pages.
Letter from Yuasa and Hara dated Aug. 16, 2013; for Japanese Pat. App. No. 2011-539582; 3 pages.
Letter from Yuasa and Hara dated Aug. 7, 2013; for Japanese Pat. App. No. 2010-201028; 4 pages.
Letter from Yuasa and Hara dated Dec. 12, 2008; Japanese Second Office Action; for JP Pat. App. No. 2009-568426; 4 pages.
Letter from Yuasa and Hara dated Jan. 17, 2011; Japanese Third Office Action dated Feb. 16, 2011; for JP Pat. App. No. 2009-568426; 5 pages.
Letter from Yuasa and Hara dated Jul. 26, 2012; for Japanese Pat. App. No. 2010-201028; 5 pages.
Letter from Yuasa and Hara dated Jun. 4, 2008; Japanese First Office Action issued Apr. 7, 2008; for JP Pat. App. No. 2009-568426; 5 pages.
Letter from Yuasa and Hara dated Jun. 9, 2011; Japanese Response to Third Office Action filed May 13, 2011; for JP Pat. App. No. 2009-568426; 27 pages.
Letter from Yuasa and Hara dated May 27, 2013; for Japanese Pat. App. No. 2010-547666; 2 pages.
Letter from Yuasa and Hara dated Oct. 16, 2012; for Japanese Pat. App. No. 2010-201028; 2 pages.
Letter from Yuasa and Hara dated Oct. 21, 2008; Japanese Response to First Office Action filed Sep. 22, 2008; for JP Pat. App. No. 2009-568426; 14 pages.
Letter to NTD Patent and Trademark Agency dated Feb. 6, 2013; for Chinese Pat. App. No. 200920783766.7; 2 pages.
Letter to NTD Patent and Trademark Agency dated Jun. 19, 2013; for Chinese Pat. App. No. 200980106535.4; 11 pages.
Letter to NTD Patent and Trademark Office dated Aug. 29, 2012; for Chinese Pat. App. No. 200920783766.7; 20 pages.
Letter to NTD Patent and Trademark Office dated Dec. 11, 2012; for Chinese Pat. App. No. 200980106535.4; 8 pages.
Non-Final Office Action dated Dec. 3, 2015; for U.S. Appl. No. 13/946,417; 29 pages.
Non-final Office Action dated May 19, 2017 for U.S. Appl. No. 14/529,606; 11 pages.
Notice of Allowance dated Dec. 10, 2012; for U.S. Appl. No. 12/706,318; 9 pages.
Notice of Allowance dated Feb. 21, 2013; for U.S. Appl. No. 13/241,380; 9 pages.
Notice of Allowance dated Feb. 11, 2011; for U.S. Appl. No. 12/037,393; 8 pages.
Notice of Allowance dated Jul. 13, 2017 for U.S. Appl. No. 13/946,380; 11 pages.
Notice of Allowance dated Jul. 19, 2011; for U.S. Appl. No. 12/959,672; 8 pages.
Notice of Allowance dated Jun. 27, 2011; for U.S. Appl. No. 12/959,672; 8 pages.
Notice of Allowance dated Mar. 1, 2013; for U.S. Appl. No. 12/328,798; 10 pages.
Notice of Allowance dated Mar. 10, 2017 for U.S. Appl. No. 14/529,577; 8 pages.
Notice of Allowance dated May 10, 2017 for U.S. Appl. No, 14/529,594; 8 pages.
Notice of Allowance dated May 20, 2017 for U.S. Appl. No. 14/529,594; 8 pages.
Notice of Allowance dated May 24, 2013; for U.S. Appl. No. 12/840,324; 12 pages.
Notice of Allowance dated Nov. 3, 2010; for U.S. Appl. No. 12/037,393; 7 pages.
Notice of Allowance dated Oct. 26, 2012; for U.S. Appl. No. 12/328,798; 13 pages.
Notice of Allowance dated Oct. 28, 2013; for U.S. Appl. No. 13/095,371; 19 pages.
Notice of Allowance dated Oct. 29, 2012; for U.S. Appl. No. 13/241,380; 23 pages.
Notice of Allowance dated Sep. 6, 2013; for U.S. Appl. No. 12/183,367; 7 pages.
Office Action dated Aug. 26, 2016 for U.S. Appl. No. 13/946,380, 40 pages.
Office Action dated Dec. 14, 2009; for U.S. Appl. No. 12/328,798; 20 pages.
Office Action dated Feb. 2, 2011; for U.S. Appl. No. 12/959,672; 13 pages.

(56) References Cited

OTHER PUBLICATIONS

Office Action dated Feb. 22, 2012; for U.S. Appl. No. 13/241,380; 23 pages.
Office Action dated Jan. 18, 2013; for U.S. Appl. No. 12/360,889; 7 pages.
Office Action dated Jul. 14, 2016 for U.S. Appl. No. 14/529,594; 94 pages.
Office Action dated Jul. 19, 2012; for U.S. Appl. No. 13/241,380; 18 pages.
Office Action dated Jul. 6, 2012; for U.S. Appl. No. 12/706,318; 29 pages.
Office Action dated Jul. 9, 2015; for U.S. Appl. No. 13/946,380; 63 pages.
Office Action dated Jun. 11, 2013; for U.S. Appl. No. 13/095,371; 31 pages.
Office Action dated Jun. 28, 2013; for U.S. Appl. No. 12/360,889; 7 pages.
Office Action dated Jun. 30, 2010; for U.S. Appl. No. 12/037,393; 21 pages.
Office Action dated Jun. 7, 2012; for U.S. Appl. No. 12/360,889; 9 pages.
Office Action dated Mar. 15, 2017 from U.S. Appl. No. 13/946,417; 43 Pages.
Office Action dated Mar. 20, 2015; for U.S. Appl. No. 13/946,417; 54 pages.
Office Action dated May 12, 2011; for U.S. Appl. No. 12/183,367; 17 pages.
Office Action dated May 19, 2017 for U.S. Appl. No. 13/946,380; 20 pages.
Office Action dated May 24, 2010; for U.S. Appl. No. 12/328,798; 22 pages.
Office Action dated Nov. 3, 2016 regarding U.S. Appl. No. 14/529,606; 12 pages.
Office Action dated Nov. 9, 2016 regarding U.S. Appl. No. 14/529,577; 14 pages.
Office Action dated Oct. 20, 2011; for U.S. Appl. No. 12/183,367; 11 pages.
Office Action dated Oct. 31, 2011; for U.S. Appl. No. 12/328,798; 23 pages.
Office Action dated Sep. 11, 2012; for U.S. Appl. No. 12/840,324; 30 pages.
Office Action dated Jan. 15, 2014 for U.S. Appl. No. 13/468,478, 36 pages.
Office Action/Restriction Requirement dated Apr. 12, 2012; for U.S. Appl. No. 12/183,367; 6 pages.
Office Action/Restriction Requirement dated May 14, 2010; for U.S. Appl. No. 12/037,393; 6 pages.
Office Action/Restriction Requirement dated Oct. 23, 2009; for U.S. Appl. No. 12/328,798; 7 pages.
PCT International Preliminary Report and Written Opinion on Patentability of the ISA dated Aug. 7, 2007; for PCT/US2006/000363; 9 pages.
PCT International Preliminary Report on Patentability and Written Opinion of the ISA dated Jan. 28, 2016; For PCT Pat. App. No. PCT/US2014/044236; 17 pages.
PCT International Preliminary Report on Patentability and Written Opinion dated Sep. 10, 2010 for PCT/US2009/031776.
PCT International Preliminary Report on Patentability and Written Opinion for PCT/US2009/048237 dated Feb. 10, 2011, 8 pages.
PCT International Preliminary Report on Patentability and Written Opinion of the ISA; dated Jun. 7, 2011; for PCT Pat. App. No. PCT/US2009/065044; 7 pages.
PCT International Preliminary Report on Patentability and Written Opinion of the ISA dated Sep. 1, 2011; for PCT Pat. App. No. PCT/US2010/024256; 9 pages.
PCT International Preliminary Report on Patentability and Written Opinion of the ISA; dated Feb. 2, 2012; for PCT Pat. App. No. PCT/US2010/042694; 11 pages.
PCT International Preliminary Report on Patentability for PCT/US2008/053551; dated Oct. 8, 2009; 7 pages.
PCT International Search Report and Written Opinion of the ISA dated Feb. 4, 2016; For PCT Pat. App. No. PCT/US2015/055474; 15 pages.
PCT International Search Report and Written Opinion of the ISA dated Jan. 15, 2016; For PCT Pat. App. No. PCT/US2015/055236; 12 pages.
PCT International Search Report and Written Opinion of the ISA dated Dec. 23, 2015; For PCT App. No. PCT/US2015/055233; 12 pages.
PCT Invitation to Pay Additional Fees and Partial Search Report dated Nov. 4, 2014; for PCT Pat. App. No. PCT/US2014/044236; 7 pages.
PCT Search Report and the Written Opinion of the ISA dated Jul. 17, 2013; for PCT/US2013/037065; 13 pages.
PCT Search Report and Written Opinion for PCT/US2009/065044 dated Jan. 7, 2010; 11 pages.
PCT Search Report and Written Opinion of the ISA dated Dec. 19, 2014; for PCT Pat. App. No. PCT/US2014/044236; 23 pages.
PCT Search Report and Written Opinion of the ISA dated Jun. 22, 2012 for PCT Pat. App. No. PCT/US2012/032315; 16 pages.
PCT Search Report and Written Opinion of the ISA dated Jul. 15, 2008 for PCT/US2008/05355 ; 11 pages.
PCT Search Report and Written Opinion of the ISA for PCT/US2010/024256 dated Aug. 11, 2010; 11 pages.
PCT Search Report and Written Opinion of the ISA for PCT/US2010/042694 dated Sep. 27, 2010; 13 pages.
PCT Search Report dated Nov. 19, 2003 for PCT Pat. App. No. PCT/US03/02489; 5 pages.
PCT Search Report for PCT/US2006/000363 dated May 11, 2006.
PCT Search Report of the ISA for PCT/US2009/031776 dated Oct. 23, 2009.
PCT Search Report of the ISA for PCT/US2009/048237 dated Aug. 25, 2009; 2 pages.
Preliminary Amendment flied on Apr. 21, 2017 for U.S. Appl. No. 14/529,606; 12 pages.
Request for Continued Examination dated Aug. 9, 2012; for U.S. Appl. No. 12/328,798; 1 page.
Request for Continued Examination dated Jan. 24, 2013; for U.S. Appl. No. 13/241,380; 3 pages.
Request for Continued Examination dated Jan. 25, 2011; for U.S. Appl. No. 12/037,393; 1 page.
Request for Continued Examination dated Jul. 12, 2011; for U.S. Appl. No. 12/959,672; 2 pages.
Request for Continued Examination dated Nov. 9, 2015; For U.S. Appl. No. 13/946,417; 3 pages.
Request for Continued Examination filed on Apr. 11, 2017 for U.S. Appl. No. 13/946,380; 3 pages.
Request for Continued Examination filed on Apr. 21, 2017 for U.S. Appl. No. 14/529,606; 3 pages.
Response to Office Action dated Mar. 3, 2016 and filed on Dec. 3, 2015; For U.S. Appl. No. 13/946,417, 17 pages.
Response to Final Office Action dated Aug. 28, 2015 and filed Nov. 9, 2015; For U.S. Appl. No. 13/946,417; 14 pages.
Response to Office Action dated Jul. 9, 2015 and filed on Nov. 9, 2015;'For U.S. Appl. No. 13/946,380, 26 pages.
Response to Office Action dated Mar. 20, 2015 and filed on Jun. 19, 2015; for U.S. Appl. No. 13/946,417; 15 pages.
Response to the Non-Final Office Action dated Aug. 26, 2016 and filed on Nov. 9, 2016; for U.S. Appl. No. 13/946,380; 19 pages.
Response to Chinese First Office Action dated Aug. 29, 2012; for Chinese Pat. App. No. 200980106535.4; 12 pages.
Response to EP Official Communication dated Feb. 23, 2012 for EP. Pat. App. No. 10739429.8; filed on Sep. 4, 2012, 21 pages.
Response to Final Office Action dated Feb. 12, 2013; for U.S. Appl. No. 12/840,324; 12 pages.
Response to Final Office Action dated May 10, 2012; for U.S. Appl. No. 12/328,798; 6 pages.
Response to Final Office Action dated May 2, 2013; for U.S. Appl. No. 12/183,367; 8 pages.
Response to Final Office Action filed on Mar. 31, 2017 for U.S. Appl. No. 14/529,594, 16 pages.
Response to Japanese First Office Action dated May 3, 2013; for Chinese Pat. App. No. 200920783766.7; 9 pages.

(56) References Cited

OTHER PUBLICATIONS

Response to Japanese Second Office Action (with English translation) dated Jan. 18, 2013; for Chinese Pat. App. No. 200920783766.7; 7 pages.
Response to Oct. 6, 2016 Final Office Action from U.S. Appl. No. 13/946,417 filed Jan. 24, 2017; 14 Pages.
Response to Office Action dated Dec. 14, 2009; for U.S. Appl. No. 12/328,798; 22 pages.
Response to Office Action dated Feb. 2, 2011; for U.S. Appl. No. 12/959,672; 8 pages.
Response to Office Action dated Feb. 22, 2012; for U.S. Appl. No. 13/241,380; 16 pages.
Response to Office Action dated Jan. 18, 2013; for U.S. Appl. No. 12/360,889, 6 pages.
Response to Office Action dated Jul. 19, 2012; for U.S. Appl. No. 13/241,380; 6 pages.
Response to Office Action dated Jul. 23, 2013; for U.S. Appl. No. 12/183,367; 13 pages.
Response to Office Action dated Jul. 6, 2012; for U.S Appl. No. 12/706,318; 12 pages.
Response to Office Action dated Jun. 11, 2013; for U.S. Appl. No. 13/095,371; 25 pages.
Response to Office Action dated Jun. 28, 2013; for U.S. Appl. No. 12/360,889; 15 pages.
Response to Office Action dated Jun. 30, 2010; for U.S. App. No. 12/037,393; 34 pages.
Response to Office Action dated Jun. 7, 2012; for U.S. Appl. No. 12/360,889; 11 pages.
Response to Office Action dated May 12, 2011; for U.S. Appl. No. 12/183,367; 13 pages.
Response to Office Action dated May 24, 2010; for U.S. Appl. No. 12/328,798; 23 pages.
Response to Office Action dated Oct. 20, 2011; for U.S. Appl. No. 12/183,367; 15 pages.
Response to Office Action dated Oct. 31, 2011; for U.S. Appl. No. 12/328,798; 14 pages.
Response to Office Action dated Sep. 11, 2012; for U.S. Appl. No. 12/840,324; 15 pages.
Response to Office Action filed Jan. 27, 2017 for U.S. Appl. No. 14/529,577;18 pages.
Response to Office Action filed Oct. 14, 2016 for U.S. Appl. No. 14/529,594; 29 pages.
Response to Office Action filed on Jan. 26, 2017 for U.S. Appl. No. 14/529,606; 19 pages.
Response to Office Action filed on Jul. 5, 2017 for U.S. Appl. No. 14/529,606; 13 pages.
Response to Office Action filed on Jun. 22, 2017 for U.S. Appl. No. 13/946,380; 8 pages.
Response to Office Action filed on Nov. 9, 2016 for U.S. Appl. No. 13/946,380; 19 pages.
Response to Office Action/Restriction Requirement dated Apr. 12, 2013; for U.S. Appl. No. 12/183,367;2 pages.
Response to Office Action/Restriction Requirement dated May 14, 2010; for U.S. Appl. No. 12/037,393; 6 pages.
Response to Office Action/Restriction Requirement dated Oct. 23, 2009; for U.S. Appl. No. 12/328,798; 1 page.
Response with RCE filed on Apr. 12, 2016 to the Final Office Action dated Dec. 15, 2015; for U.S. App. No. 13/946,380; 20 pages.
Supplemental Response to Office Action dated Jul. 6, 2012; for U.S. Appl. No. 12/706,318; 12 pages.
Supplemental Response to Restriction Requirement dated Feb. 6, 2013; for U.S. Appl. No. 12/183,367; 2 pages.
English translations of Claims on File dated Sep. 20, 2018 for Japanese Application No. 2017-522906; 7 Pages.
Instruction Letter to Foreign Associate dated Jul. 30, 2018 for Japanese Application No. 2017-522906; 2 Pages.
Letter from Foreign Associate dated Sep. 20, 2018 reporting voluntary amendment filed for Japanese Application No. 2017-522906; 2 Pages.
Yuasa and Hara Letter dated Apr. 1, 2019 for JP Pat. Appl. No. 2017-522907; 3 pages.
Yuasa and Hara Notice for Reasons for Rejection filed on Mar. 1, 2019 for JP Pat. Appl. No. 2017-522907; 5 pages.
Yuasa and Hara Claims Now on File filed on Mar. 1, 2019 for JP Pat. Appl. No. 2017-522907; 12 pages.
U.S. Non-Final Office Action dated Feb. 7, 2019 for U.S. Appl. No. 13/946,417; 35 pages.
Response (with RCE) to U.S. Final Office Action dated Sep. 8, 2017 for U.S. Appl. No. 13/946,417; Response with RCE filed Nov. 29, 2017; 16 pages.
Amendment under 37 C.F.R. §1.114 filed on Apr. 10, 2019 for U.S. Appl. No. 15/624,898; 19 pages.
EP Reply to Official Communication filed on Nov. 29, 2017 for EP Pat. Appl. No. 15787111.1; 2 pages.
EP Amended Specification filed on Nov. 29, 2017 for EP Pat. Appl. No. 15787111.2; 2 pages.
EP Amended Claims filed on Nov. 29, 2017 for EP Pat. Appl. No. 15787111.2; 13 pages.
Examination Report dated May 28, 2018 for EP Pat. Appl. No. 15787099.9-1022; 7 pages.
Response to Final Office Action dated Jun. 15, 2018 for U.S. Appl. No. 13/946,417, filed Sep. 14, 2018; 15 Pages.
Response to U.S. Non-Final Office Action dated Feb. 7, 2019 for U.S. Appl. No. 13/946,417; Response filed Apr. 22, 2019; 14 pages.
Response to Official Communication filed Dec. 21, 2017 for EP Pat. Appl. No. 15787099.9; 3 pages.
Amended Claims filed in Response to Official Communication filed Dec. 21, 2017 for EP Pat. Appl. No. 15787099.9; 7 pages.
Response to Office Action dated Nov. 28, 2018 and filed on Jan. 11, 2019 for U.S. Appl. No. 15/624,898; 17 pages.
Response to EPO Communication under Rules 161 and 162 EPC filed on Dec. 21, 2017 for EP Pat. Appl. No. 15853626.8; 2 pages.
Amended Claims in response to EPO Communication under Rules 161 and 162 EPC filed on Dec. 21, 2017 for EP Pat. Appl. No. 15853626.8; 7 pages.
Amendment under 37 C.F.R. §1.312 filed on Jun. 29, 2017 for U.S. Appl. No. 14/520,669; 11 pages.
Final Office Action dated Jan. 9, 2017 for U.S. Appl. No. 14/529,669; 11 pages.
Non-final Office Action dated Jul. 28, 2016 for U.S. Appl. No. 14/529,669; 25 pages.
Response to Office Action filed on Oct. 28, 2016 for U.S. Appl. No. 14/529,669; 18 pages.
Response to Rule 312 Communication from USPTO dated Jul. 28, 2017 for U.S. Appl. No. 14/529,669; 2 pages.
Examination Report dated Mar. 8, 2018 for EP Appl. No. 15791066.2; 4 pages.
Final Office Action dated Feb. 14, 2019 for U.S. Appl. No. 15/624,398; 30 pages.
Response to Final Office Action dated Jul. 26, 2018 for U.S. Appl. No. 15/655,135, filed Oct. 11, 2018; 21 Pages.
Communication under Rule 71(3) EPC dated Oct. 10, 2018 for International Application No. 15791066.2; 7 Pages.
Allowed Specification dated Oct. 10, 2018 for International Application No. 15791066.2; 102 Pages.
Response to Examination report dated May 28, 2018 for European Application No. 15787099.9 as filed on Sep. 17, 2018; 3 Pages.
Amended claims for European Application No. 15787099.9 as filed on Sep. 17, 2018; 4 Pages.
Replacement p. 5 of specification for European Application No. 15787099.9 as filed on Sep. 17, 2018; 1 Page.
New p. 5A of specification for European Application No. 15787099.9 as filed on Sep. 17, 2018; 1 Page.
U.S. Final Office Action dated Sep. 8, 2017 for U.S. Appl. No. 13/946,417; 56 pages.
Response to Final Office Action dated Jun. 15, 2018 for U.S. Appl. No. 13/946,417 as filed on Nov. 14, 2018; 14 Pages.
Notice of Intention to Grant dated May 27, 2019 for EP Pat. Appl. No. 15787099.9; 7 pages.
Allowed Specification dated May 6, 2016 for EP Pat. Appl. No. 15787099.9; 71 pages.

(56) References Cited

OTHER PUBLICATIONS

Response filed on May 29, 2019 for Japanese Patent Application No. 2017-522907 with English Translation; 40 Pages.
Notice of Allowance dated Jun. 10, 2019 for Japanese Patent Application No. 2017-522908 with English Translation of Allowed Claims; 9 Pages.
Partial Search Report dated Dec. 4, 2019 for European Application No. 19198294.1; 13 pages.
Response to Office Action with English translation dated Dec. 26, 2019 for Japanese Application No. 2017-522906; 16 pages.
Final Office Action dated Jan. 17, 2020 for U.S. Appl. No. 15/624,898; 13 pages.
Response to Office Action dated Jan. 14, 2020 for U.S. Appl. No. 16/136,844; 14 pages.
Notice of Allowance dated Sep. 11, 2019 for U.S. Appl. No. 13/946,417; 10 pages.
Supplemental Notice of Allowability dated Oct. 2, 2019 for U.S. Appl. No. 13/946,417; 7 pages.
Office Action dated Oct. 24, 2019 for U.S. Appl. No. 16/136,844; 21 pages.
Office Action with English translation dated Oct. 23, 2019 for Japanese Application No. 2017-522906; 5 pages.
Notice of Allowance with English Allowed Claims dated Oct. 31, 2019 for Japanese Application No. 2017-522907; 17 pages.
Office Action dated Sep. 26, 2019 for U.S. Appl. No. 15/624,898; 10 pages.
Response to Office Action dated Nov. 7, 2019 for U.S. Appl. No. 15/624,898; 14 pages.
Extended European Search Report dated May 4, 2020 for European Application No. 19209914.1; 9 pages.
Response to U.S. Final Office Action dated Jan. 17, 2020 for U.S. Appl. No. 15/624,898; Response filed Apr. 9, 2020; 15 Pages.
U.S. Notice of Allowance dated Apr. 22, 2020 for U.S. Appl. No. 15/624,898; 11 Pages.
European Examination Report dated Mar. 5, 2020 for European Application No. 14742067.3; 7 Pages.
Japanese Notice of Intention to Grant (with Machine English Translation and Allowed Claims) dated Apr. 1, 2020 for Japanese Application No. 2017-522906; 12 Pages.
U.S. Appl. No. 16/232,348, filed Dec. 26, 2018, Eagen et al.
International Preliminary Report on Patentability dated Oct. 8, 2009 for PCT Application No. PCT/US2008/053551; 8 pages.
International Preliminary Report on Patentability dated Sep. 10, 2010 for PCT Application No. PCT/US2009/031776; 10 pages.
International Preliminary Report on Patentability dated Feb. 10, 2011 for PCT Application No. PCT/US2009/048237; 9 pages.
Chinese Office Action dated Jan. 18, 2013 for Chinese Application No. 200980129766.7; 6 pages.
International Preliminary Report on Patentability dated Jun. 16, 2011 for PCT Application No. PCT/US2009/065044; 8 pages.
International Preliminary Report on Patentability dated Sep. 1, 2011 for PCT Application No. PCT/US2010/024256; 9 pages.
International Preliminary Report on Patentability dated Feb. 2, 2012 for PCT Application No. PCT/US2010/042694; 11 pages.
Office Action dated Jan. 26, 2018 2017 for U.S. Appl. No. 15/655,135; 50 pages.
Response to Office Action filed Apr. 3, 2018 for U.S. Appl. No. 15/655,135; 20 pages.
Notice of Allowance dated Dec. 4, 2018 for U.S. Appl. No. 15/655,135; 13 pages.
International Preliminary Report on Patentability dated Jan. 28, 2016 for PCT Application No. PCT/US2014/044236; 17 pages.
Response to Office Action filed Mar. 30, 2017 for U.S. Appl. No. 14/529,669; 12 pages.
Notice of Allowance dated Apr. 20, 2017 2017 for U.S. Appl. No. 14/529,669; 8 pages.
Notice of Allowance dated May 18, 2017 2017 for U.S. Appl. No. 14/529,669; 8 pages.
Office Action dated Nov. 9, 2016 for U.S. Appl. No. 14/529,577; 14 pages; 14 pages.
Search Report and Written Opinion dated Jan. 15, 2016 for PCT Application No. PCT/US2015/055236; 12 pages.
Response to Office Action filed Jan. 11, 2019 for U.S. Appl. No. 15/624,898; 17 pages.
Search Report and Written Opinion dated Feb. 4, 2016 for PCT Application No. PCT/US2015/055474; 15 pages.
Final Office Action dated Mar. 2, 2020 for U.S. Appl. No. 16/136,844; 27 Pages.
Communication Pursuant to Article 94(3) EPC dated Jul. 9, 2018 for EP Application No. 15853626.8; 4 Pages.
Final Office Action dated Jul. 26, 2018 for U.S. Appl. No. 15/655,135; 38 Pages.
Response to Office Action and Request for Examination (RCE) filed dated Jun. 2, 2020 for U.S. Appl. No. 16/136,844; 13 pages.
Office Action dated Jun. 8, 2020 for U.S. Appl. No. 16/232,348; 11 pages.
Response to European Communication filed dated May 22, 2020 for European Application No. 14742067.3; 11 pages.

\* cited by examiner

MAGNETIC FIELD SENSOR PROVIDING A MOVEMENT DETECTOR

CROSS REFERENCE TO RELATED APPLICATIONS

This application is a Continuation application and claims the benefit of U.S. patent application Ser. No. 14/529,669, filed on Oct. 31, 2014, which is incorporated herein by reference in its entirety.

STATEMENT REGARDING FEDERALLY SPONSORED RESEARCH

Not Applicable.

FIELD OF THE INVENTION

This invention relates generally to magnetic field sensors, and, more particularly, to magnetic field sensors having a substrate with magnetic field sensing elements thereupon to sense a motion of a ferromagnetic object, all arranged in a variety of relative positions.

BACKGROUND

Various types of magnetic field sensing elements are known, including Hall Effect elements and magnetoresistance elements. Magnetic field sensors generally include a magnetic field sensing element and other electronic components. Some magnetic field sensors also include a permanent magnet (a hard ferromagnetic object) in a so-called "back biased" arrangement described more fully below. Other magnetic field sensors sense motion of a magnet.

Magnetic field sensors provide an electrical signal representative of a sensed magnetic field. In some embodiments that have the magnet (back-biased arrangements), the sensed magnetic field is a magnetic field generated by the magnet, in which case, in the presence of a moving ferromagnetic object, the magnetic field generated by the magnet and sensed by the magnetic field sensor varies in accordance with a shape or profile of the moving ferromagnetic object. In contrast, magnetic field sensors that sense a moving magnet directly sense variations of magnetic field magnitude and direction that result from movement of the magnet.

Magnetic field sensors (back-biased) are often used to detect movement of features of a ferromagnetic gear, such as gear teeth and/or gear slots or valleys. A magnetic field sensor in this application is commonly referred to as a "gear tooth" sensor.

In some arrangements, the gear (a target object) is placed upon another object, for example, a camshaft in an engine. Thus, it is the rotation of both the target object (e.g., gear) and the other object (e.g., camshaft) that is sensed by detection of the moving features of the gear. Gear tooth sensors are used, for example, in automotive applications to provide information to an engine control processor for ignition timing control, fuel management, anti-lock braking systems, wheel speed sensors, and other operations.

Information provided by the gear tooth sensor to the engine control processor can include, but is not limited to, an absolute angle of rotation of a target object (e.g., a camshaft) as it rotates, a speed of the rotation, and a direction of the rotation. With this information, the engine control processor can adjust the timing of firing of the ignition system and the timing of fuel injection by the fuel injection system.

Many types of magnetic field sensors do not provide an accurate output signal (e.g., indication of absolute angle, speed, or direction of rotation) immediately upon power up, upon movement of the target object from zero rotating speed, and/or upon movement slowing to zero rotating speed, but instead provide an accurate output signal only once the target object has moved through a substantial rotation or is moving with substantial speed. For example, in one type of magnetic field sensor described in U.S. Pat. No. 6,525,531, entitled "Detection of Passing Magnetic Articles while Adapting the Detection Threshold," issued Feb. 25, 2003, a positive digital-to-analog converter (PDAC) and a negative digital-to-analog converter (NDAC) track positive and negative peaks of a magnetic field signal, respectively, for use in generating a threshold signal. A varying magnetic field signal is compared to the threshold signal. However, the outputs of the PDAC and the NDAC may not be accurate indications of the positive and negative peaks of the magnetic field signal until several cycles of the signal (i.e., signal peaks) occur (i.e., until several gear teeth have passed). This type of magnetic field sensor, which generally requires time to become fully accurate, is referred to herein as a so-called "precision rotation detector."

In contrast, a "true power on state" (TPOS) detector can provide an accurate output signal shortly after movement of a target object (e.g., camshaft) from zero rotating speed, or a low rotation speed in some applications of, for example, less than 100 rpm, or also shortly before movement slowing to zero rotating speed. Furthermore, even when the target object is not moving, the TPOS detector can provide an indication of whether the TPOS detector is in front of a tooth or a valley of a gear. However, when the target object is stationary, the conventional TPOS detector is not able to identify an absolute or relative angle of rotation of the target object. The TPOS detector can be used in conjunction with a precision rotation detector within a common integrated circuit, each providing information to the engine control processor at different times. For simplicity, TPOS detectors and precision rotation detectors are shown herein within a common integrated circuit. However, the TPOS detector or the precision rotation detector can also be used alone in separate circuits.

As described above, the conventional TPOS detector provides an accurate output signal with only a small initial rotation of the target object, and before the precision rotation detector can provide an accurate output signal. The TPOS detector can provide information to the engine control processor that can be more accurate than information provided by the precision rotation detector for time periods at the beginning and at the end of rotation of the target object (e.g., start and stop of the engine and camshaft), but which may be less accurate when the object is rotating at speed. For magnetic field sensor arrangements that have both a TPOS detector and a precision rotation detector within a common integrated circuit, when the object is not rotating or rotating slowly, the engine control processor can use the TPOS detector. When rotating at speed, the engine control processor can primarily use rotation information provided by the precision rotation detector. In most conventional applications, once the magnetic field sensor switches to use the precision rotation detector, it does not return to use the TPOS detector until the target object stops rotating or nearly stops rotating.

A conventional TPOS detector is described in U.S. Pat. No. 7,362,094, entitled "Method and Apparatus for Magnetic Article Detection," issued Apr. 22, 2008. The conventional TPOS detector includes a comparator for comparing the magnetic field signal to a fixed, often trimmed, threshold signal. The conventional TPOS detector can be used in conjunction with and can detect rotational information about a TPOS cam (like a gear), which is disposed upon a target object, e.g., an engine camshaft, configured to rotate.

An example of an output signal from a conventional TPOS detector has at least two states, and typically a high and a low state. The state of the conventional TPOS output signal is high at some times and low at other times as the target object rotates, in accordance with features on the TPOS cam (or gear) attached to the target object.

Similarly, an output signal from a conventional precision rotation detector also has at least two states, and typically a high and a low state. The state of the conventional precision rotation detector output signal is high at some times and low at other times as the target object rotates, also in accordance with features on the TPOS cam (or gear) attached to the target object As described above, conventional TPOS detectors have the ability to differentiate a gear tooth from a gear valley (i.e., gear "features"), and to make such detection when the gear is rotating and when the gear is not rotating. In contrast, some conventional precision rotation detectors have the ability to differentiate a gear tooth from a gear valley when the gear is rotating, but not when the gear is stationary. Detectors that can identify a gear tooth from a valley are sometimes referred to as "tooth detectors." Thus, TPOS detectors are usually tooth detectors. Some precision rotation detectors can also be tooth detectors.

While detection of gear teeth can be used by some magnetic field sensors, other magnetic field sensors can sense passing magnetic poles of a ring magnet (i.e., features). Thus, as used herein, the term "feature detector" is used to describe either a tooth detector or a detector of magnetic poles.

Some other conventional precision rotation detectors are unable to differentiate a gear tooth from a valley (or a north pole from a south pole of a ring magnet), but instead, can differentiate an edge of a tooth of the gear from the tooth or the valley. Such detectors are sometimes referred to as "edge detectors." Usually, TPOS detectors are not edge detectors. However, some precision rotation detectors can be edge detectors.

The conventional magnetic field sensor must achieve an accurate output signal that accurately differentiates between gear teeth and gear valleys even in the presence of an air gap between the magnetic field sensor and the gear that may change from installation to installation or from time to time. Still further, the conventional magnetic field sensor must achieve these differentiations even in the presence of unit-to-unit variations in relative positions of the magnet and the magnetic field sensing element within the magnetic field sensor. Still further, the conventional magnetic field sensor must achieve these differentiations even in the presence of unit-to-unit variations in the magnetic field generated by the magnet. Still further, the conventional magnetic field sensor must achieve these differentiations even in the presence of variations of an axial rotation of the magnetic field sensor relative to the gear. Still further, the conventional magnetic field sensor must achieve these differentiations even in the presence of variations of temperature around the magnetic field sensor.

The above effects result in expensive design choices. In particular, some of the above effects result it use of an expensive magnet described below in conjunction with FIG. 1.

It would be desirable to provide a magnetic field sensor that can achieve an accurate output signal that accurately differentiates between gear teeth and gear valleys while using a simpler and less expensive magnet.

SUMMARY

A magnetic field sensor achieves an accurate output signal that accurately differentiates between gear teeth and gear valleys while using a simpler and less expensive magnet. The differentiation is achieved even in the presence of variations of mechanical and thermal parameters associated with the magnetic field sensor.

In accordance with an example useful for understanding an aspect of the present invention, a magnetic field sensor for measuring movement of a target object, the movement in an x-z plane within x-y-z Cartesian coordinates with x, y, and z orthogonal axes, a tangent to a direction of movement of a surface of the target object proximate to the magnetic field sensor substantially parallel to the x axis, includes a substrate having a major planar surface within about twenty degrees of parallel to the x-z plane. The magnetic field sensor also includes a plurality of magnetic field sensing elements disposed upon the major planar surface of the substrate. Each one of the plurality of magnetic field sensing elements has a major response axis substantially parallel to the major planar surface of the substrate. The plurality of magnetic field sensing elements is configured to generate a respective plurality of magnetic field signals.

BRIEF DESCRIPTION OF THE DRAWINGS

The foregoing features of the invention, as well as the invention itself may be more fully understood from the following detailed description of the drawings, in which.

DETAILED DESCRIPTION

Figure 1:
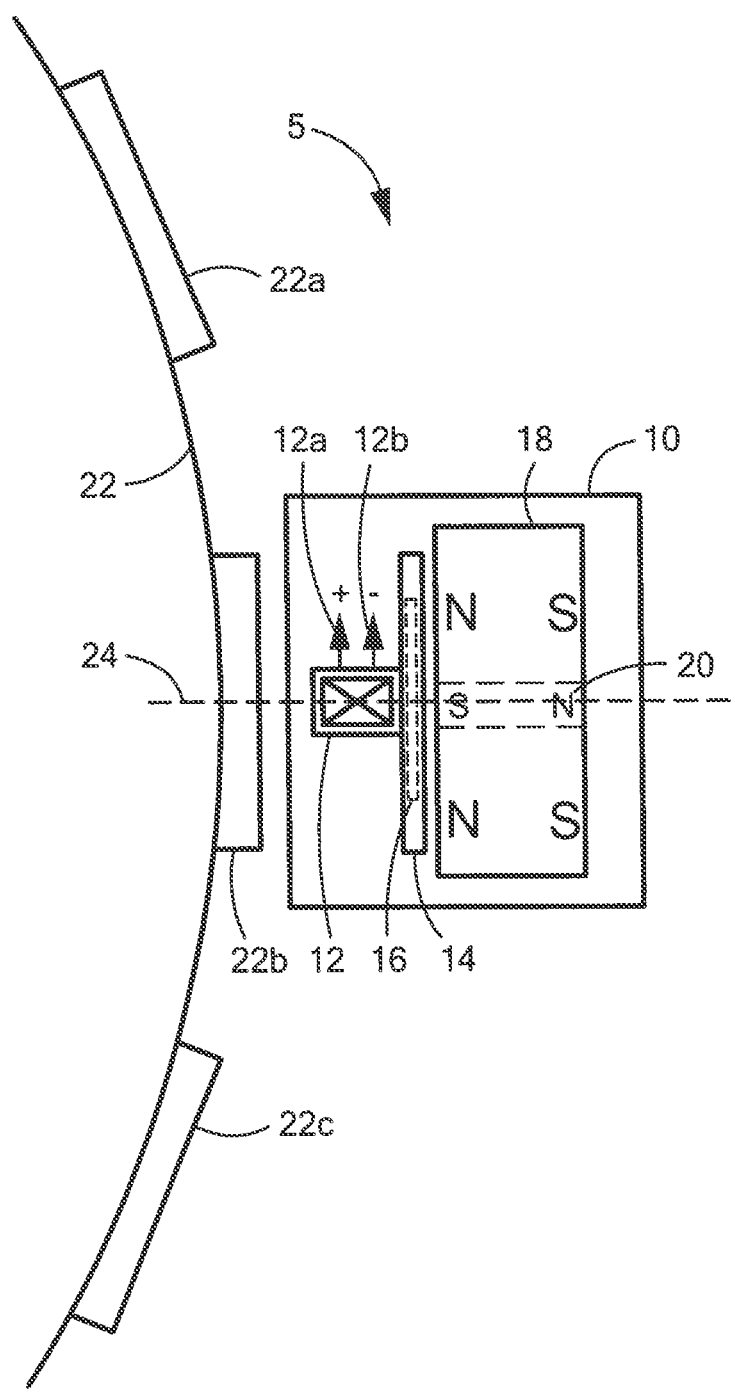
FIG. 1 is a block diagram of a prior art magnetic field sensor having a magnetic field sensing element, an electronic circuit, and a magnet.

Before describing the present invention, some introductory concepts and terminology are explained.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, MTJ, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the term "accuracy," when referring to a magnetic field sensor, is used to refer to a variety of aspects of the magnetic field sensor. These aspects include, but are not limited to, an ability of the magnetic field sensor to differentiate: a gear tooth from a gear valley (or, more generally, the presence of a ferromagnetic object from the absence of a ferromagnetic object) when the gear is not rotating and/or when the gear is rotating (or, more generally, when a ferromagnetic object is moving or not moving), an ability to differentiate an edge of a tooth of the gear from the tooth or the valley of the gear (or, more generally, the edge of a ferromagnetic object or a change in magnetization direction of a hard ferromagnetic object), and a rotational accuracy with which the edge of the gear tooth is identified (or, more generally, the positional accuracy with which an edge of a ferromagnetic object or hard ferromagnetic object can be identified). Ultimately, accuracy refers to output signal edge placement accuracy and consistency with respect to gear tooth edges passing by the magnetic field sensor.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/−ten degrees.

It is desirable for magnetic field sensors to achieve a certain level or amount of accuracy even in the presence of variations in an air gap between the magnetic field sensor and the gear that may change from installation to installation or from time to time. It is also desirable for magnetic field sensors to achieve accuracy even in the presence of variations in relative positions of the magnet and the magnetic field sensing element within the magnetic field sensor. It is also desirable for magnetic field sensors to achieve accuracy even in the presence of unit-to-unit variations in the magnetic field generated by a magnet within the magnetic field sensors. It is also desirable for magnetic field sensors to achieve accuracy even in the presence of variations of an axial rotation of the magnetic field sensors relative to the gear. It is also desirable for magnetic field sensors to achieve accuracy even in the presence of temperature variations of the magnetic field sensors.

Examples below describe a particular gear (or a particular ring magnet) as may be used upon an engine camshaft target object. However, similar circuits and techniques can be used with other cams or gears or ring magnet disposed upon the engine camshaft, or upon other rotating parts of an engine, vehicle, or a machine (e.g., crank shaft, transmission gear, anti-lock braking system (ABS)), or upon rotating parts of a device that is not an engine. Other applications may include linear translation sensors or other sensors where the sensed object is not a rotating gear or ring magnet, but is a linear arrangement.

The gear (or target) or the ring magnet is not a part of the magnetic field sensors described below. The gear can have ferromagnetic gear teeth, which are generally soft ferromagnetic objects, but which can also be hard ferromagnetic objects, patterns, or domains which may or may not have actual physical changes in their shape.

Examples are shown below of magnetic field sensors that can sense ferromagnetic gear teeth having gear teeth edges upon a gear configured to rotate. Other examples are shown below of magnetic field sensors that can sense north and south poles having pole edges upon a ring magnet configured to rotate. However, the magnetic field sensors can be used in other applications. The other applications include, but are not limited to, sensing ferromagnetic objects or poles upon a structure configured to move linearly.

As used herein, the term "features" is used to describe gear teeth or gear valleys upon a gear and also to describe north or south poles upon a ring magnet.

As used herein, the term "baseline" and the phrase "baseline level" are used to describe a lowest magnitude (which may be near zero or may be some other magnetic field) of a magnetic field experienced by a magnetic field sensing element within a magnetic field sensor when the magnetic field sensor is operating in a system. In some systems, this lowest magnetic field occurs when a magnetic field sensor is proximate to a gear valley as opposed to a gear tooth.

It will be understood that, in general, a difference between the baseline level and a higher level achieved, for example, when a gear tooth is proximate to a magnetic field sensor, is related to an ability of the magnetic field sensor to differentiate between a gear tooth and a valley, and thus, related to accuracy of the magnetic field sensor.

While it is described above that a baseline level is generated when a magnetic field sensor is proximate to a gear valley and a higher level is achieved when the magnetic field sensor is proximate to a gear tooth, other physical arrangements are also possible, for example, a reverse arrangement for which a baseline level is generated when a magnetic field sensor is proximate to a gear tooth and a higher level is achieved when the magnetic field sensor is proximate to a gear valley.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

It should be understood that electronic functions that may be described below to be analog functions can instead be implemented in digital circuits, in processors, or in modules. For example, it will be recognized that a comparator can be implemented as an analog comparator that compares analog voltages, as a digital comparator that compares digital values, or as a processor or module that compares digital values. Examples shown herein to be analog examples do not limit the scope of described embodiments to be analog embodiments only.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the term "active electronic component" is used to describe and electronic component that has at least one p-n junction. A transistor, a diode, and a logic gate are examples of active electronic components. In contrast, as used herein, the term "passive electronic component" as used to describe an electronic component that does not have at least one p-n junction. A capacitor and a resistor are examples of passive electronic components.

As used herein, the term "target object" is used to refer to a ferromagnetic gear, a ferromagnetic ring magnet, a non-ferromagnetic conductive object, or another type of target object, position or movement of which is detected by magnetic field sensor describe herein. In some embodiments, the target object can be coupled to another object, for example, a camshaft of an engine. Thus, the detected position or movement of the target object can be used to identify a position or movement of the other object.

Referring to FIG. 1, an example of a magnetic field sensor 10 is responsive to a gear 22 having ferromagnetic gear teeth, e.g., gear teeth 22a, 22b, 22c. It should be recognized that the gear 22 is but one type of "ferromagnetic target object," or simply "target object," which the magnetic field sensor 10 can be responsive. In other magnetic systems, the ferromagnetic target object may include a permanent magnet (or a hard ferromagnetic material), for example, the above-described ring magnet having alternating north and south poles. Ring magnets are shown and described below in conjunction with FIGS. 14-16.

The magnetic field sensor 10 includes a magnetic field sensing element 12 coupled to an electronic circuit 16. The magnetic field sensing element 12 and the electronic circuit 16 can be disposed upon (i.e., integrated within or upon) a substrate 14. For clarity, here the magnetic field sensing element 12 is shown to be a Hall element with an exaggerated size, and rotated out of the plane of the substrate 14. Furthermore, for clarity, the Hall element 12 is shown to be on top of the substrate 14, but it will be appreciated that Hall elements are usually disposed upon or within a surface of a substrate of an integrated circuit.

The magnetic field sensor 10 can also include a magnet 18 (e.g. a permanent magnet or hard ferromagnetic material). The magnet 18 is configured to generate a magnetic field, which is generally directed along an axis 24 at the position of the magnetic field sensing element 12, and which is subject to direction and amplitude changes depending upon positions of the gear teeth 22a, 22b, 22c relative to the magnetic field sensor 10. However, the structure of the magnetic field at faces of the magnet 18 can be more complex due to a core 20.

The electronic circuit 16 is configured to generate an output signal (not shown). The output signal, when the gear is not moving, is indicative of whether the magnetic field sensor 10 is over a gear tooth or a gear valley. Thus, the magnetic field sensor 10 is sometimes referred to as a "tooth detector" (or feature detector) as opposed to an "edge detector." The output signal, when the gear is rotating, has an edge rate or a frequency indicative of a speed of rotation of the gear. Edges or transitions of states of the output signal can be used to identify positions of edges of the gear teeth as they pass by the magnetic field sensor.

The magnet 18 can include the central core 20 comprised of a soft ferromagnetic material disposed within the magnet 18. An example of a magnet with a core is described in U.S. Pat. No. 6,278,269, entitled "Magnet Structure," issued Aug. 21, 2001, which patent is assigned to the assignee of the present invention and incorporated herein by reference in its entirety. As described in U.S. Pat. No. 6,278,269, the pole configuration provided by the magnet 18 with the core 20 lowers the base field (or baseline) of a flux density of the magnetic field at some points above the surface of the core 20 (e.g., to the left of the core as shown) when a valley of the gear 22 is proximate to the magnetic field sensor 10. A predetermined baseline (e.g., within a range of about +/six hundred Gauss) at the magnetic field sensing element 12, and a resulting differential magnetic field signal 12a, 12b (i.e., an analog differential proximity signal) near zero, can be achieved with proper design.

In contrast, when a gear tooth of the gear 22 is proximate to the magnetic field sensing element 12, the magnetic field sensing element 12 experiences a higher magnetic field and generates the differential magnetic field signal 12a, 12b with a higher value. As described above, a difference between the baseline magnetic field and the higher magnetic field is related to ultimate accuracy of the magnetic field sensor 10.

The baseline magnetic field, which can occur when the magnetic field sensor 10 is proximate to a valley in the gear 22, remains relatively low, with little change, even as the air gap between the gear 22 and the magnetic field sensor 10 varies. This advantageous result of low baseline substantially independent of air gap is achieved by operation of the core 20, which results in opposite magnetic poles being presented at the face of the core 20 (i.e., left side as shown) proximate to the magnetic field sensing element 12, particularly when the magnetic field sensing element 12 is proximate to a valley in the gear 22. This effect is also described in U.S. Pat. No. 5,781,005, issued Jul. 14, 1998, entitled "Hall-Effect Ferromagnetic-Article-Proximity Sensor," which patent is assigned to the assignee of the present invention and incorporated herein by reference in its entirety.

The above-described low baseline, which occurs when the magnetic field sensor is proximate to a gear valley, results in an enhanced ability of the electronic circuit 16 to differentiate the presence of the gear tooth from a gear valley.

The above-described low baseline also provides an ability to more easily compensate for temperature effects, since the baseline magnetic field is relatively small, and therefore, circuit variations that occur due to temperature can have less influence when the magnetic field sensor 10 is proximate to a valley in the gear 22. Essentially, any error in the circuitry is able to be well corrected near the baseline magnetic field level or range, since any multiplication of the error (near zero) is smaller. Therefore, a magnetic field threshold used to distinguish a tooth from a valley can be made smaller while maintaining precision because there is less noise or error in the system over its operating conditions such as temperature, or humidity.

The magnetic field described above and provided by the magnet 18 with the core 20 results in an improved accuracy of the magnetic field sensor 10. For example, the low baseline allows the magnetic field sensing element 12 to be somewhat statically misaligned from a center of the magnet 18, as will occur due to unit-to-unit variations of mechanical alignments, without sacrificing accuracy of the magnetic field sensor 10. Accuracy is discussed above.

Figure 1A:
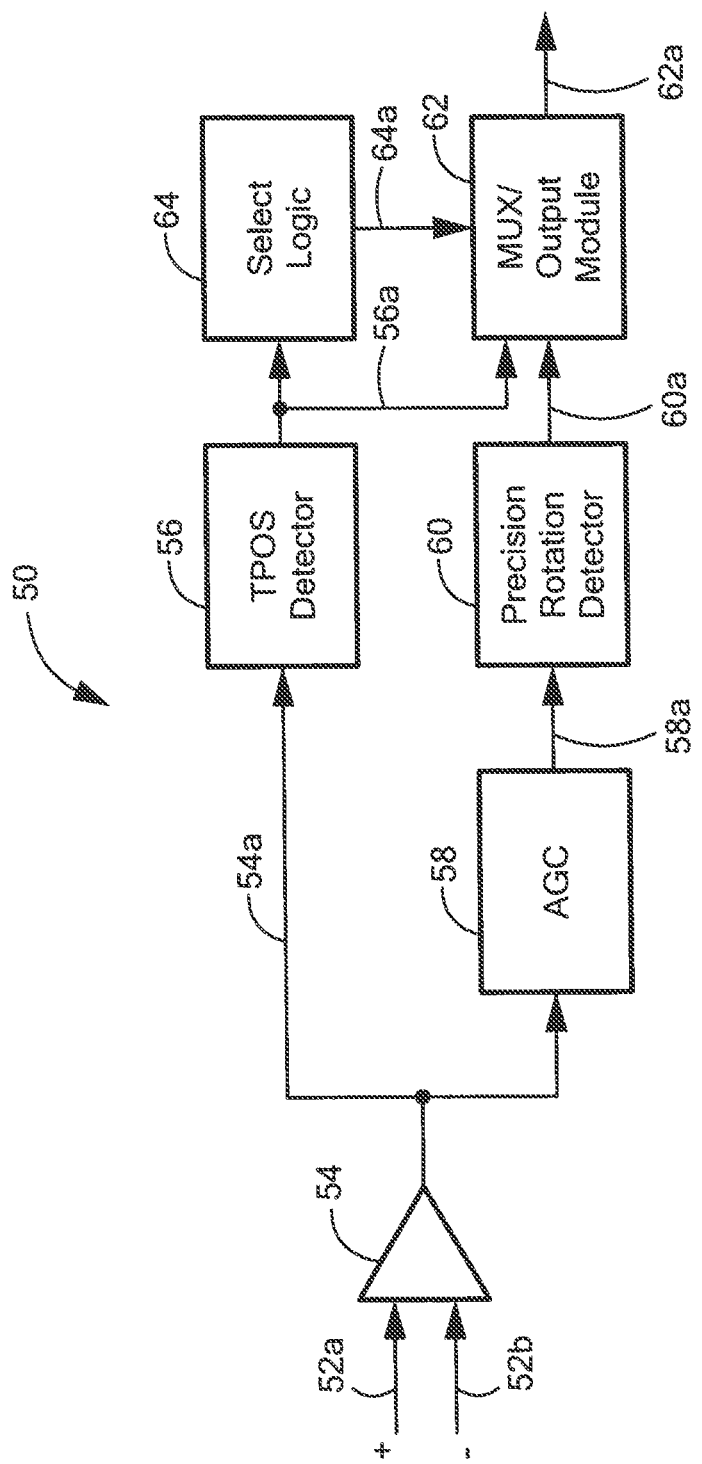
FIG. 1A is a block diagram of an example of an electronic circuit that can be used as the electronic circuit of FIG. 1.

Referring now to FIG. 1A, an example of a prior art electronic circuit 50 can be the same as or similar to electronic circuit 16 of FIG. 1. The electronic circuit 50 can include in amplifier 54 coupled to receive a differential signal 52a, 52b, which can be the same as or similar to the differential signal 12a, 12b generated by the magnetic field sensing element 12 of FIG. 1. The amplifier 54 is configured to generate an amplified signal 54a, which, in some embodiments, can split into two channels, a TPOS detector channel and a precision rotation detector channel.

In the true power on state (TPOS) channel, a TPOS detector 56 can be coupled to receive the amplified signal 54a and configured to generate a TPOS output signal 56a. In some embodiments, the TPOS detector 56 can include a comparator (not shown) configured to compare the amplified signal 54a with a fixed (and trimmed) threshold. In these embodiments, the TPOS output signal 56a can be a two-state binary signal for which a high state is indicative of a gear tooth being proximate to the magnetic field sensor 10 of FIG. 1 and a low state is indicative of a gear valley being proximate to the magnetic field sensor 10, or vice versa.

In the precision rotation detector channel, an automatic gain control (AGC) 58 can be coupled to receive the amplified signal 54a and configured to generate a gain controlled signal 58a. A precision rotation detector 60 can be coupled to receive the gain controlled signal 58a and configured to generate a precision rotation detector output signal 60a. Like the TPOS output signal 56a, the precision rotation detector output signal 60a can be a two-state binary signal for which a high state is indicative of a gear tooth being proximate to the magnetic field sensor 10 of FIG. 1 and a low state is indicative of a gear valley being proximate to the magnetic field sensor 10, or vice versa. Thus, both the TPOS detector 56 and the precision rotation detector 60 can be "tooth detectors" (i.e., "feature detectors"). However, it should be understood that the precision rotation detector channel uses the AGC 58, which, when the gear 22 is not rotating, will settle to an undesirable gain, resulting, once the gear 22 starts to rotate, in a period of time during which the gain is incorrect and the precision rotation detector is not fully accurate. Even if the AGC 58 were not used, still the precision rotation detector 60 uses internal thresholds that are properly updated only when the gear 22 is rotating. However, in other embodiments, the threshold can be supplied from outside of the electronic circuit 50.

In some embodiments, the thresholds for the TPOS detector 56 and/or for the precision rotation detector 60 are stored and later recalled and used. Storage of thresholds is described below in conjunction with FIG. 9. The same storage techniques can be used in conjunction with all of the magnetic field sensors described herein.

In some alternate embodiments, the precision rotation detector 60 can be an "edge detector," which is unable to identify whether the magnetic field sensor 12 is proximate to a gear tooth or a gear valley, particularly when the gear is not moving, but which is able to sense edges of gear teeth as they move past the magnetic field sensor 10.

Precision rotation detectors, e.g., the precision rotation detector 60, can have a variety of configurations. Some configurations are described in the above mentioned U.S. Pat. No. 6,525,531. However, other forms of precision rotation detectors are also known, including some that have two or more magnetic field sensing elements.

In general, from discussion above, it will be appreciated that the TPOS output signal 56a is indicative of whether the magnetic field sensing element 12 is proximate to a gear tooth or a gear valley, even when the gear, e.g., the gear 22 of FIG. 1, is stationary. However, since the TPOS detector 56 uses a fixed threshold, in some embodiments, having limited adjustment at power up, variations in the edge placement in the TPOS output signal 56a will occur due to a variety of factors, including, but not limited to, temperature variations, and variations in the air gap between the magnetic field sensing element 12 and the gear 22.

Unlike the TPOS detector 56, which uses fixed thresholds, the precision rotation detector 60 continually makes adjustments of thresholds to provide the precision rotation detector output signal 60a with better accuracy of edge placements of the precision rotation detector output signal 60a relative to physical positions of gear teeth. As described above, in part, it is these adjustments that make the precision rotation detector less accurate when it is first powered up or when the gear 22 first starts to rotate.

In some embodiments for which the TPOS detector 56 and the precision rotation detector 60 are integrated onto a common substrate, a multiplexer/output module 62 can be coupled to receive the TPOS output signal 56a and coupled to receive the precision rotation detector output signal 60a. Select logic 64 can provide a selection signal 64a, received by the multiplexer/output module 62. Depending upon the state of the selection signal 64a, the multiplexer/output module 62 is configured to generate an output signal 62a representative of a selected one of the TPOS output signal 56a or the precision rotation detector output signal 60a. The output signal 62a can be provided in a variety of signal formats, including, but not limited to, a SENT format, an I²C format, a PWM format, or a two-state format native to the TPOS output signal 56a and to the precision rotation detector output signal 60a.

In some examples, the select logic 64 selects the output signal 62a to be representative of the TPOS output signal 56a for a predetermined amount of time after the gear 22 starts rotating as indicated by the TPOS output signal 56a. Thereafter, the select logic 64 selects the output signal 62a to be representative of the precision rotation detector output signal 60a.

Figure 2:
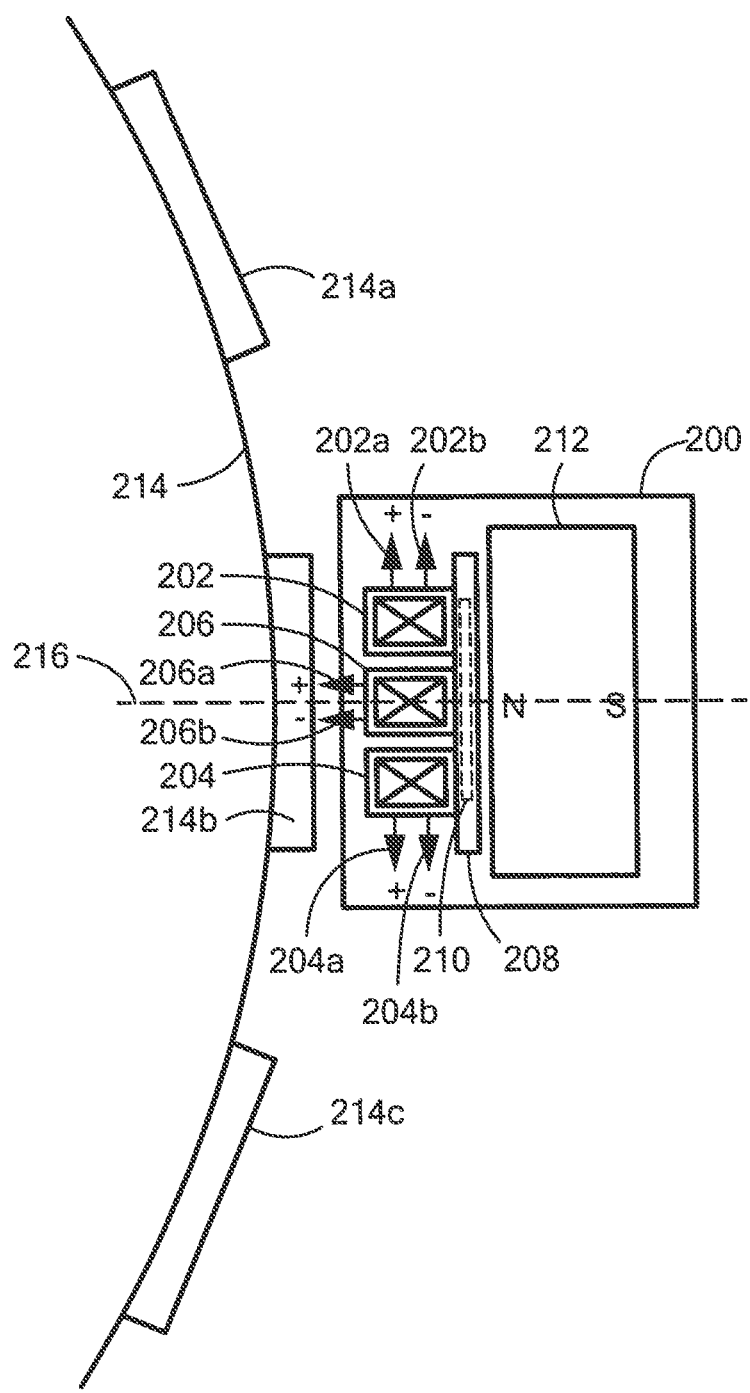
FIG. 2 is a block diagram of another prior art magnetic field sensor having three magnetic field sensing elements, an electronic circuit, and a magnet.

Referring now to FIG. 2, another example of a prior art magnetic field sensor 200 is responsive to a gear 214 having gear teeth, e.g., gear teeth 214a, 214b, 214c. The magnetic field sensor 200 includes three magnetic field sensing elements 202, 204, 206 coupled to an electronic circuit 210. In some embodiments, the magnetic field sensing elements 202, 204 are separated in a direction perpendicular to an axis 216 by a distance between about 1.5 millimeters and about 3.0 millimeters, and the magnetic field sensing element 206 is located midway between the magnetic field sensing elements 202, 204.

The three magnetic field sensing elements 202, 204, 206 and an electronic circuit 210 can be disposed upon (i.e., integrated within or upon) a substrate 208. For clarity, here the magnetic field sensing elements 202, 204, 206 are shown to be Hall elements with an exaggerated size, and rotated out of the plane of the substrate 208. Furthermore, for clarity, the Hall elements 202, 204, 206 are shown to be on top of the substrate 208, but it will be appreciated that Hall elements are usually disposed upon or within a surface of a substrate of an integrated circuit.

The magnetic field sensor 200 can also include a magnet 212. The magnet 212 is configured to generate a magnetic field, which is generally directed along an axis 216 at the position of the magnetic field sensing elements 202, 204, 206.

The electronic circuit 210 is configured to generate an output signal (not shown). An exemplary electronic circuit 210 is described below in conjunction with FIG. 2A. Let it suffice here to say that the electronic circuit generates differences of signals. Thus, it will be apparent that the magnetic field sensor 200 is an edge detector and not a tooth detector.

The output signal, when the gear 214 is rotating, is indicative speed of rotation of the gear 214 and also indicative of positions of edges of the gear teeth. The magnetic field sensor 200 is unable to provide a TPOS function, and, when the gear 214 is stationary, is unable to identify whether the magnetic field sensing elements 202, 204, 206 are proximate to a gear tooth or a valley in the gear 214.

The magnet 212 can be comprised of one uniform material, and can have no central core, which is shown and described in conjunction with FIG. 1. However, in other embodiments, the magnet 212 can have a central core the same as or similar to that shown and described in conjunction with FIG. 1. In still other embodiments, the magnet 212 can have a core comprised of air or a core comprised of a non-ferromagnetic material.

The magnetic field sensor 200 uses the three magnetic field sensing elements 202, 204, 206 to generate a respective three differential signals 202a, 202b, and 204a, 204b, and 206a, 206b. Though the simple magnet 212 does not provide the low baseline of a magnet with a core, differences of the above differential signals result in the effect of a low baseline. In essence, when the three magnetic field sensing elements 202, 204, 206 experience the same magnetic field, a differencing of the above differential signals results in a zero electronic signal.

Figure 2A:
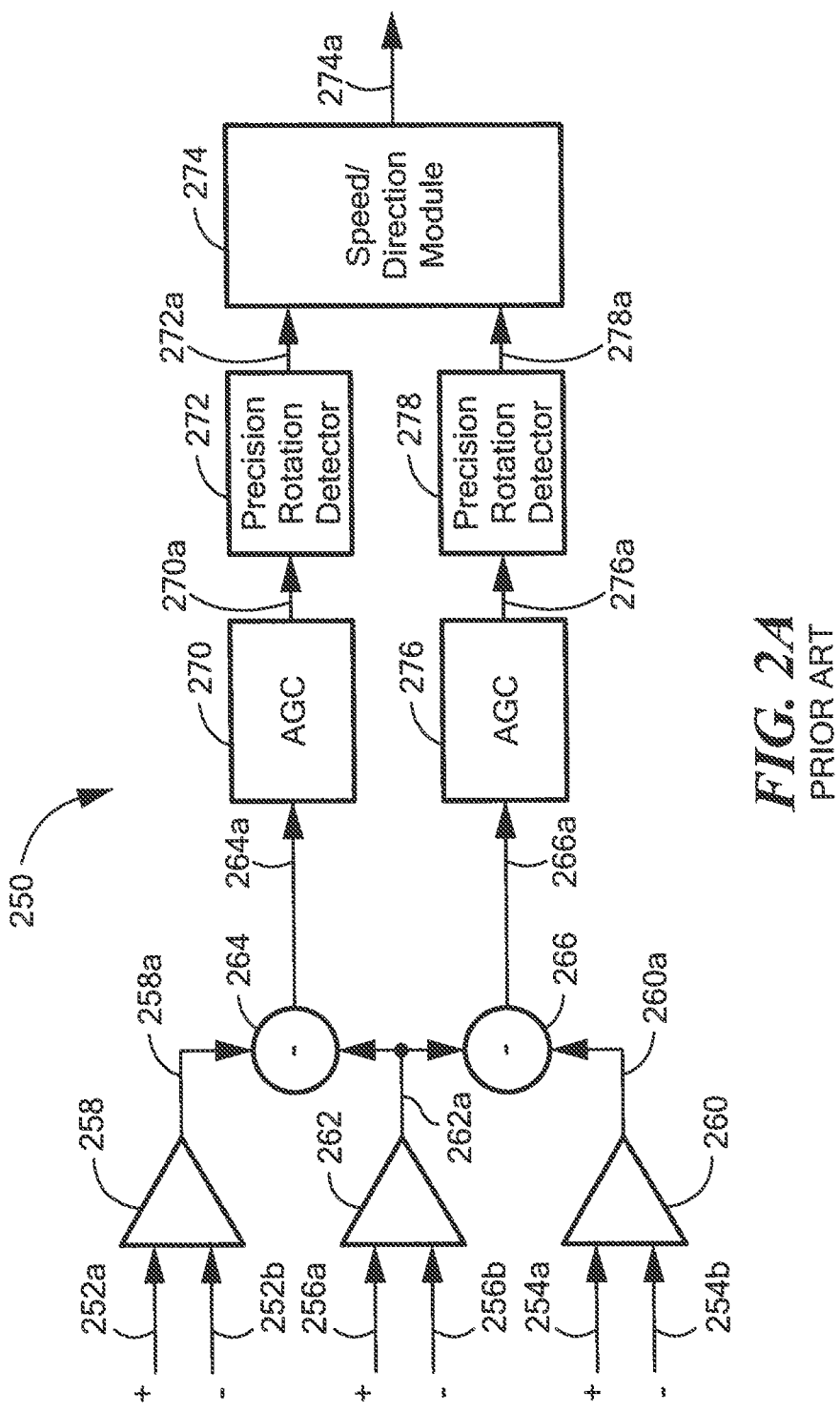
FIG. 2A is a block diagram of an example of an electronic circuit that can be used as the electronic circuit of FIG. 2.

Referring now to FIG. 2A, an example of a prior art electronic circuit 250 can be the same as or similar to electronic circuit 210 of FIG. 2. The electronic circuit 250 can include amplifiers 258, 260, 262 coupled to receive differential signals 252a, 252b, and 254a, 254b, and 256a, 256b, respectively. The differential signal 252a, 252b can be the same as or similar to the differential signal 202a, 202b, the differential signal 254a, 254b can be the same as or similar to the differential signals 204a, 204b, and the differential signal 256a, 256b can be the same as or similar to the differential signal 206a, 206b generated, respectively, by the magnetic field sensing elements 202, 204, 206 of FIG. 2. The amplifiers 258, 260, 262 are configured to generate amplified signals 258a, 260a, 262a, respectively.

The amplified signals 258a, 260a are received by a first differencing module 264, which is configured to generate a first difference signal 264a. The amplified signals 260a, 262a are received by a second differencing module 266, which is configured to generate a second difference signal 266a.

The electronic circuit 250 includes two precision rotation detector channels, described above in conjunction with FIG. 1A. A AGCs 270, 276 can be the same as or similar to the AGC 56 of FIG. 1A. Precisions rotation detectors 272, 278 can be the same as or similar to the precision rotation detector 60 of FIG. 1A. The precision rotation detector 272 can generate a precision rotation detector output signal 272a and the precision rotation detector 278 can generate a precision rotation detector output signal 278a. The precision rotation detector output signals 272a, 278a can be the same as or similar to the precision rotation detector output signal 60a of FIG. 1A.

A speed and direction module 274 can be coupled to receive the precision rotation detector output signals 272a, 278a.

It should be apparent that the precision rotation detector output signals 272a, 278a are at relative phases that are determined by a direction of rotation of the gear 214. It should also be apparent that the state transition rates of the precision rotation detector output signals 272a, 278a are representative of a speed of rotation of the gear 214.

The speed and direction module is configured to generate an output signal that can be representative of at least one of the speed of rotation or a direction of rotation of the gear 214. In some embodiments, the output signal 62a is representative of both the speed of rotation and the direction of rotation.

Figure 3:
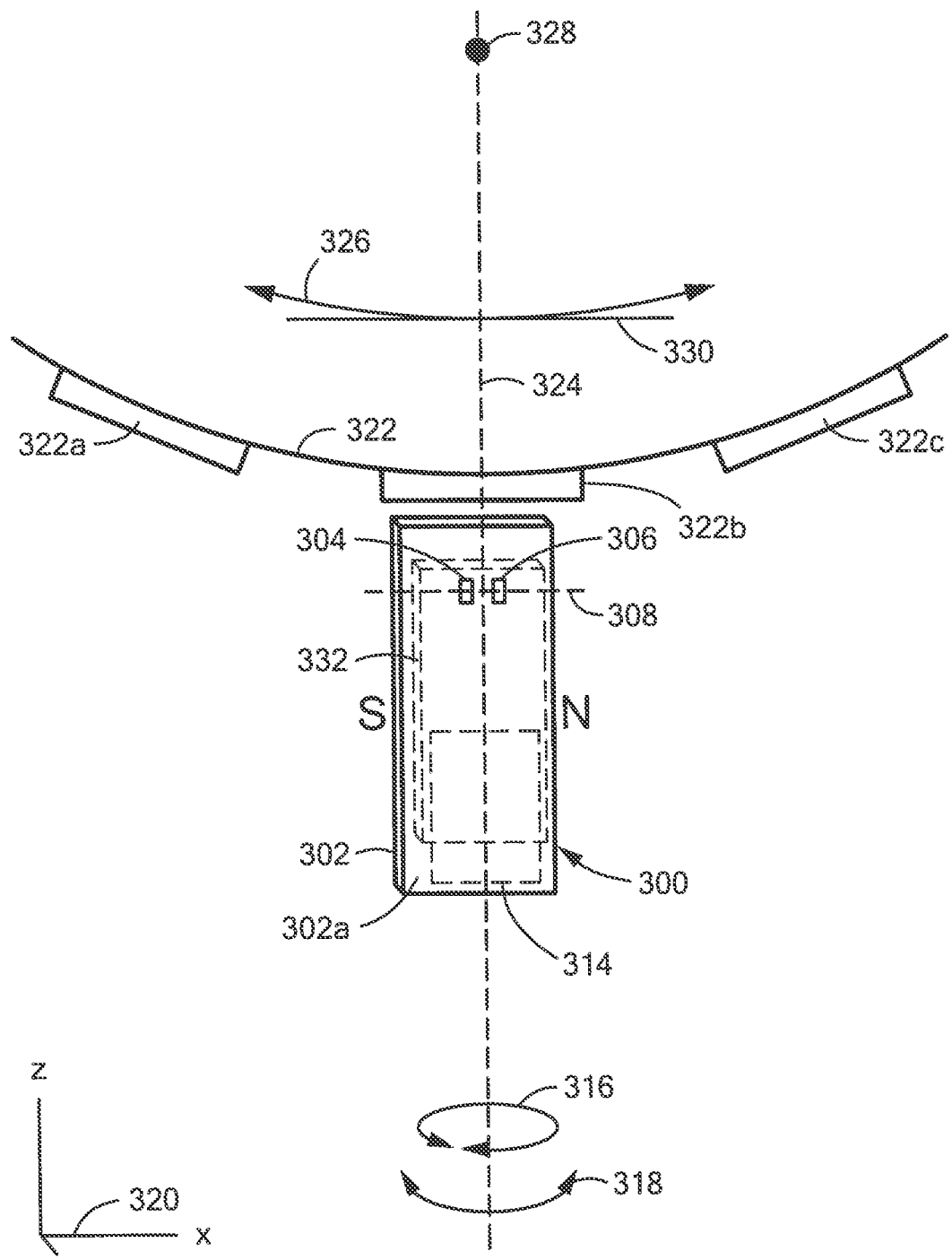
FIG. 3 is a block diagram showing an example of a magnetic field sensor having two magnetic field sensing elements and an electronic circuit both disposed on a substrate, and also having a magnet.

Referring now to FIG. 3, a magnetic field sensor 300 is responsive to a gear 322 having gear teeth, e.g., gear teeth 322a, 322b, 322c. The magnetic field sensor 300 can include two magnetic field sensing elements 304, 306 coupled to an electronic circuit 314. In some embodiments, the magnetic field sensing elements 304, 306 are separated in a direction along an axis 308 between the two magnetic field sensing elements 304, 306 by a distance between about 0.2 millimeters and about 3.0 millimeters.

In some embodiments, the two magnetoresistance elements 304, 306 have a separation between about one half and about one and one half of a width of a ferromagnetic target object feature, for example, a gear tooth of a ferromagnetic gear 322 or a magnetic domain of a ferromagnetic ring magnet. In some other embodiments, the two magnetoresistance elements 304, 306 have a separation between about one half and about twice the width of the ferromagnetic target object feature. However, in other embodiments, the separation is much smaller than half of the width, for example, one one hundredth of the width, or larger than twice the width.

The two magnetic field sensing elements 304, 306 and the electronic circuit 314 can be disposed upon a major surface 302a of (i.e., integrated within or upon) a substrate 302. For clarity, here the magnetic field sensing elements 304, 306 are shown to be magnetoresistance elements. In other embodiments, the magnetic field sensing elements 304, 306 are Hall effect elements, e.g., vertical Hall effect elements.

The magnetic field sensor 300 can also include a magnet 332. The magnet 332 is configured to generate a magnetic field, which is generally directed along an axis 308 at the position of the magnetic field sensing elements 304, 306, and is generally parallel to the major surface 302a of the substrate 302.

The two magnetic field sensing elements 304, 306 have respective maximum response axes parallel to the major surface 302 of the substrate 302. In some embodiments, the maximum response axes are parallel to each other. In some embodiments, the maximum response axes are substantially parallel to the axis 308. In other embodiments, the maximum response axes are substantially perpendicular to the axis 308.

A line perpendicular to the major surface 302a of the substrate (i.e., into the page) and intersecting the substrate 302, also intersect the magnet 332 and does not intersect the gear 322. Furthermore, in some embodiments, the two magnetic field sensing elements 304, 306 are disposed at positions such that an axis (e.g., 308) between (i.e., passing through) the two magnetic field sensing elements 304, 306 does not intersect the gear 322. In some embodiments, the axis (e.g., 308) between (i.e., passing through) the two magnetic field sensing elements 304, 306 is substantially parallel to a tangent 330 to a direction of movement, e.g., 326, of the gear 322.

In the embodiment shown, a line between north (N) and south (S) poles of the magnet 332 is substantially parallel to the major surface 302a of the substrate 302, and is substantially parallel to the axis (e.g., 308) between (i.e., passing through) the two magnetic field sensing elements 304, 306. In some embodiments, the line between the north and south poles of the magnet 332 does not intersect the gear 322 and is not in a direction toward the gear 322.

The electronic circuit 314 is configured to generate an output signal (not shown). An exemplary electronic circuit 314 is described below in conjunction with FIG. 5. Let it suffice here to say that the electronic circuit 314 can generate a difference of signals in accordance with an electronic circuit described below in conjunction with FIG. 5. Thus, it will be apparent that the magnetic field sensor 300 can be an edge detector. However, using other electronic circuits, the other electronic circuit can generate a sum of signals, in which case, the magnetic field sensor 300 can be a tooth detector (i.e., a feature detector).

For an edge detector, the output signal, when the gear 322 is rotating, is indicative of speed of rotation of the gear 322 and also indicative of positions of edges of the gear teeth. For a tooth detector, the output signal, when the gear 322 is rotating, is indicative of speed of rotation of the gear 322 and also indicative of positions near to centers of the gear teeth or gear valleys.

While the gear 322 is shown, in other embodiments described below in conjunction with FIGS. 14 and 15, the gear 322 (and also gears described in other figures below) can be replaced by a ring magnet.

The magnet 332 can be comprised of one uniform material, and can have no central core, which is shown and described in conjunction with FIG. 1. However, in other embodiments, the magnet 332 can have a central core the same as or similar to that shown and described in conjunction with FIG. 1. In still other embodiments, the magnet 332 can have a core comprised of air or a core comprised of a non-ferromagnetic material. The core can have an axis aligned with an axis 308.

The magnetic field sensor 300 uses the two magnetic field sensing elements 304, 306 to generate a respective two magnetic field signals. Though the simple magnet 332 does not provide the low baseline of a magnet with a core, differences of the above two magnetic field signals result in an effect similar to a low baseline. In essence, when the two magnetic field sensing elements 304, 306 experience the same magnetic field (i.e., proximate to a gear tooth or a gear valley), a differencing of the above differential signals results in a zero electronic signal.

The magnetic field sensor 300 can be rotated in a direction 316 to a next position one hundred eighty degrees apart from the position shown, with no degradation of performance. However, intermediate rotations may result in a degradation of performance.

The magnetic field sensor 600 can be rotated in a direction of and arrow 318 with a center of rotation anywhere along a line 324, through approximately +/−twenty degrees, without substantial degradation of performance.

In some embodiments, the magnetic field sensing elements, 304, 306, are magnetoresistance elements. In other embodiments, the magnetic field sensing elements are Hall effect elements, e.g., vertical Hall effect elements. However, it is advantageous to use magnetic field sensing elements for which respective axes of maximum sensitivity are parallel to the axis 308.

Figure 4:
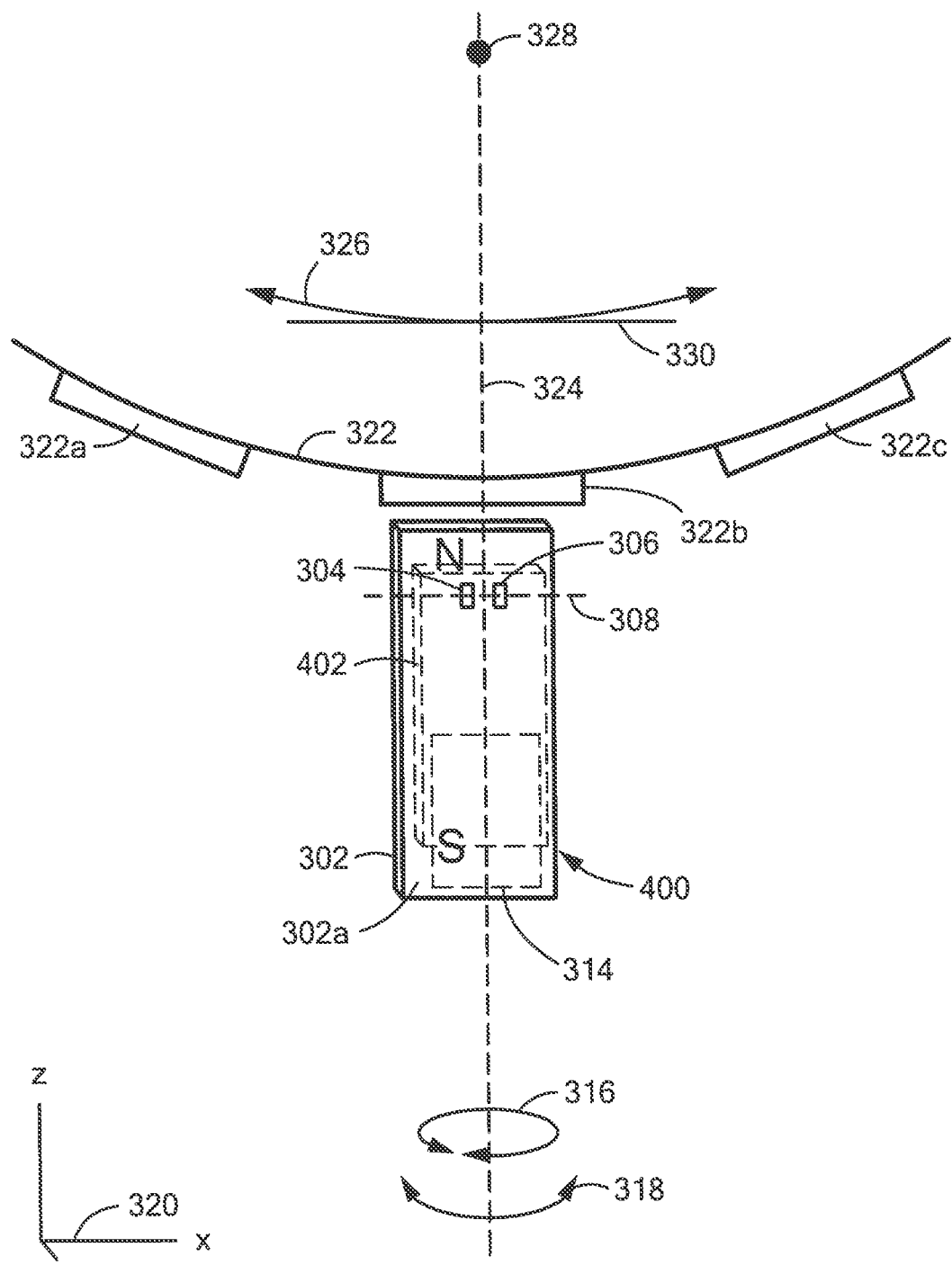
FIG. 4 is a block diagram showing an example of another magnetic field sensor having two magnetic field sensing elements and an electronic circuit both disposed on a substrate, and having a magnet different than the magnet of FIG. 3.

Referring now to FIG. 4, in which like elements of FIG. 3 are shown having like reference designations, a magnetic field sensor 400 is like the magnetic field sensor 300 of FIG. 3. However, the magnetic field sensor 400 has a different magnet 402 for which a line between north (N) and south (S) poles of the magnet 402 is substantially parallel to the major surface 302a of the substrate 302, but substantially perpendicular to the axis (e.g., 308) between (i.e., passing through) the two magnetic field sensing elements 304, 306. In some embodiments, the line between the north and south poles of the magnet 402 is in a direction toward the gear 322.

In some embodiments, the magnet 402 is a simple magnet without a core, such core described above in conjunction with FIG. 1. In other embodiments, the magnet 402 has a core the same as or similar to the core 20 described above in conjunction with FIG. 1. In still other embodiments, the magnet 402 can have a core comprised of air or a core comprised of a non-ferromagnetic material. The core can be aligned with an axis along or parallel the line 324.

Figure 5:
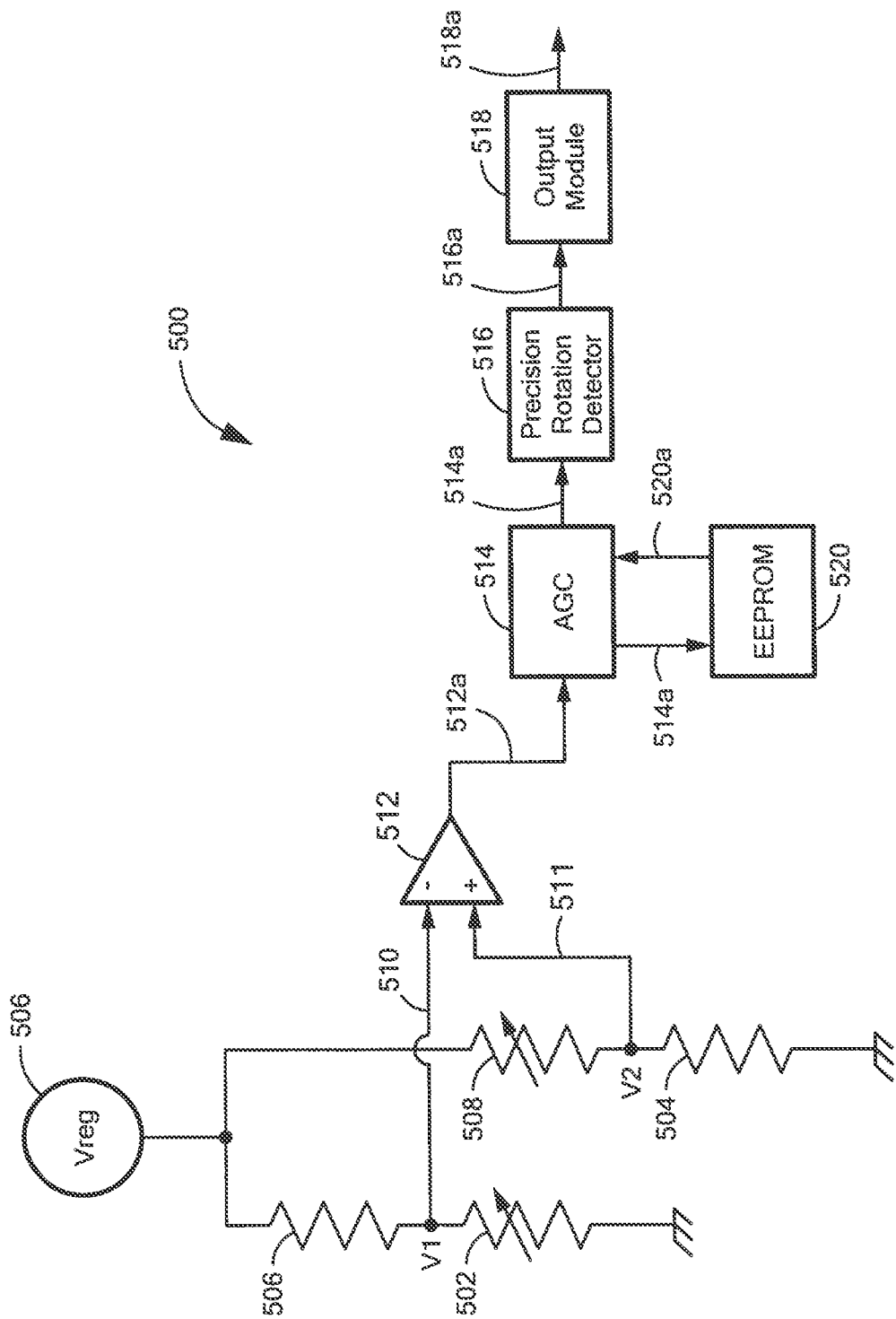
FIG. 5 is a block diagram showing an example of the two magnetic field sensing elements and an example of the electronic circuit of FIGS. 3 and 4.

Referring now to FIG. 5, an example of an electronic circuit 500 can be the same as or similar to the electronic circuit 314 of FIGS. 3 and 4 and can be coupled to magnetic field sensing elements 502, 508 the same as or similar to the magnetic field sensing elements 304, 306 of FIGS. 3 and 4. The electronic circuit 500 can include a first magnetoresistance element 502 coupled in a first half bridge with a fixed resistor 506. The electronic circuit 500 can also include a second magnetic resistance element 508 coupled in the second half bridge with a fixed resistor 504. The two half bridges can be driven from a voltage source 506, forming a full bridge circuit.

The first half bridge generates a signal 510 responsive to an external magnetic field. The second half bridge generates a signal 512 responsive to the external magnetic field.

A differential amplifier 512 can be coupled to receive the signals 510, 512 and configured to generate an amplified signal 512a. It will be understood that the amplified signal 512a is representative of a difference of signals generated by the two magnetoresistance elements 502, 508.

An automatic gain control 514 can be coupled to receive the amplified signal 512a and configured to generate a gain controlled signal 514a. A precision rotation detector 516 can be coupled to receive the gain controlled signal 514a and configured to generate a precision patient detector output signal 516a. In some embodiments the precision rotation detector output signal 516a is a two state signal having high states representative, for example, of the proximity of teeth of the ferromagnetic gear, which can be the same as or similar to the ferromagnetic gear of FIGS. 3 and 4.

An output module 518 can be coupled to receive the precision rotation detector output signal 516a and configured to generate a signal 518a representative of the precision rotation detector output signal 516a with formats suitable for the application, for example, for an automotive application.

In some embodiments, the electronic circuit 500 can also include a memory device 520, for example, an EEPROM or nonvolatile memory device, to receive and store automatic gain control values 514a and thereafter to provide automatic gain control values 520a to control the gain of the automatic gain control 514. With this arrangement, the electronic circuit 500 can retain automatic gain control values, for example, during power down, and the stored automatic gain control values 520a can be used upon power up to result in achieving a proper gain faster after power up. A similar memory device with stored automatic gain control values can be used in any of the electronic circuits described below.

While the EEPROM 520 is described above to retain automatic gain control values, in other embodiments, the EEPROM 520 can retain other values, for example, threshold values, described below in conjunction with FIG. 9, or other values also indicative of measured operational characteristics of the magnetic field sensor.

Blocks of FIG. 5 can be implemented in analog circuits, digital circuits, or processors.

It will be recognized that, if the two magnetoresistance elements 502, 508 experience the same magnetic field, then the amplified signal 512a is not zero. Only when an edge of a gear tooth is proximate to the magnetoresistance elements 502, 508 will the amplified signal 512a not be zero. Thus, the electronic circuit 500 operates as an edge detector. Accordingly, the electronic circuit 500 does not include a true power on state channel comparable to that described above in conjunction with FIG. 1A.

However, in an alternate arrangement, the magnetoresistance element 506 and the resistor 502 can be interchanged in a similar electronic circuit or the magnetoresistance element 508 and the resistor 504 can be interchanged in another similar circuit to achieve a tooth detector (i.e., feature detector). The similar circuits can include a true power on state channel comparable to that described above in conjunction with FIG. 1A.

While two magnetoresistance elements 502, 508 are shown, in other embodiments, the magnetoresistance elements 502, 508, and the bridge circuit in which they are coupled, can be replaced with two Hall effect elements, for example, two vertical Hall effect elements.

Figure 6:
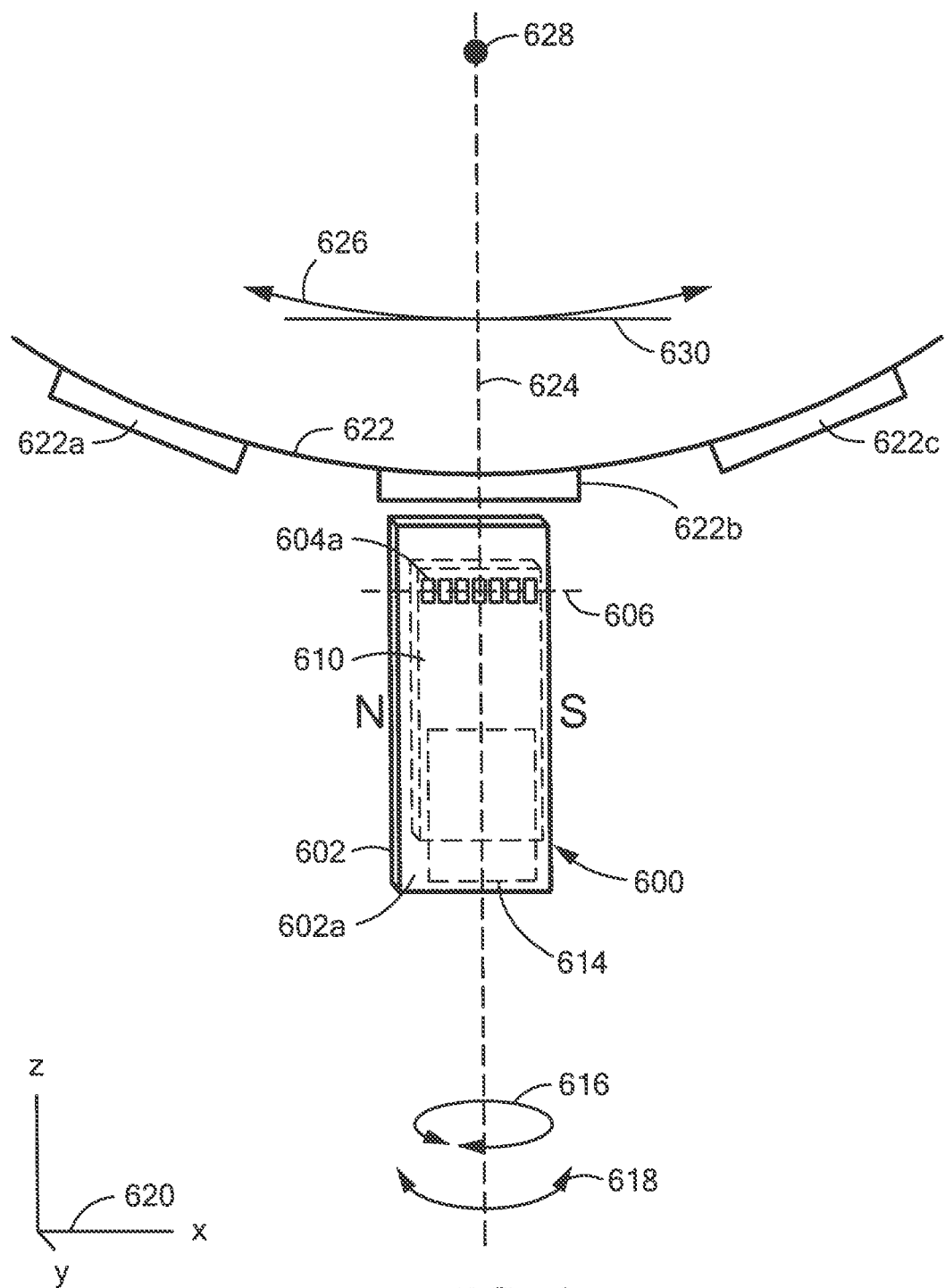
FIG. 6 is a block diagram showing an example of a magnetic field sensor having a plurality of magnetic field sensing elements and an electronic circuit both disposed on a substrate, and also having a magnet.

Referring now to FIG. 6, a magnetic field sensor 600 is responsive to a gear 622 having gear teeth, e.g., gear teeth 622a, 622b, 622c. The magnetic field sensor 600 can include a plurality of, i.e., two or more (or more than two), magnetic field sensing elements, e.g., 604a, coupled to an electronic circuit 614. In some embodiments, the magnetic field sensing elements, e.g., 604a, are separated in a direction along an axis 606 between the plurality of magnetic field sensing elements, e.g., 604a, by a distance between about 0.05 millimeters and about 2.0 millimeters.

The plurality of magnetic field sensing elements, e.g., 604a, and the electronic circuit 614 can be disposed upon a major surface 602a of (i.e., integrated within or upon) a substrate 602. For clarity, here the magnetic field sensing elements, e.g., 604a, are shown to be magnetoresistance elements. In other embodiments, the magnetic field sensing elements, e.g., 604a, are Hall effect elements, e.g., vertical Hall effect elements.

The magnetic field sensor 600 can also include a magnet 610. The magnet 610 is configured to generate a magnetic field, which is generally directed along an axis 608 at the position of the plurality of magnetic field sensing elements, e.g., 604a, and is generally parallel to the major surface 602a of the substrate 602.

The plurality of magnetic field sensing elements, e.g., 604a, have respective maximum response axes parallel to the major surface 602 of the substrate 602. In some embodiments, the maximum response axes are parallel to each other. In some embodiments, the maximum response axes are substantially parallel to the axis 606. In other embodiments, the maximum response axes are substantially perpendicular to the axis 606.

A line perpendicular to the major surface 602a of the substrate (i.e., into the page) intersects the magnet 610 and does not intersect the gear 622. Furthermore, the plurality of magnetic field sensing elements, e.g., 604a, is disposed at a position such that the axis (e.g., 606) between (i.e., passing through) the plurality of magnetic field sensing elements, e.g., 604a, does not intersect the gear 622. In some embodiments, the axis (e.g., 606) between (i.e., passing through) the plurality of magnetic field sensing elements, e.g., 604a, is substantially parallel to a tangent 630 to a direction of movement, e.g., 626, of the gear 622.

In the embodiment shown, a line between north (N) and south (S) poles of the magnet 610 is substantially parallel to the major surface 602a of the substrate 602, and is substantially parallel to the axis (e.g., 606) between (i.e., passing through) the plurality of magnetic field sensing elements, e.g., 604a. In some embodiments, the line between north and south poles does not intersect the ferromagnetic target object 622.

The electronic circuit 614 is configured to generate an output signal (not shown). An example of an electronic circuit is described more fully below in conjunction with FIGS. 8 and 9. Let it suffice here to say that the electronic circuit 614 is configured to compare each one of the plurality of magnetic field signals to a threshold signal to generate a plurality of binary signals. A plurality of states of the plurality of binary signals is indicative of a position of the ferromagnetic target object 622, and, in particular, a position of an edge of a gear tooth or an edge of a gear valley, relative to the plurality of magnetic field sensing elements. Thus, it will be apparent that the magnetic field sensor 600 can operate as an edge detector, a tooth detector, or both.

The output signal, when the gear 622 is rotating, is indicative speed of rotation of the gear 622 and also indicative of positions of edges of the gear teeth. The magnetic field sensor 600 is able to provide a TPOS function, and, when the gear 622 is stationary, is able to identify whether individual ones of the plurality of magnetic field sensing elements, e.g., 604a, are proximate to a gear tooth or a valley in the gear 622.

Furthermore, the magnetic field sensor 600 is able to identify a direction of rotation of the gear 622 by way of a detected progression of magnetic fields sensed by the plurality of magnetic field sensing elements, e.g., 604a.

The magnet 610 can be comprised of one uniform material, and can have no central core, which is shown and described in conjunction with FIG. 1. However, in other embodiments, the magnet 610 can have a central core the same as or similar to that shown and described in conjunction with FIG. 1. In still other embodiments, the magnet 610 can have a core comprised of air or a core comprised of a non-ferromagnetic material. The core can be aligned parallel to the axis 606.

The magnetic field sensor 600 uses the plurality of magnetic field sensing elements, e.g., 604a, to generate a respective plurality of magnetic field signals.

Each respective one of the plurality of magnetic field signals is responsive to a magnetic field generated by the magnet 602 and influenced by a position of a ferromagnetic target object, e.g., gear teeth 622a, 622b, 622c, relative to a position of each respective one of the plurality of magnetic field sensing elements. The ferromagnetic target object 622 is configured to move in a direction 626 of movement. The plurality of magnetic field sensing elements, e.g., 604a, is disposed along the axis 606, which is substantially parallel to the tangent 630.

In some alternate embodiments, the plurality of magnetic field sensing elements, e.g., 604as, is disposed along an arc rather than along the line 606. A diameter of the arc can be the same as or similar to a diameter of the gear 622. The arc can be curved in the same direction as the circumference of the gear, or in the other direction. When disposed in an arc, maximum response axes of the magnetic field sensing elements can be parallel to each other, or thy may not be parallel to each other. This arrangement is shown below in conjunction with FIG. 16.

In some embodiments, the plurality of magnetic field sensing elements, e.g., 604a, has a respective plurality of maximum response axes parallel to each other. In some embodiments, the maximum response axes are substantially parallel to the axis 606. In other embodiments, the maximum response axes are substantially perpendicular to the axis 606.

The magnetic field sensor 600 can be rotated in a direction 616 to a next position one hundred eighty degrees apart from the position shown, with no degradation of performance. However, intermediate rotations may result in a degradation of performance.

The magnetic field sensor 600 can be rotated in a direction of and arrow 618 with a center of rotation anywhere along a line 624, through approximately +/−twenty degrees, without substantial degradation of performance.

In some embodiments, the magnetic field sensing elements, e.g., 604a, are magnetoresistance elements. In other embodiments, the magnetic field sensing elements are Hall effect elements, e.g., vertical Hall effect elements. However, it is advantageous to use magnetic field sensing elements for which respective axes of maximum sensitivity are parallel to the axis 606.

Figure 7:
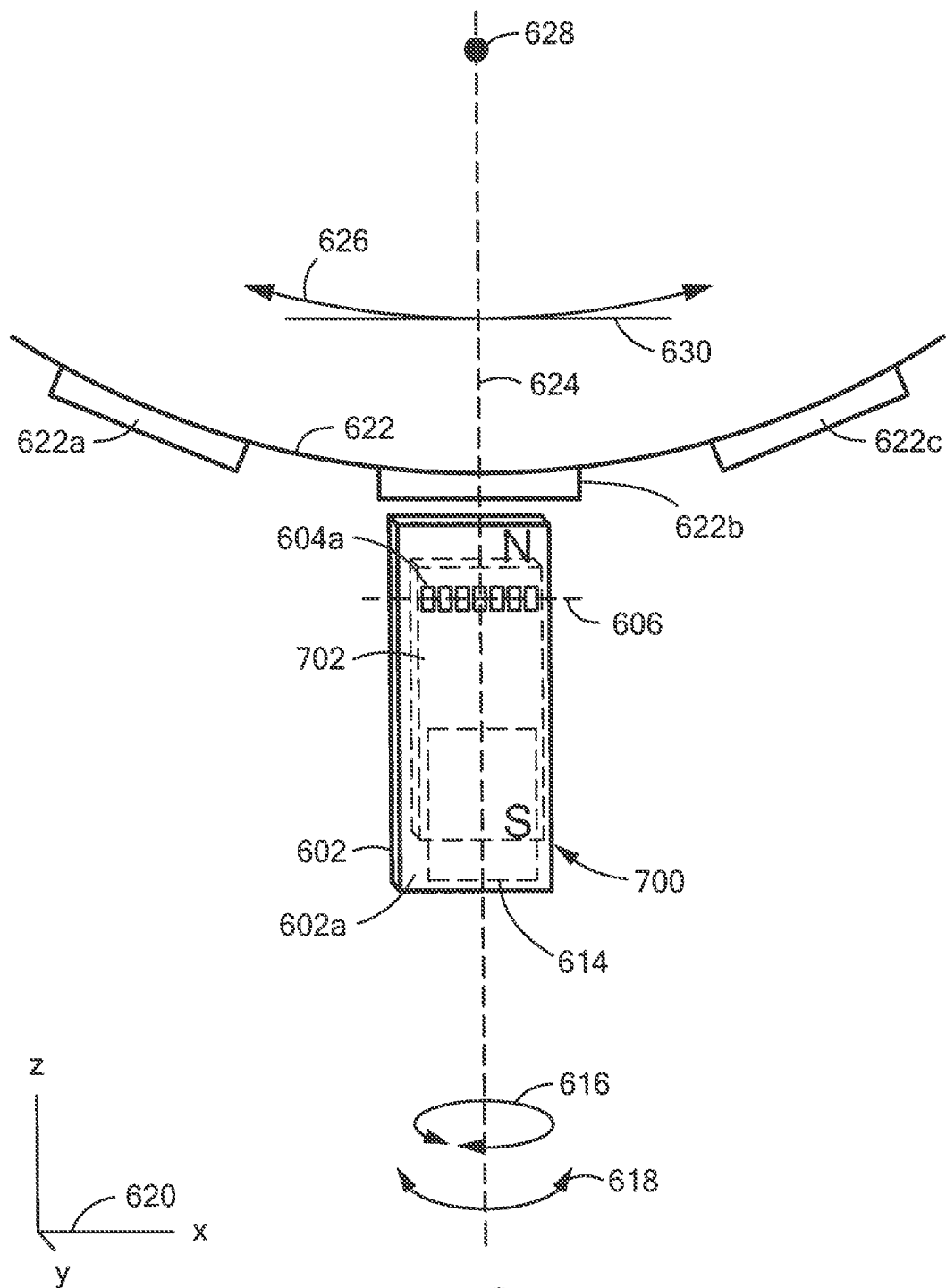
FIG. 7 is a block diagram showing an example of another magnetic field sensor having a plurality of magnetic field sensing elements and an electronic circuit both disposed on a substrate, and having a magnet different than the magnet of FIG. 3.

Referring now to FIG. 7, in which like elements of FIG. 6 are shown having like reference designations, a magnetic field sensor 700 is like the magnetic field sensor 600 of FIG. 6. However, the magnetic field sensor 700 has a different magnet 702 for which a line between north (N) and south (S) poles of the magnet 702 is substantially parallel to the major surface 602a of the substrate 602, and substantially perpendicular to the axis (e.g., 606) between (i.e., passing through) the plurality of magnetic field sensing elements, e.g., 604a. In some embodiments, the line between the north and south poles of the magnet 702 is in a direction toward the gear 622 and intersects the gear 622.

Figure 8:
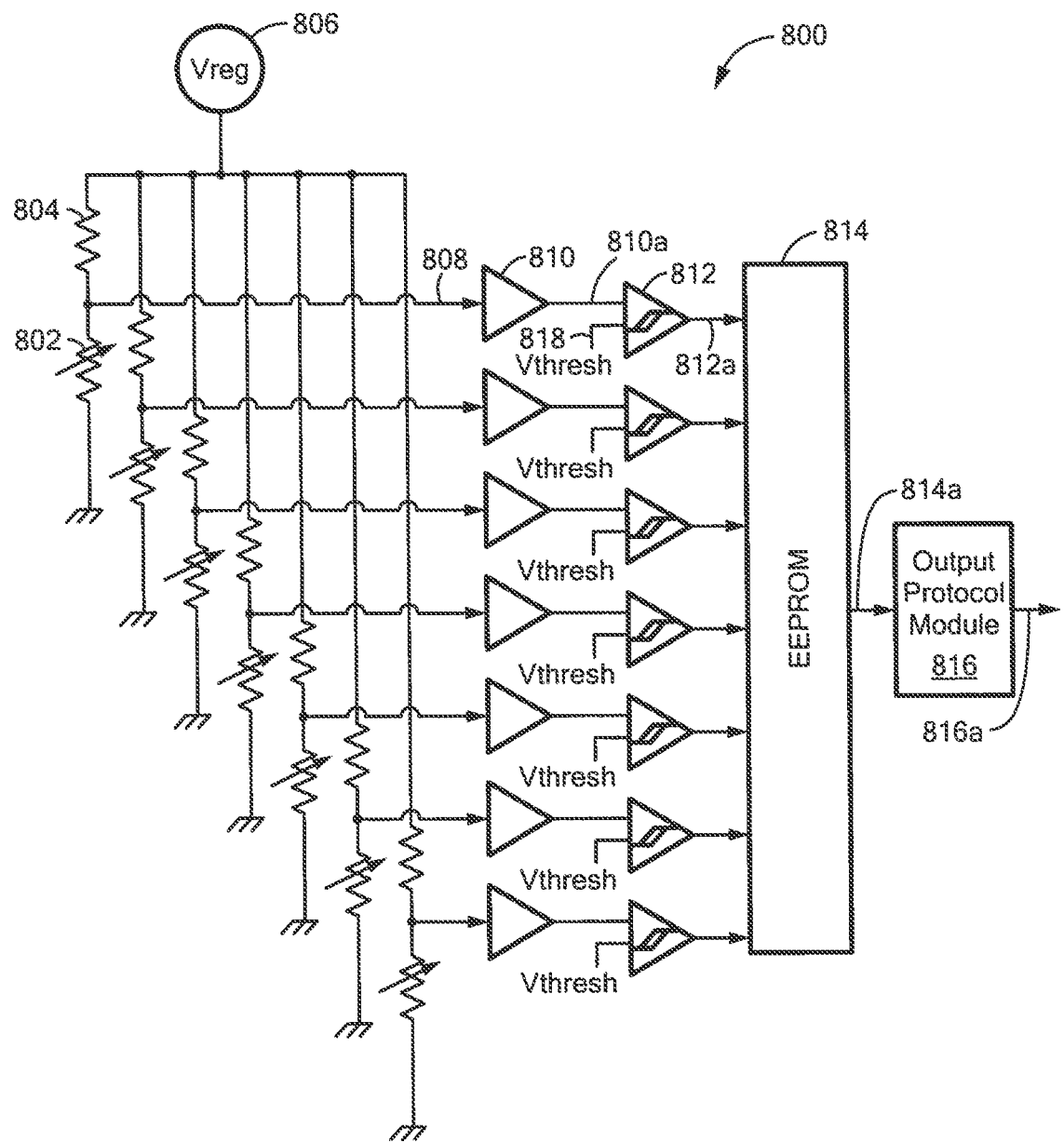
FIG. 8 is a block diagram showing an example of the plurality of magnetic field sensing elements and an example of the electronic circuit of FIGS. 6 and 7.

Referring now to FIG. 8, an electronic circuit 800 can be the same as or similar to electronic circuit 614 of FIGS. 6 and 7 and coupled to a plurality of magnetoresistance elements, which can be the same as or similar to the plurality of magnetic field sensing elements, e.g., 604a, of FIGS. 6 and 7.

The electronic circuit 800 can include a plurality of electronic channels, of which a channel having a magnetoresistance element 802 and a fixed resistor 804 is but one example. The plurality of electronic channels can be coupled to receive a voltage from a voltage regulator 806. Taking the magnetoresistance element 802 and the fixed resistor 804, which form a voltage divider, as being representative of elements of other ones of the electronic channels, a voltage signal 808 can be generated at the junction between the magnetoresistance element 802 and a fixed resistor 804. The voltage signal 808 has a value representative of a magnitude of the magnetic field experienced by the magnetoresistance element 802. Other ones of the electronic channels generate voltage signals having values representative of magnetic fields experienced by other ones of the magnetoresistance elements.

In some embodiments, a quantity of the magnetoresistance elements can be in the range of two to nine.

In other embodiments, the voltage source can be replaced with a current source or with separate current sources to drive each resistor divider, e.g., 802, 804. In some embodiments, the separate current sources can be separate controlled legs of current mirrors, each having the same reference leg.

The voltage signal 808 is received by an amplifier 810 The amplifier 810 configured to generate an amplified voltage signal 810*a*. A comparator 812 is coupled to receive the amplified voltage signal 810*a*, coupled to receive a threshold signal 818, and configured to generate a comparison signal 812*a* (i.e., a binary, two-state, signal).

In some other embodiments, the amplifiers, e.g., 810, are not used.

A nonvolatile memory device, for example, an electrically erasable read only memory (EEPROM) 814, is coupled to receive a plurality of such comparison signals at a multi-bit address input. The EEPROM 814 produces an output signal 814*a*, which can be a single bit output signal or a multi-bit output signal. The output signal 814*a* can have a value, i.e., a digital value, representative of a position of a gear tooth relative to the plurality of magnetoresistance elements, for example, a position of the gear tooth 322*b* of FIG. 6 relative to a position of the plurality of magnetic field sensing elements shown in FIG. 6. Thus, one or more states of the signal 814*a* are representative of an edge of the gear tooth 622*b* being proximate to the plurality of magnetic field sensing elements.

It will be appreciated that the EEPROM 814 can act as a look-up table, and can provide any desired mapping of address to output signal 814*a*. The same electronic circuit can be applied to both the magnetic field sensor 600 of FIG. 6 and to the magnetic field sensor 700 of FIG. 7, but perhaps with different look up tables stored in the EEPROM 814.

The signal 814*a* can be indicative of a speed of rotation and/or a direction of rotation of the ferromagnetic target object, e.g., 622 of FIG. 6.

In some other embodiments, the EEPROM 814 is replaced by a processor.

In some embodiments, the output signal 814*a* is received by an output protocol module 816. The output protocol module 816 is configured to generate a formatted signal 816*a* in a selected one of a plurality of formats including, but not limited to, a SENT format, an I2C format, a PWM format, or a binary format.

The formatted signal 816*a* can also be indicative of a speed of rotation and/or a direction of rotation of the ferromagnetic target object, e.g., 622 of FIG. 6. To this end, the output protocol module 816 can use the signal 814*a* to identify the speed of rotation and/or the direction of rotation of the ferromagnetic target object. Certain digital values of the signal 814*a* may be indicative of a center of a ferromagnetic target feature (e.g., gear tooth) being proximate to the plurality of magnetoresistance elements, certain other digital values of the signal 814*a* may be indicative of a particular edge of a ferromagnetic target object feature being proximate to the plurality of magnetoresistance elements, and certain other digital values of the signal 814*a* may be indicative of a different particular edge of a ferromagnetic target object feature being proximate to the plurality of magnetoresistance elements.

While the electronic circuit 800 is shown to have a plurality of simple voltage dividers, e.g., a voltage divider formed from the magnetoresistance element 802 with the fixed resistor 804, in other embodiments, each channel can use a different arrangement, for example, a Wheatstone (full) bridge.

In still other embodiments, each one of the electronic channels can use a respective Hall effect element, e.g., a respective vertical Hall effect element. As is known, a Hall element can receive, i.e., can be driven by, either a voltage source or a current source, and the Hall effect element can generate, from two output signal nodes, a differential output signal. It should be apparent how the electronic circuit 800 can be modified to use Hall effect elements instead of magnetoresistance elements.

While a plurality of comparators (e.g., 812) is shown, in other embodiments, there can be one or more comparators that are multiplexed to provide parallel channels. Similarly, while a plurality of amplifiers 810 is shown, in other embodiments, one or more amplifiers can be multiplexed to provide the parallel channels.

Figure 9:
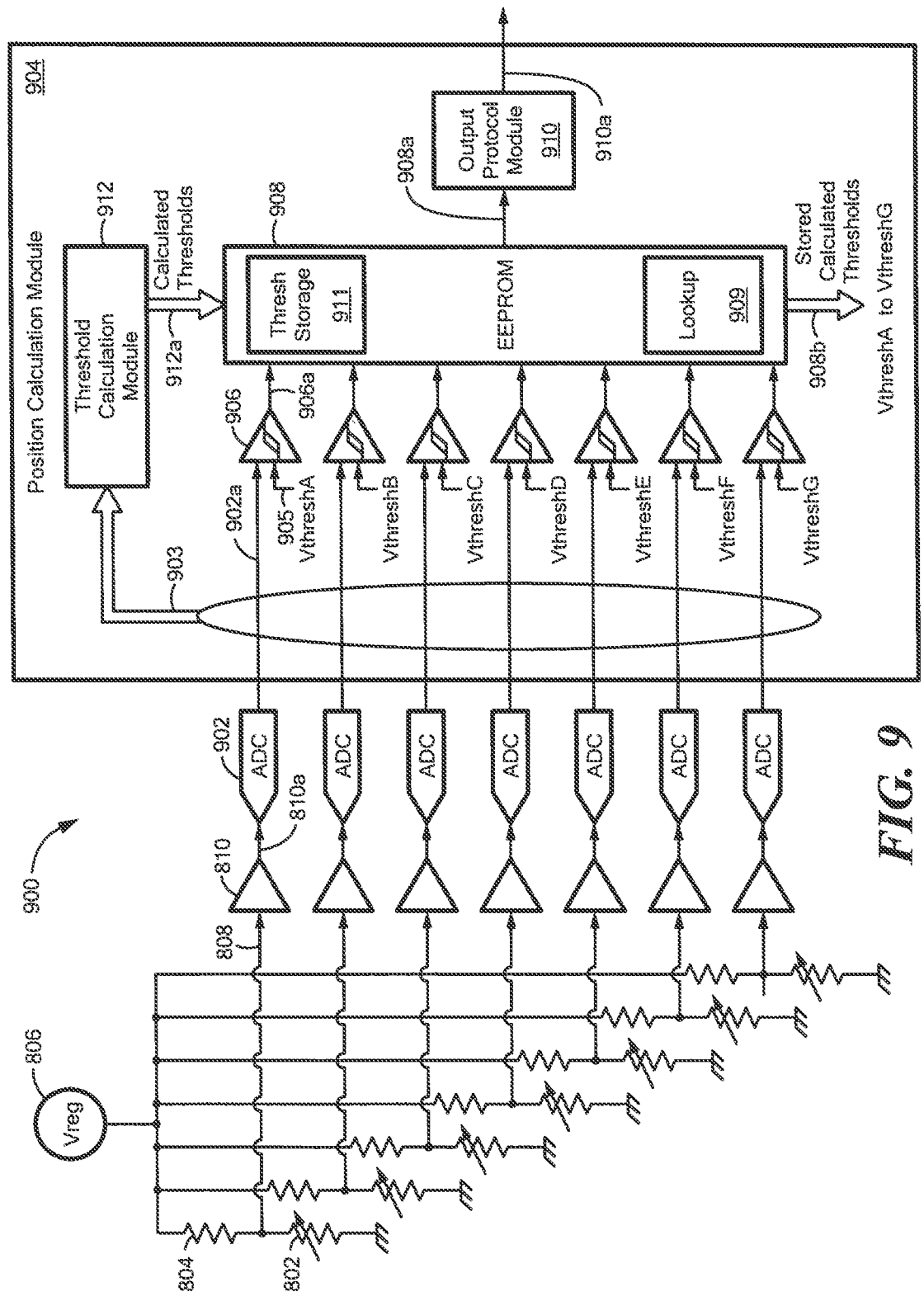
FIG. 9 is a block diagram showing another example of the plurality of magnetic field sensing elements and another example of the electronic circuit of FIGS. 6 and 7.

Referring now to FIG. 9, in which like elements of FIG. 8 are shown having like reference designations, an electronic circuit 900 can be the same as or similar to electronic circuit 614 of FIGS. 6 and 7, and coupled to a plurality of magnetoresistance elements, which can be the same as or similar to the plurality of magnetic field sensing elements, e.g., 604*a*, of FIGS. 6 and 7.

The electronic circuit 900 can include a plurality of electronic channels, of which a channel having the magnetoresistance element 802 and a fixed resistor 804 is but one example. Taking this channel as being representative of other ones of a plurality of channels, an analog-to-digital converter (ADC) 912 can be coupled to receive the amplified voltage signal 810*a* and configure to generate a converted signal 902*a*.

A position calculation module 904 (i.e., a processor) can be coupled to receive the converted signal 902*a*. In particular, a digital comparator 906 within the position calculation module 904 can be coupled to receive the converted signal 902*a*. The digital comparator 906 can also be coupled to receive a digital threshold value 905 and configured to generate a comparison signal 906*a*.

In some embodiments, a nonvolatile memory device, for example, an EEPROM 908, can be coupled to receive the comparison signal 906*a* along with other comparison signals. The EEPROM 908 can include a lookup table 909 to receive the comparison signals and to generate a signal 908*a*, which can be a single bit signal or a multi-bit signal. The signal 908*a* can be the same as or similar to the signal 814*a* of FIG. 8.

The signal 908*a* can be indicative of a speed of rotation and/or a direction of rotation of the ferromagnetic target object, e.g., 622 of FIG. 6.

An output protocol module 910 can receive the signal 908*a* and can generate a formatted signal 910*a*, which can be the same as or similar to the formatted signal 816*a* of FIG. 8.

The formatted signal 910*a* can be indicative of a speed of rotation and/or a direction of rotation of the ferromagnetic target object, e.g., 622 of FIG. 6. To this end, the output protocol module 910 can use the signal 908a to identify the speed of rotation and/or the direction of rotation of the ferromagnetic target object. Certain digital values of the signal 908a may be indicative of a center of a ferromagnetic target feature (e.g., gear tooth) being proximate to the plurality of magnetoresistance elements, certain other digital values of the signal 908a may be indicative of a particular edge of a ferromagnetic target object feature being proximate to the plurality of magnetoresistance elements, and certain other digital values of the signal 908a may be indicative of a different particular edge of a ferromagnetic target object feature being proximate to the plurality of magnetoresistance elements.

In some embodiments, the position calculation module 904 can also include a threshold calculation module 912 coupled to receive one or more of the converted signals 903.

In operation, the threshold calculation module 912 can identify desired threshold values, e.g., 905, to use as inputs to the digital comparators, e.g., 906. For example, in some embodiments, the threshold calculation module 912 can calculate positive and negative peak values of the converted signals 903, can compute peak-to-peak values, and can compute respective threshold values to be desired percentages of the peak-to peak values. For example, in some embodiments, calculated thresholds can be approximately 60 percent and approximately forty percent of the peak-to-peak values. Accordingly, the position calculation 10 module 904 can store in a threshold storage region 911 of the EEPROM 906, the calculated threshold values, and can supply the calculated threshold values from the threshold storage area 911 to the digital comparators, e.g., 906.

With the above arrangement, after a power down to the electronic circuit 900, upon powering up again, the stored threshold values can be rapidly used, resulting in a faster power up response time.

While separate analog-to-digital converters are shown on each channel, in other embodiments, there can be one or more analog-to digital converters coupled to the amplifiers, e.g., 810, through a multiplexer (not shown). Similarly, while a plurality of comparators is shown, in other embodiments, there can be one or more comparators coupled to the one or more analog-to-digital converters and coupled to the processor 908 through a multiplexer (not shown.

While the EEPROM 908 is shown to be within the position calculation module 904, in other embodiments, the EEPROM 908 is outside of the position calculation module 904.

Some other embodiments are a combination of parts of FIGS. 8 and 9. For example, in some other embodiments, the analog-to-digital converters, e.g., 902, are not used, in which case, the plurality of comparators, e.g., 906 can be, for example, analog comparators that provide the comparison signals, e.g., 906, as binary signals to the position calculation module 904. Accordingly, the EEPROM 908 (or the threshold calculation module 912), through one or more digital-to-analog converters (DACs, not shown), can provide analog threshold signals to the comparators.

In still other embodiments, the threshold calculation module 912 can be an analog module operable to identify positive and negative peaks of the amplified signals, e.g., 810a, operable to provide associated thresholds between the positive and negative peaks, and operable to provide the thresholds to the comparators, e.g., 906, as analog thresholds. This arrangement can be the same as or similar to parts of the precision rotation detectors described above in conjunction with FIG. 1A, for which reference is made above to prior art patents and patent applications.

Figure 10:
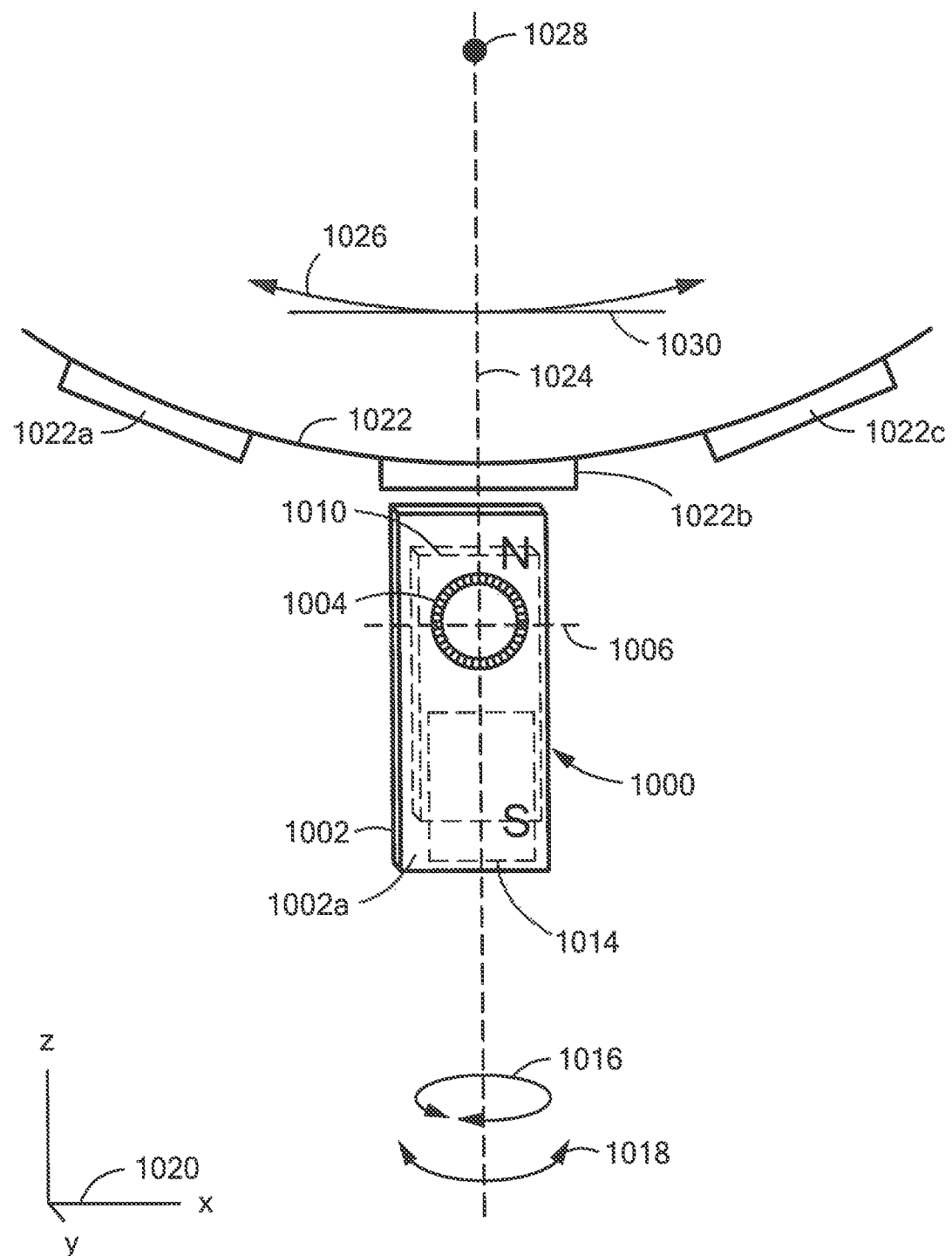
FIG. 10 is a block diagram showing an example of a magnetic field sensor having a circular vertical Hall (CVH) sensing element and an electronic circuit both disposed on a substrate, and also having a magnet.

Referring now to FIG. 10, a magnetic field sensor 1000 is responsive to a gear 1022 having gear teeth, e.g., gear teeth 1022a, 1022b, 1022c. The magnetic field sensor 1000 can include a CVH sensing element 1004 having a plurality of vertical Hall effect elements coupled to an electronic circuit 1014. In some embodiments, a diameter of the CVH sensing element 1004 is between about 0.1 millimeters and about 1.0 millimeters.

The CVH sensing element 1004 and the electronic circuit 1014 can be disposed upon a major surface 1002a of (i.e., integrated within or upon) a substrate 1002.

The magnetic field sensor 1000 can also include a magnet 1010. The magnet 1010 is configured to generate a magnetic field, which is generally directed along an axis 1024 at the position of the CVH sensing element 1004 and is generally parallel to the major surface 1002a of the substrate 1002.

The vertical Hall effect sensing elements within the CVH sensing element 1004 have respective maximum response axes parallel to the major surface 1002 of the substrate 1002.

A line perpendicular to the major surface 1002a of the substrate (i.e., into the page) intersects the magnet 1010 and does not intersect the gear 1022.

In the embodiment shown, a line between north (N) and south (S) poles of the magnet 1010 is substantially parallel to the major surface 1002a of the substrate 1002. In some embodiments, the line between the north and south poles of the magnet 1010 intersects the gear 1022 and is in a direction toward the gear 1022. In some other embodiments, the line between the north and south poles of the magnet 1010 is substantially parallel to the line 1006 and does not intersect the gear 1022.

The electronic circuit 1014 is configured to generate an output signal (not shown). Let it suffice here to say that the electronic circuit 1014 is configured to generate an x-z angle signal having x-z angle values representative of an angle (i.e., direction) of a magnetic field experienced by the CVH sensing element 1004. Thus, it will be apparent that the magnetic field sensor 1000 can operate as an edge detector or as a tooth detector.

The output signal, when the gear 1022 is rotating, is indicative of a speed of rotation of the gear 1022 and also indicative of positions of edges of the gear teeth and also positions of the gear teeth. The magnetic field sensor 1000 is able to provide a TPOS function, and, when the gear 1022 is stationary, is able to identify whether the CVH sensing element 1004 is proximate to a gear tooth or a valley in the gear 1022.

The magnet 1010 can be comprised of one uniform material, and can have no central core, which is shown and described in conjunction with FIG. 1. However, in other embodiments, the magnet 1010 can have a central core the same as or similar to that shown and described in conjunction with FIG. 1. In still other embodiments, the magnet 1010 can have a core comprised of air or a core comprised of a non-ferromagnetic material. In some embodiments, the central core can have an axis substantially parallel to an axis 1024.

The magnetic field sensor 1000 uses the CVH sensing element 1004 to generate one sequential magnetic field signal.

The sequential magnetic field signal is responsive to a magnetic field generated by the magnet 1010 and influenced by a position of a ferromagnetic target object, e.g., gear teeth 1022a, 1022b, 1022c, relative to a position of each respective one of the plurality of magnetic field sensing elements. The ferromagnetic target object 1022 is configured to move in a direction 1026 of movement. A tangent 1030 to the direction of movement 1026 is shown.

The magnetic field sensor 1000 can be rotated in a direction 1016 to a next position one hundred eighty degrees apart from the position shown, with no degradation of performance. However, intermediate rotations may result in a degradation of performance.

The magnetic field sensor 1000 can be rotated in a direction of and arrow 1018 with a center of rotation anywhere along a line 1024, through approximately +/−twenty degrees, without substantial degradation of performance.

In some alternate embodiments, the CVH sensing element 1004 is replaced by a plurality of separately isolated vertical Hall effect elements.

In some alternate arrangements, there can be two or more CVH sensing elements disposed upon the substrate, substantially along the axis 1006.

Full operation of the CVH sensing element 1004 and the electronic circuit 1014 of FIG. 10 is described in more detail in PCT Patent Application No. PCT/EP2008/056517, entitled "Magnetic Field Sensor for Measuring Direction of a Magnetic Field in a Plane," filed May 28, 2008, which is published in the English language as PCT Publication No. WO 2008/145610.

Figure 11:
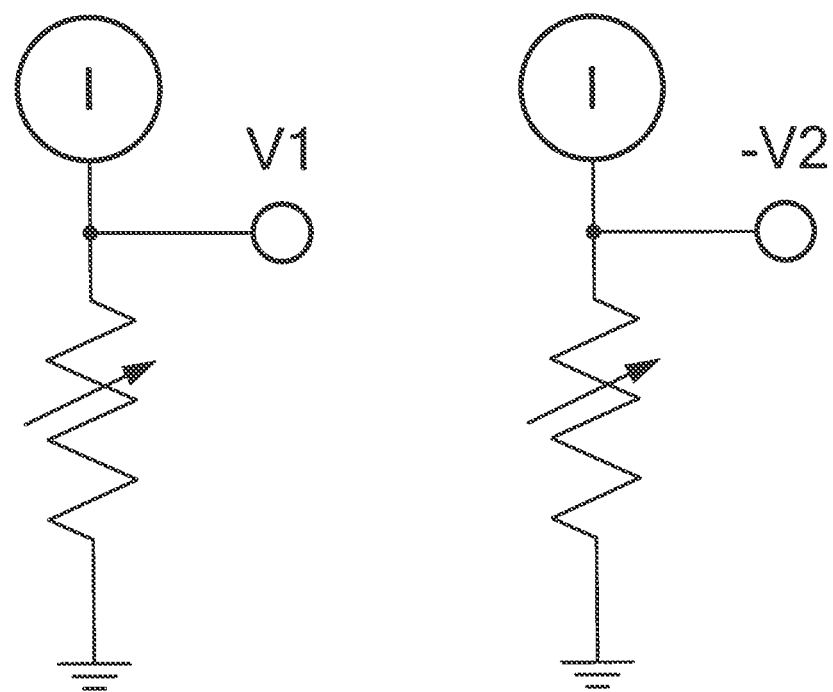
FIG. 11 is a block diagram showing an alternate example of the two magnetic field sensing elements as compared to FIG. 5 and can be used with the electronic circuit of FIG. 5.

Referring now to FIG. 11, the two magnetic field sensing elements of FIGS. 3, 4, and 5, shown to be two magnetoresistance elements coupled in a bridge arrangement in FIG. 5, can instead be separately magnetoresistance elements coupled to respective current sources. It should be apparent how the two magnetoresistance elements of FIG. 15 can be coupled to the electronic circuit of FIG. 5. It should be noted that a signal, −V2, is inverted relative to a signal, V2, shown in FIG. 5, and thus must be inverted to couple as the signal, V2, in FIG. 5 to achieve the same functionality described as an edge detector in FIG. 5.

Figure 12:
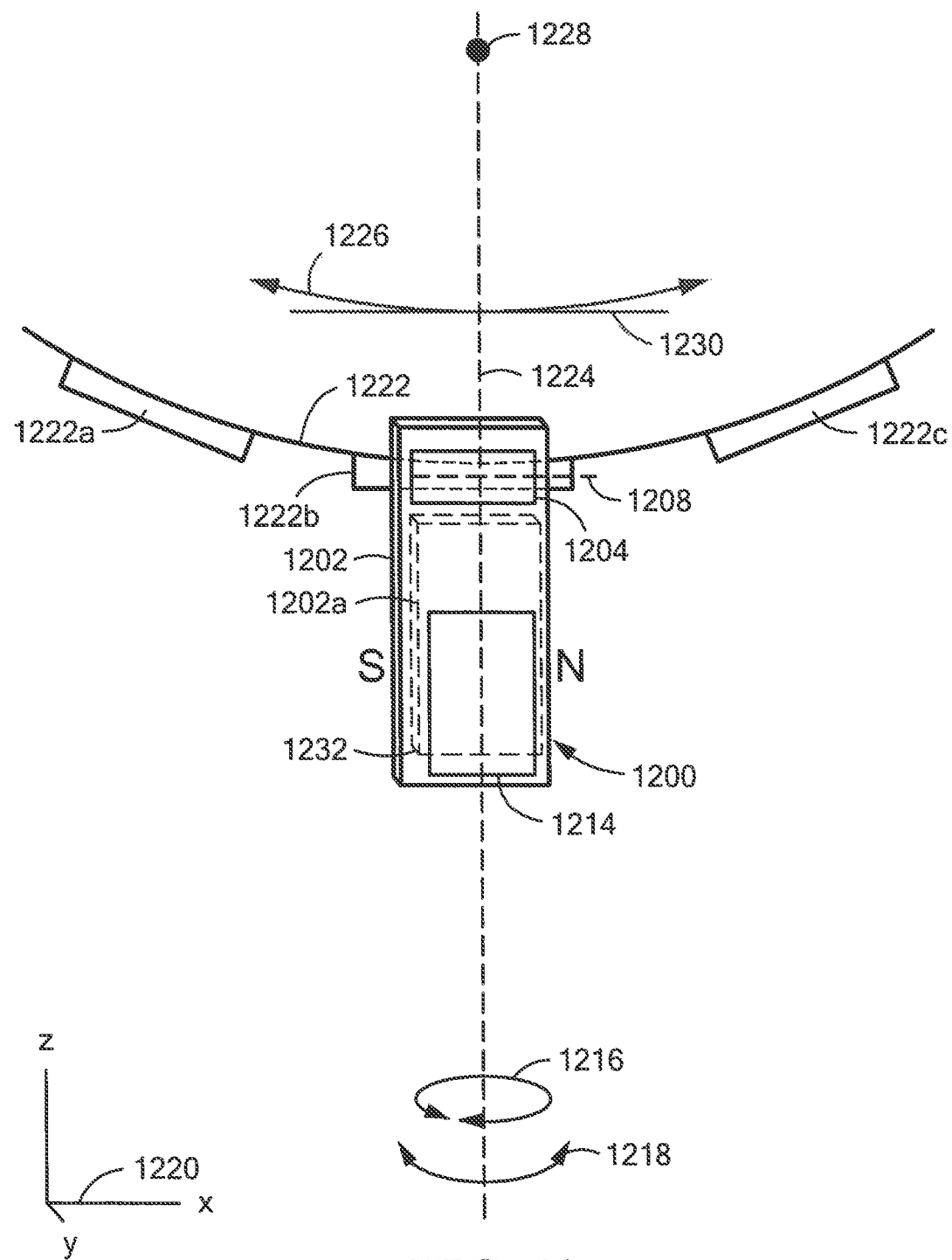
FIG. 12 is a block diagram showing an alternate arrangement of any of the above magnetic field sensors but for which magnetic field sensing elements contained therein overlap a sensed ferromagnetic object.

Referring now to FIG. 12, a magnetic field sensor 1200 can be the same as or similar to the magnetic field sensor 300 of FIG. 3, the magnetic field sensor 600 of FIG. 6, or the magnetic field sensor 1000 of FIG. 10 (but with the magnet rotated ninety degrees). A block 1204 is representative of the magnetic field sensing elements 304, 306 of FIG. 3, the plurality of magnetic field sensing elements, e.g., 604a, of FIG. 6, or the CVH sensing element 1004 of FIG. 10. A block 1214 is representative of the electronic circuit 314 of FIG. 3, the electronic circuit 614 of FIG. 6, or the electronic circuit 1014 of FIG. 10.

The block 1204 representative of magnetic field sensing elements is disposed on a surface 1202a of a substrate 1202. The magnetic field sensor 1200 can include a magnet 1232 disposed as shown behind the substrate 1202 such that a line perpendicular to the substrate 1202 intersects the magnet 1232. North and south poles of the magnet 1232 can be arranged as shown to be like the alignment of magnets 332, 610 FIGS. 3 and 6, respectively, or like the magnet 1010 of FIG. 10, but rotated ninety degrees.

Unlike the magnetic field sensors shown above, here the substrate 1202 and the block 1204 representative of magnetic field sensing elements overlap a ferromagnetic target object 1222. The ferromagnetic target object 1222 is shown here to be a ferromagnetic gear having gear teeth, e.g., 1222a, 1222b, 1222c. In another embodiment the magnet 1232 and ferromagnetic target object 1222 can be replaced by a ring magnet or permanent magnet (hard ferromagnetic material) as described below in conjunction with FIGS. 14 and 15.

The magnetic field sensor 1200 can be rotated in a direction 1212 to a next position one hundred eighty degrees apart from the position shown, with no degradation of performance. However, intermediate rotations may result in a degradation of performance or may not be possible due to contact with the ferromagnetic target object 1222.

The magnetic field sensor 1200 can be rotated in a direction of and arrow 1216 with a center of rotation anywhere along a line 1224, through approximately +/−twenty degrees, without substantial degradation of performance.

Figure 13:
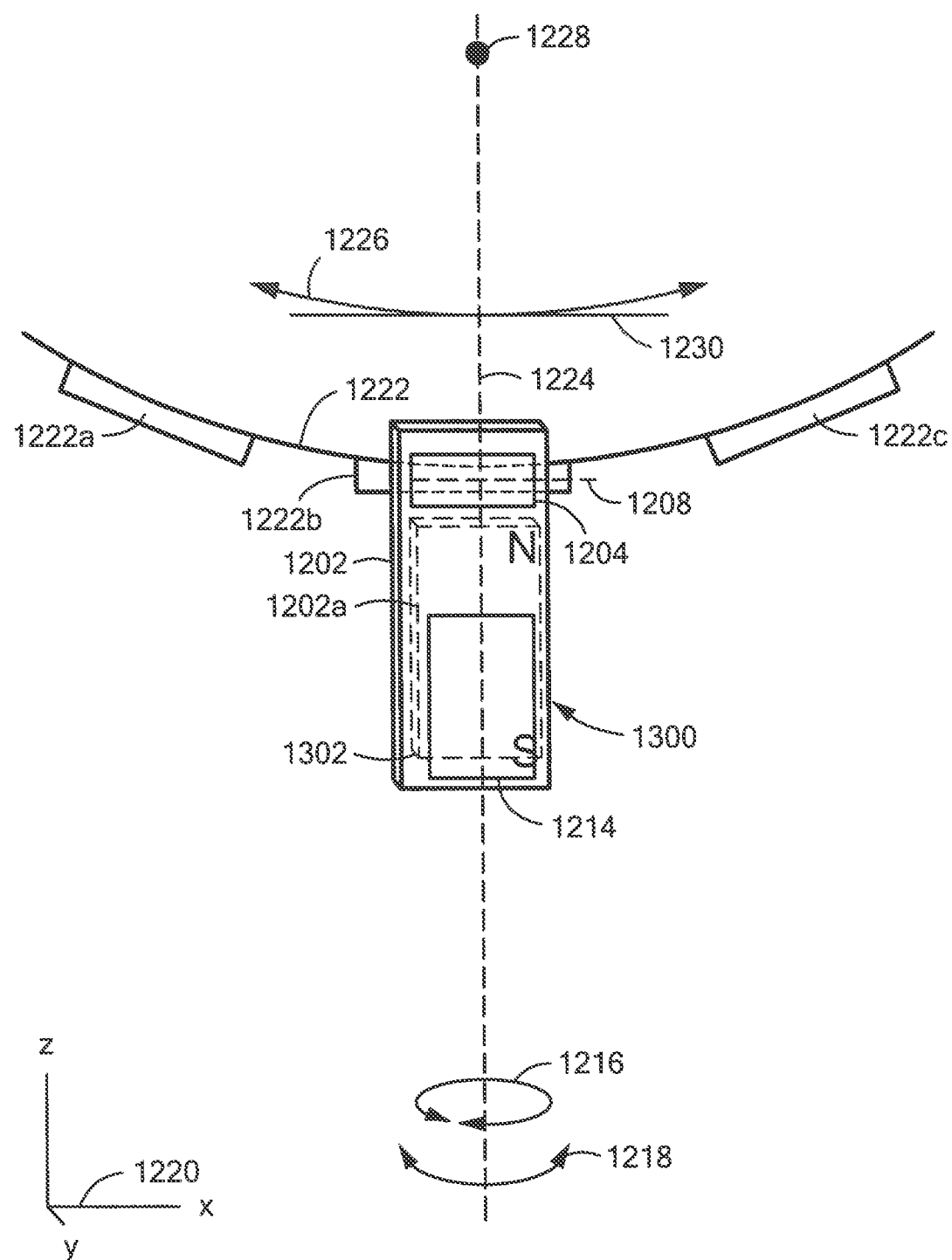
FIG. 13 is a block diagram showing an alternate arrangement of the magnetic field sensors represented in FIG. 12.

Referring now to FIG. 13, in which like elements of FIG. 12 are shown having like reference designations, a magnetic field sensor 1300 is like the magnetic field sensor 1200 of FIG. 12. However, unlike the magnetic field sensor 1200 of FIG. 12, the magnetic field sensor 1300 includes a magnet 1302 having north and south poles arranged as shown, perpendicular to the north and south pole arrangement of the magnet 1232 of FIG. 12.

All magnetic field sensors shown and described above are shown to sense a movement of ferromagnetic target object in the form of a gear or cam. However, FIGS. 14 and 15 described below show the same or similar magnetic field sensors for sensing movement of a ring magnet. Comments made above about edge detectors, tooth detectors, and TPOS functions apply in the same way when sensing a ring magnet.

Figure 14:
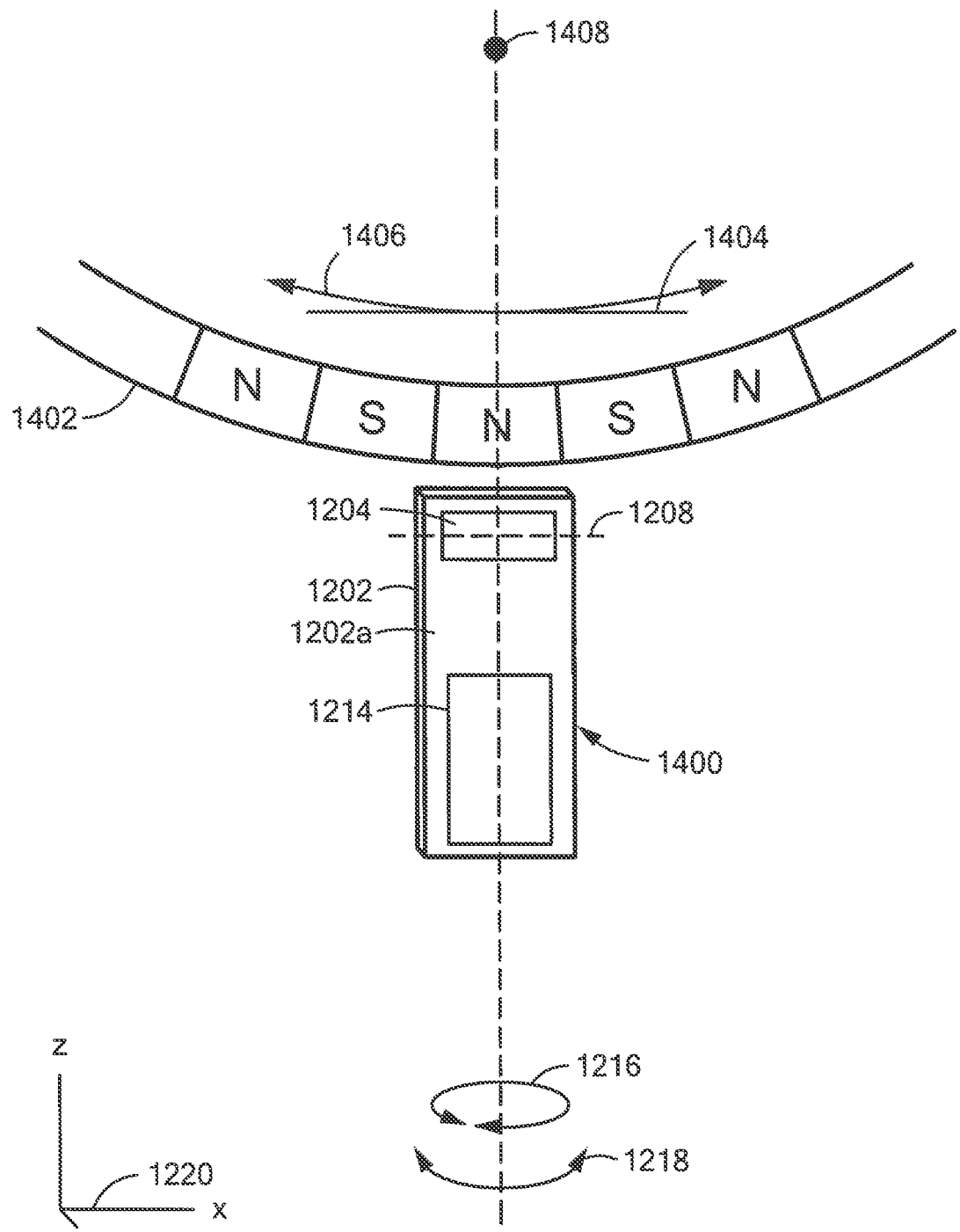
FIG. 14 is a block diagram showing an alternate arrangement of any of the above magnetic field sensors but for which a sensed ferromagnetic object is a ring magnet.

Referring now to FIG. 14, in which like elements of FIG. 12 are shown having like reference designations, a magnetic field sensor 1400 is like the magnetic field sensors described above. However, the magnetic field sensor 1400 has no internal magnet. Instead, the magnetic field sensor 1400 is responsive to passing magnetic domains of a ring magnet 1402. N and S designations shown can be indicative of north and south poles associated with the ring magnet target. A S or N pole would exist on the other side of the page if magnetized perpendicular to the page. In other embodiments the N and S would be on the outer radial dimension toward the ring magnet while a complimentary S or N would exist on the inner radial side of the ring magnet.

In some embodiments, the magnetic domains of the ring magnet 1402 are magnetized parallel to the page. In some other embodiments, the magnetic domains of the ring magnet 1402 are magnetized perpendicular to the page.

Figure 15:
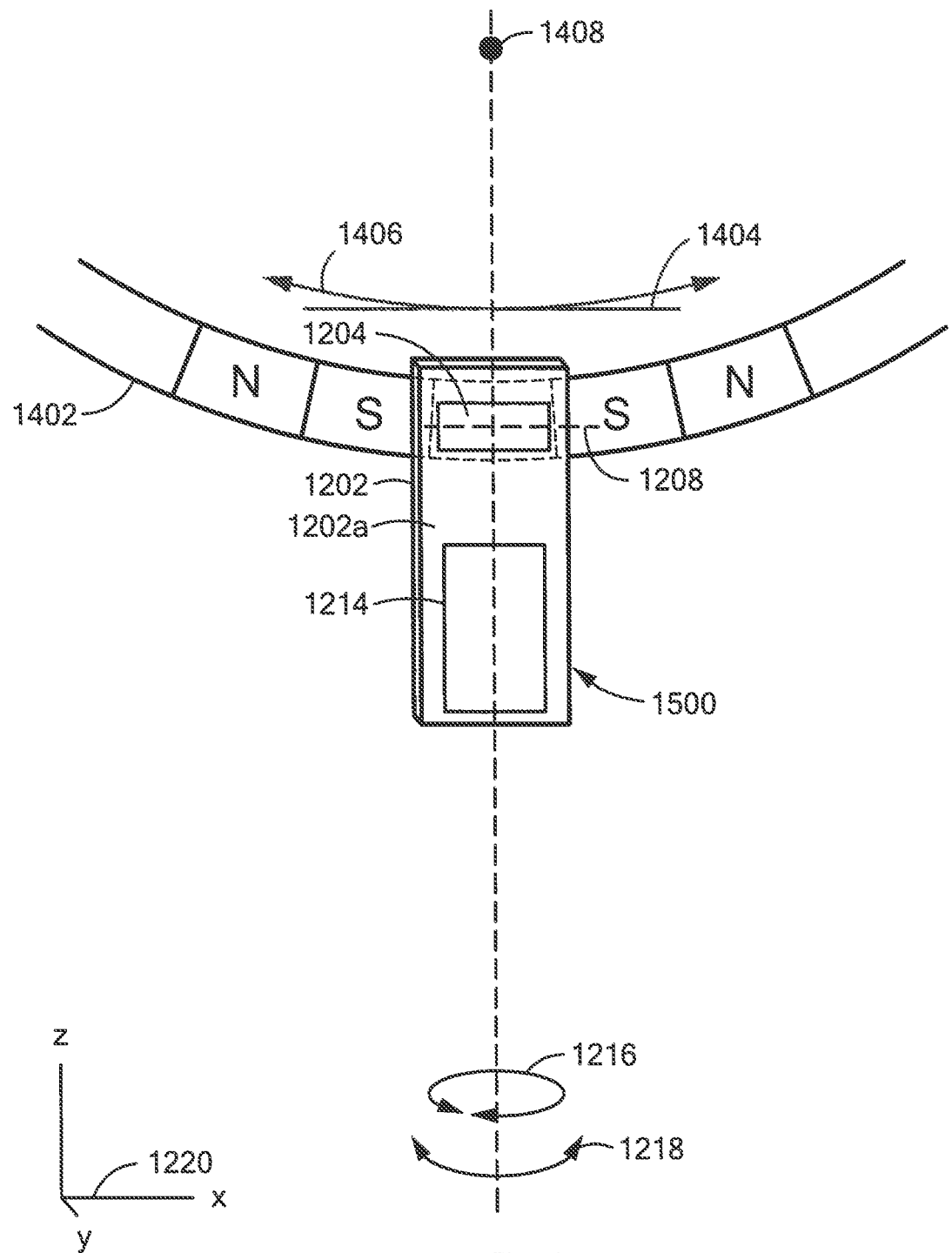
FIG. 15 is a block diagram showing an alternate arrangement of the magnetic field sensors represented in FIG. 14, but for which magnetic field sensing elements contained therein overlap the ring magnet.

Referring now to FIG. 15, in which like elements of FIG. 14 are shown having like reference designations, a magnetic field sensor 1500 is like the magnetic field sensors described above. However, the magnetic field sensor 1500 has no internal magnet. Instead, the magnetic field sensor 1500 is responsive to passing magnetic domains of the ring magnet 1402.

Unlike the magnetic field sensor 1400 of FIG. 14, the substrate 1202 overlaps the ring magnet 1402 such that a line perpendicular to the substrate 1202 intersects the ring magnet 1402. In other embodiments, more of the substrate 1202, or the entire substrate 1202, overlaps the ring magnet 1402.

Figure 16:
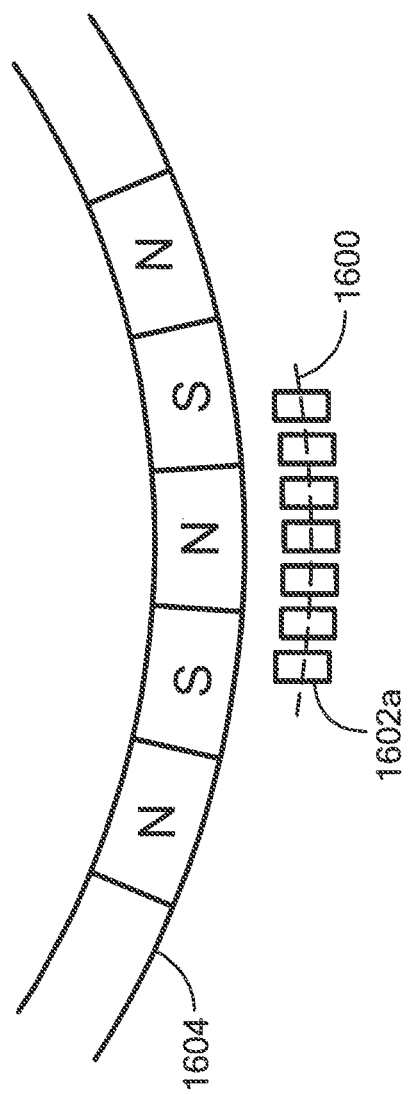
FIG. 16 is a block diagram showing an alternate arrangement of magnetic field sensing elements arranged in an arc as compared to magnetic field sensing elements arranged in a line shown in FIGS. 6 and 7.

Referring now to FIG. 16, a plurality of magnetic field sensing elements, e.g., 1602a, can be used as the plurality of magnetic field sensing elements, e.g., 604a, of the magnetic field sensors 600, 700 of FIGS. 6 and 7. However, unlike the plurality of magnetic field sensing elements, e.g., 604a, of the magnetic field sensors 600, 700 of FIGS. 6 and 7, the magnetic field sensing elements, e.g., 1602a, can be disposed in an arc 1600. In some embodiments, a radius of curvature of the arc 1600 can be the same as a radius of curvature of a ring magnet 1604 (or alternatively, a gear) to which the magnetic field sensing elements, e.g., 1602*a*, are responsive. However, other radii of curvatures are also possible.

In some alternate arrangements represented, for example, by the magnetic field sensor 1500 of FIG. 15, the magnetic field sensing elements, e.g., 1602*a*, can be disposed over and overlap the ring magnet 1604.

In some embodiments, maximum response axes of the plurality of magnetic field sensing elements, e.g., 1602*a*, are parallel to each other.

In some embodiments, maximum response axes of the plurality of magnetic field sensing elements, e.g., 1602*a*, are not parallel to each other.

In some other embodiments, the plurality of magnetic field sensing elements is arranged in a straight line, which is not parallel to a tangent to the ring magnet 1604, i.e., which is at a diagonal to the ring magnet 1604.

While ferromagnetic target objects in the form of ferromagnetic gears and ferromagnetic ring magnets are described above, in other embodiments, any of the ferromagnetic target objects can be replaced by a non-ferromagnetic target object. In these embodiments, the non-ferromagnetic target object can be an electrically conductive target object in which eddy currents can be generated by rotation of the non-ferromagnetic conductive target object in the presence of a magnetic field, which may be supplied by a magnet the same as or similar to the magnets 332, 610 of FIGS. 3 and 6, respectively, or the same as or similar to the magnet 1010 of FIG. 10. In other embodiments, a coil or an electromagnet may provide the magnetic field. The above-described magnetic field sensing elements can be responsive to magnetic fields generated by the eddy currents in the non-ferromagnetic conductive target objects. Arrangements responsive to eddy currents are described, for example, in U.S. patent application Ser. No. 13/946,417, filed Jul. 19, 2013, and entitled "Methods And Apparatus For Magnetic Sensor Having An Integrated Coil Or Magnet To Detect A Non-Ferromagnetic Target," which supplication is assigned to the assignee of the present application, and which application is incorporated by reference herein in its entirety.

From the above, it will be understood that the target object sensed with magnetic field sensors described herein can be a ferromagnetic target object (e.g., a gear of a ring magnet) or a non-ferromagnetic conductive object (e.g., a gear).

Magnetic field sensors described above use a sensed position of the sensed object to identify speed and/or direction of rotation.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed is:

1. A magnetic field sensor for measuring movement of a target object, the movement in an x-z plane within x-y-z Cartesian coordinates with x, y, and z orthogonal axes, the magnetic field sensor comprising:
a substrate having a major planar surface within about twenty degrees of parallel to the x-z plane; and
an electronic circuit disposed upon the substrate, the electronic circuit comprising:
a plurality of magnetic field sensing elements disposed upon the major planar surface of the substrate, the plurality of magnetic field sensing elements including two magnetic field sensing elements disposed upon the major planar surface of the substrate, the two magnetic field sensing elements having respective major response axes parallel to the major planar surface of the substrate, the two magnetic field sensing elements having the respective major response axes parallel to each other, a line passing through any two of the plurality of magnetic field sensing elements not intersecting the target object, wherein the two magnetic field sensing elements are configured to generate a respective two magnetic field signals; and
a differential amplifier coupled to receive the two magnetic field signals and configured to generate an output signal as a difference of the two magnetic field signals, the output signal indicative of a position of the target object relative to the two magnetic field sensing elements, wherein the major planar surface of the substrate overlaps the target object such that a line perpendicular to the major planar surface of the substrate, within twenty degrees of parallel to an axis of rotation of the target object, and passing through at least one of the two magnetic field sensing elements intersects the target object, and a line parallel to the major planar surface of the substrate is in a direction toward the target object.

2. The magnetic field sensor of claim 1, further comprising:
a magnet fixedly coupled to the substrate, the magnet having at least two poles to generate a magnetic field parallel to the major planar surface of the substrate.

3. The magnetic field sensor of claim 1, wherein the target object comprises a ring magnet having a plurality of alternating north and south poles, the target object to generate a magnetic field parallel to the major planar surface of the substrate.

4. The magnetic field sensor of claim 1, wherein the two magnetic field sensing elements comprise planar Hall elements.

5. The magnetic field sensor of claim 1, wherein the two magnetic field sensing elements comprise vertical Hall elements.

6. The magnetic field sensor of claim 1, wherein the two magnetic field sensing elements comprise magnetoresistance elements.

7. A magnetic field sensor for measuring movement of a target object, the movement in an x-z plane within x-y-z Cartesian coordinates with x, y, and z orthogonal axes, the magnetic field sensor comprising:
means for receiving, within the magnetic field sensor, two magnetic field signals generated by a plurality of magnetic field sensing elements disposed upon the major planar surface of the substrate, the plurality of magnetic field sensing elements including two magnetic field sensing elements, the two magnetic field sensing elements disposed upon a substrate, the substrate having a major planar surface within about twenty degrees of parallel to the x-z plane, the two magnetic field sensing elements having respective major response axes parallel to the major planar surface of the substrate, the two magnetic field sensing elements having the respective major response axes parallel to each other, a line passing through any two of the plurality of magnetic field sensing elements not intersecting the target object; and means for generating, within the magnetic field sensor, an output signal as a difference of the two magnetic field signals, the output signal indicative of a position of a target object relative to the two magnetic field sensing elements, wherein the major planar surface of the substrate overlaps the target object such that a line perpendicular to the major planar surface of the substrate, within twenty degrees of parallel to an axis of rotation of the target object, and passing through at least one of the two magnetic field sensing elements intersects the target object, and a line parallel to the major planar surface of the substrate is in a direction toward the target object.

8. The magnetic field sensor of claim 7, further comprising:
means for generating a magnetic field parallel to the major planar surface of the substrate.

9. The magnetic field sensor of claim 7, wherein the target object comprises a ring magnet having a plurality of alternating north and south poles, the target object to generate a magnetic field parallel to the major planar surface of the substrate.

10. The magnetic field sensor of claim 7, wherein the two magnetic field sensing elements comprise planar Hall elements.

11. The magnetic field sensor of claim 7, wherein the two magnetic field sensing elements comprise vertical Hall elements.

12. The magnetic field sensor of claim 7, wherein the two magnetic field sensing elements comprise magnetoresistance elements.

13. A magnetic field sensor for measuring movement of a target object, the movement parallel to an x-z plane within x-y-z Cartesian coordinates with x, y, and z orthogonal axes, the magnetic field sensor comprising:
a substrate having a major planar surface within about twenty degrees of parallel to the x-z plane;
a plurality of magnetic field sensing elements disposed upon the major planar surface of the substrate, each one of the plurality of magnetic field sensing elements having a major response axis substantially parallel to the major planar surface of the substrate, and the plurality of magnetic field sensing elements is configured to generate a respective plurality of magnetic field signals, wherein the plurality of magnetic field sensing elements is formed as at least one circular vertical Hall (CVH) sensing element; and
a magnet fixedly coupled to the substrate, the magnet having at least two poles to generate a magnetic field substantially parallel to the major planar surface of the substrate.

14. The magnetic field sensor of claim 13, further comprising:
an electronic circuit disposed upon the substrate and coupled to the plurality of magnetic field sensing elements, the electronic circuit comprising:
a non-volatile memory device operable to store a value indicative of a measured operational characteristic of the magnetic field sensor.

15. The magnetic field sensor of claim 14, wherein the stored value is stored during a first time period, and wherein the stored value is recalled and used during a second different time period after the first time period.

16. The magnetic field sensor of claim 13, further comprising:

an electronic circuit disposed upon the substrate and coupled to the plurality of magnetic field sensing elements, the electronic circuit comprising:
an output protocol module operable to use the plurality of magnetic field signals to determine a direction of movement of the target object.

17. The magnetic field sensor of claim 13, wherein the major planar surface of the substrate overlaps the target object such that a line perpendicular to the major planar surface of the substrate and passing through at least one of the plurality of magnetic field sensing elements intersects the target object, and a line parallel to the major planar surface of the substrate is in a direction of the target object.

18. The magnetic field sensor of claim 13, wherein the target object comprises a ring magnet having a plurality of alternating north and south poles, the target object to generate a magnetic field substantially parallel to the major planar surface of the substrate.

19. The magnetic field sensor of claim 18, wherein the major planar surface of the substrate overlaps the target object such that a line perpendicular to the major planar surface of the substrate and passing through at least one of the plurality of magnetic field sensing elements intersects the target object, and a line parallel to the major planar surface of the substrate is in a direction of the target object.

20. The magnetic field sensor of claim 13, wherein the plurality of magnetic field sensing elements is arranged in a line within about twenty degrees of parallel to the x-axis.

21. The magnetic field sensor of claim 2, wherein the two magnetic field sensing elements comprise first and second magnetic field sensing elements, wherein a first distance between a surface of the magnet and the target object is smaller than a second distance between the first magnetic field sensing element and the target object.

22. The magnetic field sensor of claim 2, wherein a line disposed upon the major planar surface of the substrate intersects the target object.

23. The magnetic field sensor of claim 1, wherein the two magnetic field sensing elements have a separation between about one half and about one and one half of a width of a feature of the target object.

24. The magnetic field sensor of claim 1, wherein the line passing through the two magnetic field sensing elements is substantially parallel to a tangent to a direction of movement of the target object.

25. The magnetic field sensor of claim 2, wherein a line perpendicular to the major planar surface of the substrate intersects the magnet.

26. The magnetic field sensor of claim 13, wherein a line perpendicular to the major planar surface of the substrate intersects the magnet.

27. The magnetic field sensor of claim 2, wherein a line parallel to the major planar surface of the substrate intersects the axis of rotation of the target object.

28. The magnetic field sensor of claim 8, wherein a line disposed upon the major planar surface of the substrate intersects the target object.

29. The magnetic field sensor of claim 8, wherein a line parallel to the major planar surface of the substrate intersects the axis of rotation of the target object.

30. The magnetic field sensor of claim 13, wherein a line disposed upon the major planar surface of the substrate intersects the target object.

31. The magnetic field sensor of claim 13, wherein a line parallel to the major planar surface of the substrate intersects the axis of rotation of the target object.

* * * * *

UNITED STATES PATENT AND TRADEMARK OFFICE
CERTIFICATE OF CORRECTION

PATENT NO. : 10,753,768 B2
APPLICATION NO. : 15/658757
DATED : August 25, 2020
INVENTOR(S) : Paul A. David et al.

It is certified that error appears in the above-identified patent and that said Letters Patent is hereby corrected as shown below:

In the Specification

Column 3, Line 65 delete "result it" and replace with --result in--.

Column 7, Line 4 delete "magnet" and replace with --magnets--.

Column 8, Line 27 delete "and" and replace with --an--.

Column 8, Line 30 delete "as" and replace with --is--.

Column 8, Line 37-38 delete "by magnetic" and replace with --by a magnetic--.

Column 10, Line 20 delete "in amplifier" and replace with --an amplifier--.

Column 12, Line 56 delete "signals" and replace with --signal--.

Column 13, Line 3 delete "1A. A AGCs 270" and replace with --1A. AGCs 270--.

Column 15, Line 5 delete "of and" and replace with --of an--.

Column 17, Line 34 delete "Let is" and replace with --Let it--.

Column 18, Line 12 delete "e.g., 604*as*," and replace with --e.g., 604*a*,--.

Column 18, Line 18 delete "thy" and replace with --they--.

Column 18, Line 34 delete "and arrow" and replace with --an arrow--.

Column 19, Line 19 delete "810" and replace with --810.--.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,753,768 B2

Column 19, Line 20 delete "810 configured" and replace with --810 is configured--.

Column 19, Line 56 delete "I2C" and replace with --I²C--.

Column 20, Line 41 delete "configure" and replace with --configured--.

Column 21, Line 27-28 delete "calculation 10 module" and replace with --calculation module--.

Column 21, Line 43 delete "(not shown." and replace with --(not shown).--.

Column 23, Line 9 delete "and" and replace with --an--.

Column 23, Line 56 delete "610 FIGS. 3 and 6" and replace with --610 of FIGS. 3 and 6--.

Column 24, Line 8 delete "and" and replace with --an--.

Column 25, Line 38 delete "supplication" and replace with --application--.